(12) United States Patent
Baker

(10) Patent No.: US 8,331,657 B2
(45) Date of Patent: Dec. 11, 2012

(54) ROBUST PATTERN RECOGNITION SYSTEM AND METHOD USING SOCRATIC AGENTS

(75) Inventor: James K. Baker, Maitland, FL (US)

(73) Assignee: Aurilab, LLC, Maitland, FL (US)

( * ) Notice: Subject to any disclaimer, the term of this patent is extended or adjusted under 35 U.S.C. 154(b) by 0 days.

(21) Appl. No.: 13/446,955

(22) Filed: Apr. 13, 2012

(65) Prior Publication Data

US 2012/0203716 A1    Aug. 9, 2012

Related U.S. Application Data

(62) Division of application No. 13/208,069, filed on Aug. 11, 2011, now Pat. No. 8,180,147, which is a division of application No. 11/898,636, filed on Sep. 13, 2007, now Pat. No. 8,014,591.

(60) Provisional application No. 60/844,110, filed on Sep. 13, 2006, provisional application No. 60/853,031, filed on Oct. 20, 2006.

(51) Int. Cl.
*G06K 9/62* (2006.01)
*G06F 17/00* (2006.01)
*G06N 5/00* (2006.01)

(52) U.S. Cl. ........... 382/159; 700/231; 700/255; 706/45

(58) Field of Classification Search .......... 382/155–161; 700/47, 48; 704/231–257; 706/1–62
See application file for complete search history.

(56) References Cited

U.S. PATENT DOCUMENTS

| | | | |
|---|---|---|---|
| 4,697,242 A | 9/1987 | Holland et al. | |
| 4,783,803 A | 11/1988 | Baker et al. | |
| 4,805,219 A | 2/1989 | Baker et al. | |
| 4,837,831 A | 6/1989 | Gillick et al. | |
| 5,123,057 A | 6/1992 | Verly et al. | |
| 5,202,952 A | 4/1993 | Gillick et al. | |
| 5,307,446 A | 4/1994 | Araki et al. | |
| 5,526,463 A | 6/1996 | Gillick et al. | |
| 5,875,261 A | 2/1999 | Fitzpatrick et al. | |
| 6,122,613 A | 9/2000 | Baker | |
| 6,192,360 B1 * | 2/2001 | Dumais et al. | 1/1 |
| 6,789,069 B1 * | 9/2004 | Barnhill et al. | 706/12 |
| 6,950,812 B2 * | 9/2005 | Suermondt et al. | 706/48 |
| 7,266,559 B2 * | 9/2007 | Cook et al. | 1/1 |
| 7,379,867 B2 | 5/2008 | Chelba et al. | |
| 7,562,015 B2 | 7/2009 | Baker | |
| 7,562,017 B1 | 7/2009 | Hakkani-Tur et al. | |
| 7,574,358 B2 * | 8/2009 | Deligne et al. | 704/243 |
| 7,752,158 B2 | 7/2010 | Wookey | |
| 7,949,525 B2 | 5/2011 | Hakkani-Tur et al. | |
| 7,949,622 B2 | 5/2011 | Sellamanickam et al. | |

(Continued)

*Primary Examiner* — Aaron W Carter
(74) *Attorney, Agent, or Firm* — Foley & Lardner LLP

(57) ABSTRACT

A computer-implemented pattern recognition method, system and program product, the method comprising in one embodiment: creating electronically a linkage between a plurality of models within a classifier module within a pattern recognition system such that any one of said plurality of models may be selected as an active model in a recognition process; creating electronically a null hypothesis between at least one model of said plurality of linked models and at least a second model among said plurality of linked models; accumulating electronically evidence to accept or reject said null hypothesis until sufficient evidence is accumulated to reject said null hypothesis in favor of one of said plurality of linked models or until a stopping criterion is met; and transmitting at least a portion of the electronically accumulated evidence or a summary thereof to accept or reject said null hypothesis to a pattern classifier module.

26 Claims, 25 Drawing Sheets

U.S. PATENT DOCUMENTS

| | | |
|---|---|---|
| 8,014,591 B2 | 9/2011 | Baker |
| 8,180,147 B2 * | 5/2012 | Baker ........................... 382/159 |
| 2002/0103775 A1 | 8/2002 | Quass et al. |
| 2002/0122596 A1 | 9/2002 | Bradshaw |
| 2002/0159641 A1 * | 10/2002 | Whitney et al. ............... 382/219 |
| 2002/0159642 A1 * | 10/2002 | Whitney ....................... 382/225 |
| 2002/0164070 A1 * | 11/2002 | Kuhner et al. ................ 382/159 |
| 2002/0165839 A1 | 11/2002 | Taylor et al. |
| 2002/0181799 A1 | 12/2002 | Matsugu et al. |
| 2003/0055801 A1 | 3/2003 | Suermondt et al. |
| 2003/0110147 A1 * | 6/2003 | Li et al. ............................. 706/1 |
| 2004/0111419 A1 * | 6/2004 | Cook et al. .................... 707/100 |
| 2005/0102246 A1 | 5/2005 | Movellan et al. |
| 2006/0045337 A1 | 3/2006 | Shilman et al. |
| 2006/0047617 A1 | 3/2006 | Bacioiu et al. |
| 2006/0074827 A1 | 4/2006 | Heumann et al. |
| 2006/0143254 A1 | 6/2006 | Chen et al. |
| 2007/0239778 A1 | 10/2007 | Gallagher |
| 2008/0069437 A1 | 3/2008 | Baker |
| 2008/0071722 A1 | 3/2008 | Wookey |
| 2008/0082469 A1 | 4/2008 | Wilkinson et al. |
| 2008/0097936 A1 | 4/2008 | Schmidtler et al. |
| 2008/0140589 A1 | 6/2008 | Basu et al. |
| 2008/0235165 A1 | 9/2008 | Movellan et al. |
| 2009/0324060 A1 | 12/2009 | Sato et al. |
| 2010/0131274 A1 | 5/2010 | Stent et al. |
| 2010/0210975 A1 | 8/2010 | Anthony et al. |
| 2010/0312725 A1 | 12/2010 | Privault et al. |
| 2011/0051999 A1 * | 3/2011 | Tu et al. ....................... 382/103 |
| 2011/0299765 A1 * | 12/2011 | Baker ........................... 382/159 |
| 2012/0166183 A1 * | 6/2012 | Suendermann et al. .......... 704/9 |

* cited by examiner

ROBUST PATTERN RECOGNITION SYSTEM AND METHOD USING SOCRATIC AGENTS

CROSS-REFERENCE TO RELATED PATENT APPLICATIONS

This application is a divisional of U.S. patent application Ser. No. 13/208,069, filed Aug. 11, 2011, which is a divisional of U.S. patent application Ser. No. 11/898,636, filed Sep. 13, 2007, now U.S. Pat. No. 8,014,591, which claims priority from U.S. Provisional Patent Application Nos. 60/844,110, filed Sep. 13, 2006, and 60/853,031, filed Oct. 20, 2006. The contents of these applications are herein incorporated by reference in their entirety.

BACKGROUND

Although much progress has been made in pattern recognition systems, with the huge and rapidly growing amount of information that needs to be processed there is a need for further improvement, especially for systems that can handle a large quantity of data.

Finally, it is desirable in some embodiments to have a recognition system that is so robust that it can find and correct its own errors.

These objectives and others are addressed by the present invention.

SUMMARY OF THE INVENTION

This invention introduces the concept of Socratic knowledge, named after the ancient Greek philosopher, Socrates. In his defense speech at his trial Socrates stated that the only thing that he knew was that he didn't really know anything. Yet the Delphic oracle had said that Socrates was the wisest of the Greeks. Socratic knowledge is knowledge about knowledge. It is especially knowledge about the limitations of knowledge, which might be called "wisdom in the sense of Socrates."

If there are no mistakes in the processing and implementation of a pattern recognition system, the performance of the system is primarily determined by the knowledge contained in the system, however it might be represented. In a modern, complex recognition system there may be many separate bodies of knowledge. In particular, a complex recognition system may have many separate subsystems, each of which contains its own set of models to perform a particular pattern recognition task. Each such subsystem will be called a classifier module or a knowledge source. Non-Socratic classifier modules or knowledge sources contain knowledge about the patterns or classes being recognized. A Socratic agent contains knowledge about the knowledge contained in other modules. It is important to note that a Socratic agent is not a mere passive repository, but as it name implies, it is an active process of monitoring and measuring the performance of a lower-level module and of acquiring knowledge about the reliability of the knowledge contained in that module. The term "Socratic agent" is used generically to describe these higher-level modules that monitor lower-level modules. One specialized class of Socratic agents performs a process called delayed-decision testing, which will be described shortly. In another specialized case, a single higher-level Socratic module monitors and manages a whole collection of lower-level classifier modules. Such a higher-level module is a called a "Socratic controller." A Socratic controller also is an active process, not a mere passive body of knowledge.

Another key aspect of this invention is the concept of delayed-decision testing. One of the simplest forms of Socratic agent is a software agent that is dedicated to monitoring and performing delayed-decision testing of a single low-level decision. A complex system may have a large number of such simple delayed-decision Socratic agents active at once.

To take a specific example, consider the difficulty of distinguishing whether a given training sample is from an unknown component of a mixture distribution or is mislabeled and not from the distribution at all. Delayed-decision testing changes the question in an important but subtle way. Rather than trying to determine from the data itself which unknown distribution it might be from, the invention instead asks the more direct question, "Will training on this training sample with the given label improve the future performance of the system?" Although, just by measuring the training sample and comparing it to existing models, it would not be possible to know the future performance of the system, delayed-decision testing, as its name implies, delays the decision of whether to accept or skip a training sample until enough evidence has been accumulated about future performance (where "future" means the future in time relative to the time at which the training sample is available although it will no longer be the future by the time at which the decision is made). Preferably the decision is delayed until enough evidence has been accumulated to meet a specified level of statistical significance.

This "future" data is treated as practice data rather than training data. Specifically, it is used to gather knowledge about the knowledge and performance of the non-Socratic classifier module that is being trained rather than training knowledge about the pattern classes themselves. Thus, the practice data is used to acquire knowledge in a Socratic agent that is associated with the accept/reject decision for the particular training sample in question. Because there may be many such questionable training samples for a particular non-Socratic classifier module, there may be a large number of associated Socratic agents acting semi-autonomously as agents on behalf of making more robust the training of the particular non-Socratic classifier module. Because their decisions are based on statistically significant actual (future) performance, the technique is much more tolerant than non-Socratic training of errors in the labels of either the training data or the practice data. In fact, Socratic agents can even be used to correct the errors in labeling the training data. Furthermore, if a few mild assumptions are satisfied, the labels of both the training data and the practice data may be derived from automatic labeling.

Delayed-decision testing and Socratic agents may also be used to perform one-shot and structural learning. One-shot learning creates a new model from a single instance of the event being modeled. Non-Socratic training adjusts parameters in an existing set of models. Structural learning changes the structure, such as adding or deleting arcs and nodes in knowledge represented as a graphical structure. Because Socratic agents can make explicit discrete decisions, they can be used for one-shot and structural learning as well as to make non-Socratic training more robust.

A Socratic agent may use arbitrary methods to acquire knowledge about the knowledge of associated classifier modules. In particular, a Socratic agent is not limited to studying a single lower-level classifier module, but may model many at once. A Socratic agent that models a collection of related pattern classifiers and performs certain associated control and management functions is called a "Socratic controller."

In particular, because a Socratic controller can model the comparative performance and even the interactions among its collection of associated classifier modules, it can manage their joint training to be more effective than if each component classifier module is trained independently. In particular, the Socratic controller can manage the training to actively increase the diversity among the component classifier modules.

In another aspect of the invention, a Socratic controller can use its Socratic knowledge to better create a composite result from the individual results returned from its component classifier modules. It also can manage the component classifier modules more efficiently, choosing only a sparse subset of the component classifier modules to be active at any one time.

In other aspects of the invention, Socratic agents can practice non-determinism avoiding a decision by creating a new module for each alternative at a decision point, based on Socratic knowledge that indicates that the new modules will be complementary. Socratic controllers may then be used to manage the collection of modules that are created. A Socratic agent can also be used to test when an existing module in a collection of classifier modules should be deleted because it no longer contributes to incremental improvement in the performance of the collection of modules, given the redundancy with the other classifier modules in the collection.

In another aspect of the invention, knowledge may be shared among classifier modules. Knowledge or even whole modules may be shared among systems in a collection of cooperating systems. With shared knowledge there is always an issue of whether the knowledge will work in a new environment and especially whether it will make an incremental contribution in the context of all the other knowledge that is available in the new environment. The candidate shared knowledge will only be adopted if it improves performance at a statistically significant level, as may be tested by a Socratic agent.

In another aspect of the invention, with the creation and sharing of new knowledge a collection of cooperating recognition systems may be managed as a population of systems, continually evolving and improving.

In another aspect of the invention, a system may be designed to correct its own errors. This aspect is an extension of the method by which a Socratic agent can correct the errors in the designated training data. This process may operate on training data that has been labeled automatically by running the recognition process. Therefore, interchanging the roles, the output of the regular recognition process may be designated as automatically labeled training data. Delayed-decision training is performed on this designated training data with feedback of validated or corrected labels. Switching the roles back again, the validated or corrected labels may then be used as the final, improved recognition output.

This validation by delayed-decision training introduces a substantial delay into the recognition process. This delay may be reduced and the system made more cost effective by another aspect of the invention. In this aspect many streams of data are recognized at the same time by a distributed system of computers with specialized classifier modules located on particular computers rather than copied throughout the system. With many streams being recognized at once there is much more data to accumulate evidence for every active Socratic agent. Thus the time for each Socratic agent to accumulate enough evidence to be statistically significant is proportionately reduced.

Briefly, in one embodiment, a computer-implemented pattern recognition method is provided, comprising: creating electronically a linkage between a plurality of models within a classifier module within a pattern recognition system such that any one of said plurality of models may be selected as an active model in a recognition process; creating electronically a null hypothesis between at least one model of said plurality of linked models and at least a second model among said plurality of linked models; accumulating electronically evidence to accept or reject said null hypothesis until sufficient evidence is accumulated to reject said null hypothesis in favor of one of said plurality of linked models or until a stopping criterion is met; and transmitting at least a portion of the electronically accumulated evidence or a summary thereof to accept or reject said null hypothesis to a pattern classifier module.

In another embodiment, the method further comprises: subsequently performing recognition in which, when one null hypothesis is rejected in favor of a particular one of said plurality of linked models, said particular model is selected as the active model in said classifier module.

In a yet further embodiment, the method comprises: obtaining a set of training data for training said classifier module; obtaining a particular training sample for said classifier module and an associated label for said training sample; creating a first model for said classifier module by training said classifier module on said set of training data not including said particular training sample; creating a second model for said classifier module by training said classifier module on said set of training data including said particular training sample; and creating said linkage of said plurality of models in which said plurality of models includes at least said first model and said second model.

In a yet further embodiment, the method comprises: annotating said particular training sample with the information obtained from said accumulating of evidence to accept or reject said null hypothesis.

In a yet further embodiment, the method comprises: performing subsequent training skipping training samples and training with changed labels on the training samples in accord with the annotation obtained from said accumulation of evidence to accept or reject said null hypothesis.

In a yet further embodiment, the method comprises: obtaining a plurality of models resulting from different decisions at a decision point; and creating said linkage among the plurality of models resulting from the decision point.

In a yet further embodiment, the method comprises: obtaining a plurality of models differing from each other by having a differing number of elements in a given model data structure; creating said linkage among the plurality of models having the differing number of elements in the given data structure; creating electronically a null hypothesis between at least one model of said plurality of linked models and at least a second model among said plurality of linked models; accumulating electronically evidence to accept or reject said null hypothesis until sufficient evidence is accumulated to reject said null hypothesis in favor of one of said plurality of linked models where the rejection criterion is based at least in part on a measure of the marginal cost for the differing number elements or until a stopping criterion is met; and transmitting at least a portion of the electronically accumulated evidence or a summary thereof to accept or reject said null hypothesis to a pattern classifier module.

In a yet further embodiment, the given data structure is a collection of lower-level models and the elements that differ in number are the lower-level models.

In a yet further embodiment, the method comprises creating at least one lower-level model by one-shot learning, and wherein the lower-level models differ in number at least in part due to the models created by one-shot learning.

In a yet further embodiment, the given data structure is a graphical structure and the elements that differ in number are arcs and nodes.

In another embodiment, a computer-implemented method of pattern recognition is provided comprising: obtaining classification results of a plurality electronic lower level classifier modules performing pattern classification on particular input data; using a higher-level classifier module which performs pattern classification on a pattern recognition problem different from the plurality of lower-level classifier modules, wherein said higher-level classifier module performs at least one of the following operations: controlling training of the plurality of lower-level classifier modules; combining the results of the plurality of lower-level classifier modules based at in part on combining rules that vary based on the particular input data; and selecting an active subset of the plurality of lower-level classifier modules based at least in part on a pattern classification task performed by the higher-level classifier module.

In a further embodiment, the higher-level classifier module controls the training of the plurality of lower-level classifier modules based at least in part on data that is not available to any one of the lower-level classifier modules.

In a yet further embodiment, the higher-level classifier module combines the results of the plurality of lower-level classifier modules based at least in part on combining rules that vary based on the particular input data and that use data not available to any one of the plurality of lower-level modules.

In a yet further embodiment, the higher-level classifier module selects an active subset of the lower-level modules during pattern recognition based at least in part on a pattern classification task that estimates reliability of the classification results obtained or to be obtained by the lower-level classifier modules wherein the higher-level classifier module estimates the reliability of the classification results of the plurality of lower-level classifier modules at least in part based on data not available to any one lower-level classifier module.

In a yet further embodiment, for a given training sample the higher-level classifier module selects an active subset of the plurality of lower-level classifier module to be trained on the given training sample based at least in part on the higher-level module performing a pattern classification to estimate which of the plurality of lower-level classifiers will most improve a specified performance measure by being trained on the given training sample.

In another embodiment, a computer-implemented method of sharing knowledge among a plurality of pattern classifiers is provided, comprising: obtaining a plurality of classifier modules including a first classifier module; obtaining a communicable model that is either a new model or a model that has been modified by a knowledge acquisition process in the first classifier module; transmitting said communicable model to at least a second classifier module in the plurality of classifier modules; creating a pair of model sets for said second classifier module in which one member of the pair of model sets is an unmodified model set for the second classifier module and one member of the pair of model sets is a modified model set that includes the communicable model; testing comparative performance of the pair of model sets in said second classifier module; and making the modified model set active in the second classifier module if the modified model set performs better in said second classifier module.

In a yet another embodiment, the method further comprises transmitting to the first classifier module information obtained from said testing of the pair of model sets in said second classifier module.

In a yet further embodiment, the method comprises transmitting said communicable model to at least a third classifier module in the plurality of classifier modules, where the communicable model has not yet been transmitted to said third classifier module; creating a pair of model sets for said third classifier module in which one member of the pair of model sets is an unmodified model set for the third classifier module and one member of the pair of model sets is a modified model set that includes the communicable model; testing comparative performance of the pair of model sets in said second classifier module; and making the modified model set electronically active in the second classifier module if the modified model set performs better in said second classifier module.

In a yet further embodiment, the method comprises: creating software associated with a model or set of models to be transmitted from a first classifier module to a second classifier module allowing said model or set of models to be utilized in the context of said second classifier; and transmitted to said second classifier module a module comprising the model or set of models to be transmitted and the associated software.

In a yet further embodiment, the plurality of classifiers are distributed among a plurality of recognition systems, further comprising: creating at least one new recognition system that has different subsets of classifier modules from among the plurality of classifier modules to thereby obtain an expanded set of recognition systems; measuring comparative performance of the expanded set of recognition systems; and deleting at least one recognition system from the set of recognition systems based on the measurement of comparative performance.

In another embodiment, a computer-implemented multi-stage pattern recognition method is provided, comprising: obtaining a sample of data to be recognized; obtaining a plurality of labels for the given sample from a set of one or more recognition systems; creating a set of linked model sets for at least one of the one or more recognition systems based on training said at least one recognition system on the sample of data wherein each model in the set of linked models is created by training on the given sample with a training label comprising a particular one of the plurality of labels obtained for the given sample; obtaining a set of practice data; testing comparative performance of the linked model sets on the practice data; correcting the label on the given data sample to agree with the label associated with model from the linked set of models that performs best in the comparative performance testing on the practice data; and returning a corrected the label as corrected as the final recognition result of the multi-stage recognition process.

In a yet further embodiment, the method comprises: obtaining a plurality of streams of data to be recognized; obtaining a plurality of labels for at least one given sample of data from the plurality of streams from the recognition results of at least one recognition system; creating at least one set of linked models for the at least one recognition system based on training said at least one recognition system on the at least one given sample of data wherein each model in the set of linked models is created by training on the given sample with a training label that comprises a particular one of the plurality of labels obtained for the given sample; obtain practice data from the plurality of streams of data; performing comparative performance testing of the linked model sets on the plurality of streams of data to be recognized; accumulating the comparative performance measurements across the plurality of data streams to be recognized; and reporting as the final recognition result for the at least one given sample of data the label value corresponding to the model in the linked set of model that performed best in the accumulated performance measurements.

In another embodiment, a computer-implemented pattern recognition method is provided, comprising: creating electronically a linkage between a plurality of models within a classifier module within a pattern recognition system such that any one of said plurality of models may be selected as the active model in the recognition process; collecting evidence of a degree of comparative performance of the plurality of linked models including estimates of a degree to which errors made by each two of the linked models are diverse; creating a plurality of classifier modules by selecting for each created classifier module a different model from the plurality of linked models based at least in part on evidence of the pairwise diversity of the errors made by the linked models.

In a further embodiment, the method comprises creating a plurality of systems each comprising a plurality of the classifier modules each comprising a different subset of the plurality of created classifier modules; collecting electronically evidence of the comparative performance of the plurality of classifier modules; and discarding at least one of the plurality of created classifier modules based at least in part on the collected evidence of comparative performance.

In another embodiment, a system for pattern recognition is provided, comprising: one or more processors that include among them the following components: a component for creating electronically a linkage between a plurality of models within a classifier module within a pattern recognition system such that any one of said plurality of models may be selected as an active model in a recognition process; a component for creating electronically a null hypothesis between at least one model of said plurality of linked models and at least a second model among said plurality of linked models; a component for accumulating electronically evidence to accept or reject said null hypothesis until sufficient evidence is accumulated to reject said null hypothesis in favor of one of said plurality of linked models or until a stopping criterion is met; and a component for transmitting at least a portion of the electronically accumulated evidence or a summary thereof to accept or reject said null hypothesis to a pattern classifier module.

In another embodiment, a program product for computer-implemented pattern recognition is provided, comprising: one or more computer usable media having computer readable program code embodied therein or among them if more than one computer usable medium, to be executed by a computer, the computer readable program code comprising: creating electronically a linkage between a plurality of models within a classifier module within a pattern recognition system such that any one of said plurality of models may be selected as an active model in a recognition process; creating electronically a null hypothesis between at least one model of said plurality of linked models and at least a second model among said plurality of linked models; accumulating electronically evidence to accept or reject said null hypothesis until sufficient evidence is accumulated to reject said null hypothesis in favor of one of said plurality of linked models or until a stopping criterion is met; and transmitting at least a portion of the electronically accumulated evidence or a summary thereof to accept or reject said null hypothesis to a pattern classifier module.

In another embodiment, a system for pattern recognition is provided comprising: one or more processors that include among them the following components: a component for obtaining classification results of a plurality electronic lower level classifier modules performing pattern classification on particular input data; a component for using a higher-level classifier module which performs pattern classification on a pattern recognition problem different from the plurality of lower-level classifier modules, wherein said higher-level classifier module performs at least one of the following operations: controlling training of the plurality of lower-level classifier modules; combining the results of the plurality of lower-level classifier modules based at in part on combining rules that vary based on the particular input data; and selecting an active subset of the plurality of lower-level classifier modules based at least in part on a pattern classification task performed by the higher-level classifier module.

In another embodiment, a program product for computer-implemented pattern recognition is provided comprising: one or more computer usable media having computer readable program code embodied therein or among them if more than one computer usable medium, to be executed by a computer, the computer readable program code comprising: program code for obtaining classification results of a plurality electronic lower level classifier modules performing pattern classification on particular input data; program code for using a higher-level classifier module which performs pattern classification on a pattern recognition problem different from the plurality of lower-level classifier modules, wherein said higher-level classifier module performs at least one of the following operations: controlling training of the plurality of lower-level classifier modules; combining the results of the plurality of lower-level classifier modules based at in part on combining rules that vary based on the particular input data; and selecting an active subset of the plurality of lower-level classifier modules based at least in part on a pattern classification task performed by the higher-level classifier module.

In another embodiment, a system for sharing knowledge among a plurality of pattern classifiers is provided, comprising: one or more processors that include among them the following components: a component for obtaining a plurality of classifier modules including a first classifier module; a component for obtaining a communicable model that is either a new model or a model that has been modified by a knowledge acquisition process in the first classifier module; a component for transmitting said communicable model to at least a second classifier module in the plurality of classifier modules; a component for creating a pair of model sets for said second classifier module in which one member of the pair of model sets is an unmodified model set for the second classifier module and one member of the pair of model sets is a modified model set that includes the communicable model; a component for testing comparative performance of the pair of model sets in said second classifier module; and a component for making the modified model set active in the second classifier module if the modified model set performs better in said second classifier module.

In another embodiment, a program product for computer-implemented sharing of knowledge among a plurality of pattern classifiers is provided, comprising: one or more computer usable media having computer readable program code embodied therein or among them if more than one computer usable medium, to be executed by a computer, the computer readable program code comprising: program code for obtaining a plurality of classifier modules including a first classifier module; program code for obtaining a communicable model that is either a new model or a model that has been modified by a knowledge acquisition process in the first classifier module; program code for transmitting said communicable model to at least a second classifier module in the plurality of classifier modules; program code for creating a pair of model sets for said second classifier module in which one member of the pair of model sets is an unmodified model set for the second classifier module and one member of the pair of model sets is a modified model set that includes the communicable model; program code for testing comparative performance of the pair of model sets in said second classifier module; and program code for making the modified model set active in the second classifier module if the modified model set performs better in said second classifier module.

In another embodiment, a system for multi-stage pattern recognition is provided, comprising: one or more processors that include among them the following components: a component for obtaining a sample of data to be recognized; a component for obtaining a plurality of labels for the given sample from a set of one or more recognition systems; a component for creating a set of linked model sets for at least one of the one or more recognition systems based on training said at least one recognition system on the sample of data wherein each model in the set of linked models is created by training on the given sample with a training label comprising a particular one of the plurality of labels obtained for the given sample; a component for obtaining a set of practice data; a component for testing comparative performance of the linked model sets on the practice data; a component for correcting the label on the given data sample to agree with the label associated with model from the linked set of models that performs best in the comparative performance testing on the practice data; and a component for returning a corrected label as corrected as the final recognition result of the multi-stage recognition process.

In another embodiment, a program product for computer-implemented multi-stage pattern recognition is provided, comprising: one or more computer usable media having computer readable program code embodied therein or among them if more than one computer usable medium, to be executed by a computer, the computer readable program code comprising: program code for obtaining a sample of data to be recognized; program code for obtaining a plurality of labels for the given sample from a set of one or more recognition systems; program code for creating a set of linked model sets for at least one of the one or more recognition systems based on training said at least one recognition system on the sample of data wherein each model in the set of linked models is created by training on the given sample with a training label comprising a particular one of the plurality of labels obtained for the given sample; program code for obtaining a set of practice data; program code for testing comparative performance of the linked model sets on the practice data; program code for correcting the label on the given data sample to agree with the label associated with model from the linked set of models that performs best in the comparative performance testing on the practice data; and program code for returning a corrected label as corrected as the final recognition result of the multi-stage recognition process.

In another embodiment, a system for pattern recognition is provided, comprising: one or more processors that include among them the following components: a component for creating electronically a linkage between a plurality of models within a classifier module within a pattern recognition system such that any one of said plurality of models may be selected as the active model in the recognition process; a component for collecting evidence of a degree of comparative performance of the plurality of linked models including estimates of a degree to which errors made by each two of the linked models are diverse; and a component for creating a plurality of classifier modules by selecting for each created classifier module a different model from the plurality of linked models based at least in part on evidence of the pair-wise diversity of the errors made by the linked models.

In another embodiment, a program product for computer-implemented pattern recognition is provided, comprising: one or more computer usable media having computer readable program code embodied therein or among them if more than one computer usable medium, to be executed by a computer, the computer readable program code comprising: program code for creating electronically a linkage between a plurality of models within a classifier module within a pattern recognition system such that any one of said plurality of models may be selected as the active model in the recognition process; program code for collecting evidence of a degree of comparative performance of the plurality of linked models including estimates of a degree to which errors made by each two of the linked models are diverse; and program code for creating a plurality of classifier modules by selecting for each created classifier module a different model from the plurality of linked models based at least in part on evidence of the pair-wise diversity of the errors made by the linked models.

BRIEF DESCRIPTION OF THE DRAWINGS

The invention will be described by reference to the following Figures and diagrams.

DETAILED DESCRIPTION OF THE EMBODIMENTS

Figure 1:
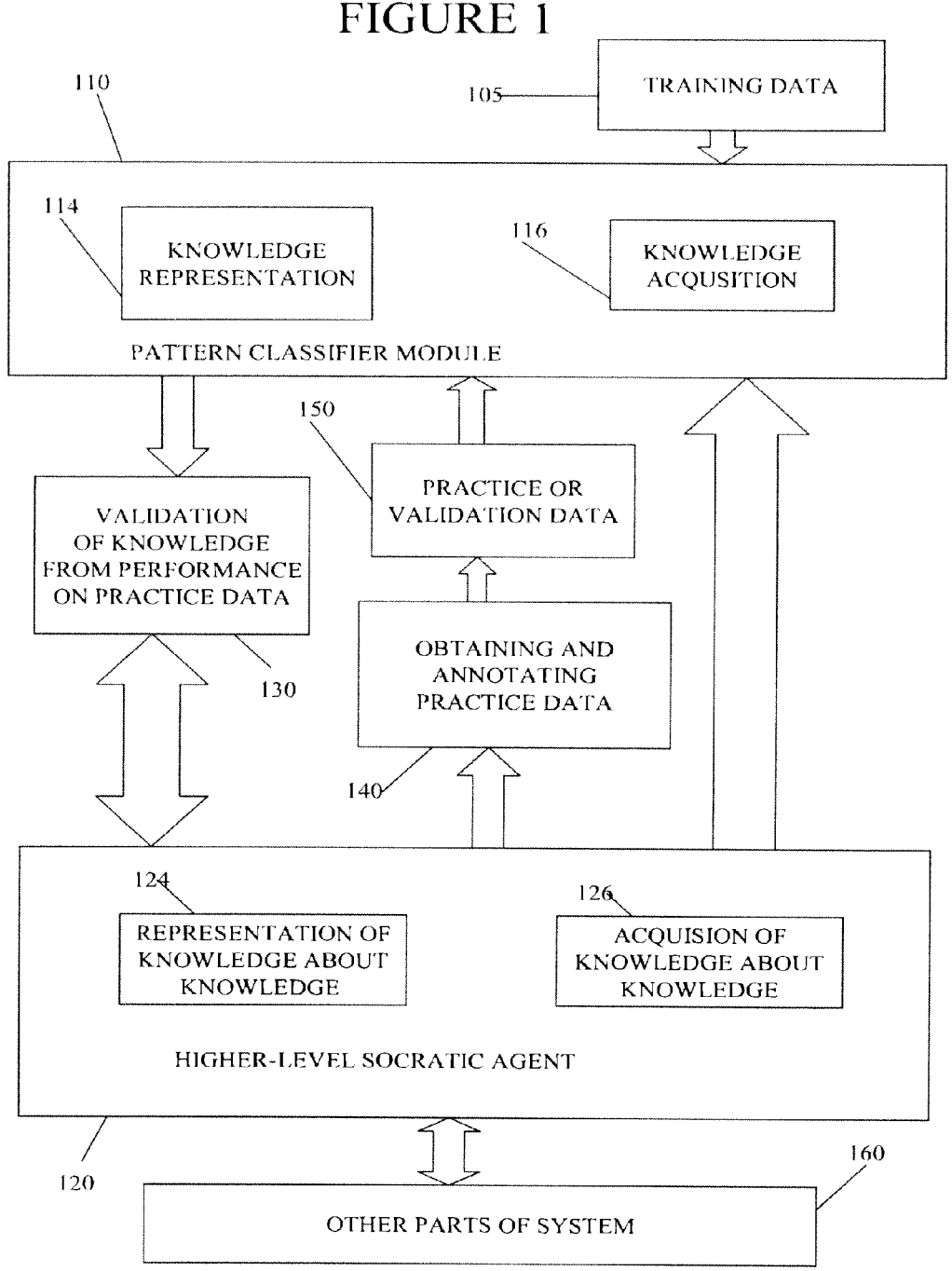
FIG. 1 is a block diagram of a higher level Socratic agent acquiring knowledge about and controlling an associated lower-level classifier module.

Explanation of Special Terms:

A knowledge source is an object that includes a mechanism for knowledge representation and either a mechanism for knowledge acquisition or a collection of built-in base knowledge or both.

A classifier module is a processing module that receives samples of data features as input and generates classification results as output. The classification results may, for example, comprises an indication of the class best matching the input data or may comprises a score for each class indicating how well the data matches the given class. Implicitly, any pattern classifier has a representation of knowledge about the class it identifies. Generally, a classifier module is trainable and hence has a mechanism for knowledge acquisition. Therefore, any pattern classifier is a kind of knowledge source. It is to be understood that a classifier module is not necessarily implemented as a separate software module or as a separate piece of hardware. A single software module may implement a plurality of classifier modules. A single software module may also implement one or more lower-level modules as well as a higher-level module. In particular, a Socratic controller, which comprises a higher-level classifier module associated with a plurality of lower-level classifier modules may be implemented as either a single software module or as a plurality of software modules.

In its simplest form a classifier module chooses which of a finite number of pattern classes best matches a given data sample that is to be recognized. However, the phrase "classifier module" is intended to be interpreted very broadly, and the phrase "classification results" is intended to cover other forms of output. For example, in a system recognizing text or speech, a processing module that represents knowledge about likelihoods of word sequences is to be considered a kind of classifier module. In a typical embodiment, the output of such a module would be represented as a probability distribution of possible continuation words, conditional on the context of the history of preceding words.

In isolation, the verbs "classify" and "recognize" are essentially synonyms, as are the nouns "classifier" and "recognizer" However, in this document "classifier" will generally be used in the context of the phrase "classifier module," while the morpheme "recognize" will generally be used in a phrase such as "recognition system." A "classifier module" is one module within a recognition system. A recognition system is a complete stand-alone system, possibly including modules to do other tasks as well as one or more classifier modules.

Although a recognition system may have only one classifier module, it may be easier to understand the example embodiments if any reference to a "recognition system" is visualized as a complex system that may have many "classifier modules" as subsystems.

A model in a classifier module is a collection of data structures and data and parameter values by which a classifier module characterizes one or more patterns to be classified. There is some variation of usage as to whether a particular collection of knowledge is referred to as a "set of models" (that is, as a plural) or as a "model" (singular). For example, in an optical character recognition system, there might be a separate model representing each character. So the knowledge about the images of the characters might be considered to be a set of models. However, the recognition system might also represent knowledge about word sequences as information to help resolve ambiguities and correct error in the low level character recognition. Such knowledge about word sequences is often represented within a single integrated data structure and referred to as a "language model" rather than as a set of models of different word sequences. For purposes of this document, the word "model" is to be given the broadest interpretation. The term "model" may be used to refer to a single simple model, such as a model for a single character, or it may refer to a more complex modeling structure, such as a language model, or it may refer to a composite model that is composed of a number of individual component models, such as the word pronunciations in a dictionary. In the context of sharing knowledge among systems, the phrase "transmitting a model" from one system to another system may refer to transmitting any of these forms of model and may also refer to a process that includes encapsulating the model (which may be a composite set of models) in a module, including processing software, and transmitting the module as a package.

A communicable model is a model that is communicable from a first classifier module to a second classifier module. There are at least three cases in which a model is communicable. In the first case there is a corresponding model in the second classifier module such that the model in the first classifier may be treated as a modified version of the corresponding model in the second classifier module. In the second case the communicable module is a new model. A new model is communicable if it is a member of a model set in the first classifier module for which there is a corresponding model set in the second classifier module and the second classifier module is capable of accepting additions to that corresponding model set. The third case is when a model is encapsulated in a module with processing software that facilitates the usage of the model in a new context in a different system. In this case, as mentioned earlier, the entire module is transmitted.

A communicable module is a classifier module that contains a communicable model or set of models. The communicable module may include processing software specifically to help make the model or set of models communicable to a new system.

Structural change in a classifier module or knowledge source is the addition or deletion of an object in a collection related models or of an element in a data structure. Most training of pattern classifiers merely adjusts the values of parameters that control the behavior of the classifier and do not make any structural changes. In a knowledge repository, such as a dictionary, if changes are made at all, they tend to be structural changes. For example, in a pronunciation dictionary a word may added or deleted or a pronunciation may be added or deleted to a particular word. Even substituting a new pronunciation for an old pronunciation would generally be regarded as a structural change rather than merely adjustment of parameters. Advanced learning algorithms can also automatically learn new structure for pattern classifiers.

As an illustrative example, consider an acoustic model for a syllable in a speech recognition system. In one embodiment, the acoustic model for a syllable may be represented as a graph. More specifically, it may be represented as a labeled directed graph. Such a graph consists of a set of nodes and an associated set of arcs. In general each arc in a graph connects a pair of nodes. In a directed graph, the arc has direction. It points from the first node in its associated pair of nodes to the second node. In an acoustic model in a speech recognition system, there are labels on either the nodes or the arcs of the directed graph. The labels identify short units of sound. In one embodiment, each node is labeled with an identifier for a short, relatively steady-state sound (not changing much over its short time interval). The nodes in the graph for a particular syllable represent the sounds that might occur in an instance of the syllable. The arcs represent the transitions between the relatively steady-state sounds. In one embodiment, there is a designated node representing the beginning of the syllable and a designated node representing the end of the syllable. Any particular instance of the syllable is represented by a sequence of nodes and arcs that constitutes a path through the graph from the designated beginning node to the designated ending node. Such a path will not necessarily pass through every node in the graph, representing the fact that in a given instance of a syllable not necessarily does every possible sound occur. More complicated graphs may be used to represent additional properties of the acoustic model, such as associated probability distributions and the influence of the context on how a syllable is likely to be pronounced.

In this illustrative example, learning structural change in the acoustic model for a particular syllable would be represented by the addition or deletion of nodes or arcs to the graph or by changing labels in the graph. Learning the probability distributions associated with the graph would be regarded as training parameter values, and not as structural learning.

A Socratic agent is a higher-level classifier module that contains knowledge about the knowledge of at least one other classifier module. Furthermore, as a classifier module and not a mere knowledge repository, it has active mechanisms for acquiring, evaluating and utilizing this knowledge about knowledge. It is to be understood that as Socratic agent represents knowledge about knowledge, the term "classifier module" is to be interpreted in the broadest possible sense. For example, one embodiment of a Socratic agent creates a null hypothesis relative to the comparative performance of one or more models in the at least one other classifier module. Collecting evidence to accept or reject the null hypothesis is to be understood as a classification task even though it does not directly classify the patterns classified by the other classifier module, but rather makes a performance-based classification of versions of the models in the other at least one classifier module. A Socratic agent is named after the ancient Greek philosopher Socrates, who said in his defense speech at his trial, "The only thing that I know is that I don't really know anything." Generally, a Socratic agent has data or knowledge that is not available to its associated lower-level modules.

A non-Socratic classifier module is any classifier module that is not a Socratic agent.

A Socratic controller is a Socratic agent that has a plurality of associated lower-level classifier modules and that performs higher-level pattern classification predicting patterns of comparative behavior of the associated lower-level classifier modules. Generally the lower-level classifier modules are non-Socratic classifier modules, but in a hierarchical system they may be Socratic agents. Typically, a Socratic controller will also manage the joint training of the collection of associated lower-level modules, and will manage the process of computing a composite result during recognition. Where the invention is described in terms of an embodiment as a collection of modules, the embodiment as modules is to be understood as a description of functionality, regardless of whether implemented in hardware or software and regardless of whether the hardware or software is organized to into units that are designated as "modules." For example, one embodiment of a Socratic agent is to combine the processing code for collecting evidence for accepting or rejecting a null hypothesis with the code for the pattern classification in the lower-level module. Regardless of the organization of implementing software into one or more functions, procedures, subroutines and stand-alone programs, the embodiment of the higher-level task of a Socratic agent is to be regarded as functionally a higher-level classifier module and as an instance of a Socratic agent. As another example, a Socratic controller is associated with a plurality of lower-level classifier modules.

In one embodiment, the plurality of lower-level classifier modules may be implemented as a single body of code that controls a plurality of classifiers. This embodiment is to be regarded as a plurality of classifier modules regardless of the organization of the software into one or more functions, procedures, subroutines or stand-alone programs.

The phrases "higher-level" classifier module and "lower-level" classifier module are relative terms. A recognition system may have many levels. As a simplified illustrative example, consider a recognition system with only three levels, a "low" level, an "intermediate" level, and a "high" level. In this example, the terms "low," "intermediate" and "high" are absolute designations for their respective levels. However, a classifier module in the intermediate level may be a higher-level classifier relative to one or more low level modules. The same intermediate level classifier module may be a lower-level classifier relative to a particular high level module.

In a broader context, any of several possible relationships might determine that two particular classifier modules have the relationship that one is a lower-level classifier relative to the other, which is a higher-level classifier. For example, in a multi-level optical character recognition system the relationship could be based on the length of unit being classified, with classifiers of single characters being at a lower level than classifiers of words.

In this document, particularly in discussing Socratic controllers, the relationship of a lower-level classifier to an associated higher-level classifier indicates a more specific kind of relationship. In particular, if one classifier module sends its classification results as input to a second classifier, the first classifier is a lower-level classifier relative to the second, higher-level classifier. A second classifier is also regard as a higher-level classifier if it actively controls either the training or the recognition process of a first, lower level process. The second classifier is regarded as actively controlling the first if it sends commands to the first classifier. It is regarded merely as influence, not control, if one classifier sends data as input to another classifier, even if the data affects the classification decision of the second classifier. Finally, a second classifier is a higher-level classifier if its classification task is to model the behavior of the lower-level classifier, as one embodiment of a Socratic controller may do for its associated lower-level classifiers.

Delayed-decision testing is comparative performance testing by a Socratic agent in which the decision is delayed so that the Socratic agent can measure future comparative performance.

Delayed-decision training is delayed decision testing by a Socratic agent with an associated lower-level classifier module, testing the hypothesis that performance of the lower-level classifier module will improve if it is trained on a particular training sample with its associated label or labels. Delayed-decision training is designed to improve the robustness over non-Socratic training and to make it more tolerant of labeling errors in the training data.

A linked-model allele is a group of two or more alternate sets of models created by a Socratic agent for delayed-decision testing or delayed-decision training In one embodiment, the allele has only two alternate sets of models and may also be called a paired-model allele. In delayed-decision testing or training, typically only one member of the allele is active in the standard recognition process. When the active allele member makes a contribution to the recognition decision on a particular test item, the recognition computation is redone with other members of the allele to determine is there is a performance difference on that test item. If so, the Socratic agent accumulates evidence of the comparative performance.

A related classifier module group is the collection of lower-level classifier modules managed by a particular Socratic controller.

The invention is described below with reference to drawings. These drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hard-wired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention will be described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

Figure 25:
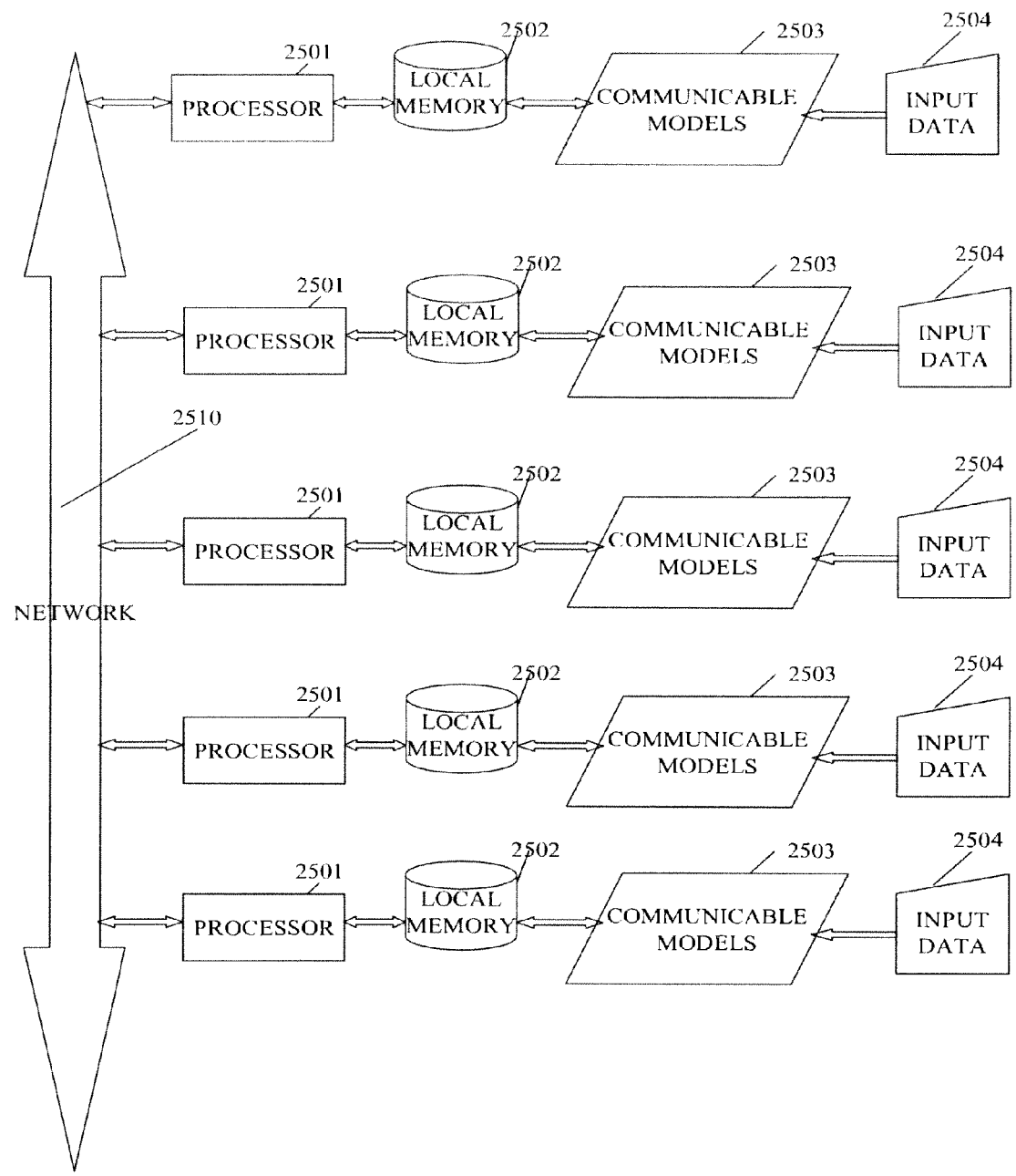
FIG. 25, a block diagram illustrating a computer network for implementing some aspects of some embodiments of the invention.

An exemplary system for implementing the overall system or portions of the invention is shown in FIG. 25. This exemplary system include a plurality of general purpose computing devices and memory storage. By way of example, each computing device could include a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Referring now to FIG. 1, there is shown one embodiment of an aspect of the invention, showing the relationship between a particular classifier module and a particular associated higher-level Socratic agent that represents and acquires knowledge about the first classifier module.

A complex pattern recognition system may have many sources of knowledge. For example, a speech recognition system must have knowledge about the sounds of the language being recognized. Thus, there would be a knowledge source comprising a collection of acoustic models. The system would also need to have knowledge about which words are more likely to occur in given contexts. The system would have some kind of language modeling, with one or more knowledge sources based on syntax, semantics or simply word n-gram frequencies. There would also need to be a knowledge source, like a pronunciation dictionary, associating each word with one or more sounds sequences.

Each such knowledge source within a complex pattern recognition system may be studied separately. It may be treated as a semi-autonomous module, allowing it to be trained and controlled either as a stand-alone unit or as one module in a multi-module system. As illustrated in FIG. 1, this invention introduces the concept of a Socratic agent that represents and acquires knowledge about the performance of a particular knowledge source or classifier module. In a sense, this Socratic agent acquires "knowledge about knowledge." However, the "knowledge" in this case will not be some philosophical abstraction, but will be specific data structures and parameter values in models and processes used by a classifier module to recognize the patterns that it classifies. The knowledge represented by the Socratic agent will be specific data structures and parameters values derived from specific statistical tests as well as recognition of higher-level patterns.

In normal training of a pattern recognition system, only the training data, block 105, and the classifier module, block 110, are present. The classifier module represents the knowledge in the form of one or more models with adjustable parameters. In normal training, the knowledge acquisition comprises adjusting the parameters of the models to optimize a specified objective. In maximum likelihood training, for example, the parameters in the model are adjusted to values which maximize the likelihood of the models generating the observed training data.

Some embodiments of the invention provide an extra level of knowledge representation and knowledge acquisition, represented by a Socratic agent block 120. Socratic agent block 120 represents knowledge not directly about the patterns being recognized by the classifier module of block 110, but rather represents knowledge about the patterns of performance of the classifier module of block 110. Thus, the knowledge represented in block 120 is knowledge about knowledge or Socratic knowledge. The form of the Socratic knowledge in block 120 is not limiting on the invention. In one embodiment, the Socratic knowledge may take the form of the Socratic agent 120 learning whether a given model in a normal classifier module yields better or worse performance results as compared to a modified model.

Block 120 provides several capabilities that would be outside the scope of the non-Socratic classifier module of block 110. In particular, the Socratic knowledge of block 120 interacts with modules from other parts of the overall pattern recognition system, as represented in block 130. Because block 120 represents knowledge about the classifier module 110 rather than the pattern knowledge itself, it interacts with other modules at a more abstract level. By representing Socratic knowledge, block 120 is able to interact with a heterogeneous collection of other modules that use methodologies that may be completely different from the knowledge representation that is used in block 110.

In one embodiment, block 120 represents and acquires knowledge about the limitations of the knowledge of block 110. For example, it uses techniques and information outside the scope of block 110 to learn when the results computed by block 110 are less reliable. That is, the Socratic agent 120 measures the performance of classifier module 110. There is an analogy to the philosopher Socrates, who tested the knowledge of other Greek philosophers as well as questioning his own knowledge.

In one embodiment, the Socratic agent 120 acquires knowledge about the knowledge of block 110 by measuring its performance on a set of practice or validation data 150. In non-Socratic pattern recognition training, each sample of the training data 105 is labeled with what is believed to be the correct label for each sample in the training data 105. For most training methodologies, it is not necessary to run a recognition process on the training data. However, for certain types of training, a recognition process is run on the training data. For example, in corrective training, a recognition process is run and the parameters of the models are adjusted to help correct the errors by improving the scores of the correct label when there is an error or by making the incorrect best-scoring label get a worse score.

Sometimes a separate set of data, practice or validation data 150, is set aside, not to be used for training even though, like training data, the samples are labeled with what are assumed to be correct labels. Typically, in non-Socratic systems the practice data is used to create development test sets. That is, recognition is run on the practice data as if it were unknown test data. Because the labels are actually known, the test can be scored automatically to give a preliminary measure of the performance of the system while it is still under development. Because the developers of the system may modify the system based on the results of the development test, the practice data can never again be used as a true, independent test, which is why separate practice data must be set aside.

For non-Socratic training or development test, it is important that the labels in the training data or the development test data be as accurate as possible. In the present invention, the practice data 150 is used in a very different way. The present invention is very tolerant of errors in the labeling of both the practice data 150 and the training data 105. As will be explained in more detail in relation to other Figures, the Socratic agent 120 uses the practice data 150 to acquire Socratic knowledge, that is particular knowledge about the performance of the classifier module 110. Among other things, this Socratic knowledge can be used to validate the labeling in the training data 105 and even to correct errors in the labeling of the training data.

As in any classifier module, there are two main aspects of the Socratic agent 120, knowledge representation 124 and knowledge acquisition 126 (respectively 114 and 116 in the generic classifier module 110). In the Socratic agent 120, block 124 represents knowledge about the knowledge of the lower-level classifier module 110 and about the credibility and reliability of that knowledge. Other Figures will illustrate several examples of different forms of representation of such knowledge. To understand the process shown in FIG. 1, a particular example will be explained. In this example, the Socratic agent 120 represents knowledge about the knowledge of classifier module 110 in the form of statistical measures of the performance of binary alternatives within the structure or models of classifier module 110. The two sets of models corresponding to the two alternatives are called a paired-model allele.

For each such paired-model binary alternative, Socratic agent 120 of the illustrative example forms a null hypothesis and accumulates statistical evidence to accept or reject that null hypothesis. Such a null hypothesis is also called a Socratic hypothesis and the Socratic agent 120 may be called a paired-model Socratic agent. The null hypothesis states that the average performance of classifier module 110, according to some specified objective function, will be the same for either of the two alternatives. As a concrete example, the two alternatives could be to accept or reject the given label for a particular sample in the training data 105. If Socratic agent 120 successfully rejects an incorrect label in the training data 105, the labeling error can be corrected.

Higher-level Socratic agent 120 controls block 140 to obtain and annotate practice data that will be used to accumulate statistics to successfully accept or reject a null hypothesis such as described above. Typically, labeling or annotation of training data or practice data is done manually by human labor, and may be very expensive if a large amount of data is to be used. The present invention is much more tolerant of labeling errors in the practice data and can use less expensive methods for acquiring the practice data. For example, automatic labeling may be used to label the practice data. As will be explained in more detail in relation to other Figures, the automatic labeling can use the recognition process for which the classifier module 110 is being trained, if that overall recognition process is a multiple classifier module process with one or more other sources of knowledge that are complementary to knowledge in classifier module 110. For example, in a speech recognition system in which classifier module 110 is acquiring knowledge about acoustic models for individual sounds, a complementary knowledge source would be a language model with knowledge about the relative likelihood of different word sequences. Similarly, if classifier module 110 is acquiring knowledge about the patterns of characters in an optical character recognition system, knowledge about words and words sequences would be complementary sources of knowledge. In FIG. 1, these complementary classifier modules and sources of knowledge are represented in block 160.

Block 150 presents a given selection of practice data to classifier module 110 and Socratic agent 120 causes classifier module 110 to perform recognition or classification on the given data. Socratic agent 120 coordinates with other parts of the system 160, so that the evaluation 130 of the performance of classifier module 110 is performed relative to an objective function that may be based on the end performance of the overall system, not just classifier module 110 in isolation.

In the particular example of a paired-model Socratic hypothesis, Block 130 accumulates statistics about the comparative performance of the two alternative model sets, with the performance evaluated in the context of all of the knowledge supplied by other parts of the system. Sequential decision theory statistics are accumulated to reject the null hypothesis if and only if the performance of one of the two alternatives is better by an amount that is statistically significant at the specified level of significance. Errors in the labeling of the practice data will not effect the statistic decision so long as the labeling errors are unbiased between the two alternatives of the paired-model sets.

In one embodiment, this Socratic agent will begin with the hypothesis that the lower level classifier module has no true knowledge until it is specifically proven otherwise.

A Socratic agent is an active process of acquisition of knowledge about an associated classifier module, not a mere repository of knowledge. The processes of Socratic agents will be explained in more detail in reference to FIGS. 3, 4, 5 and 6. An illustrative example will be discussed following FIG. 4.

Figure 2:
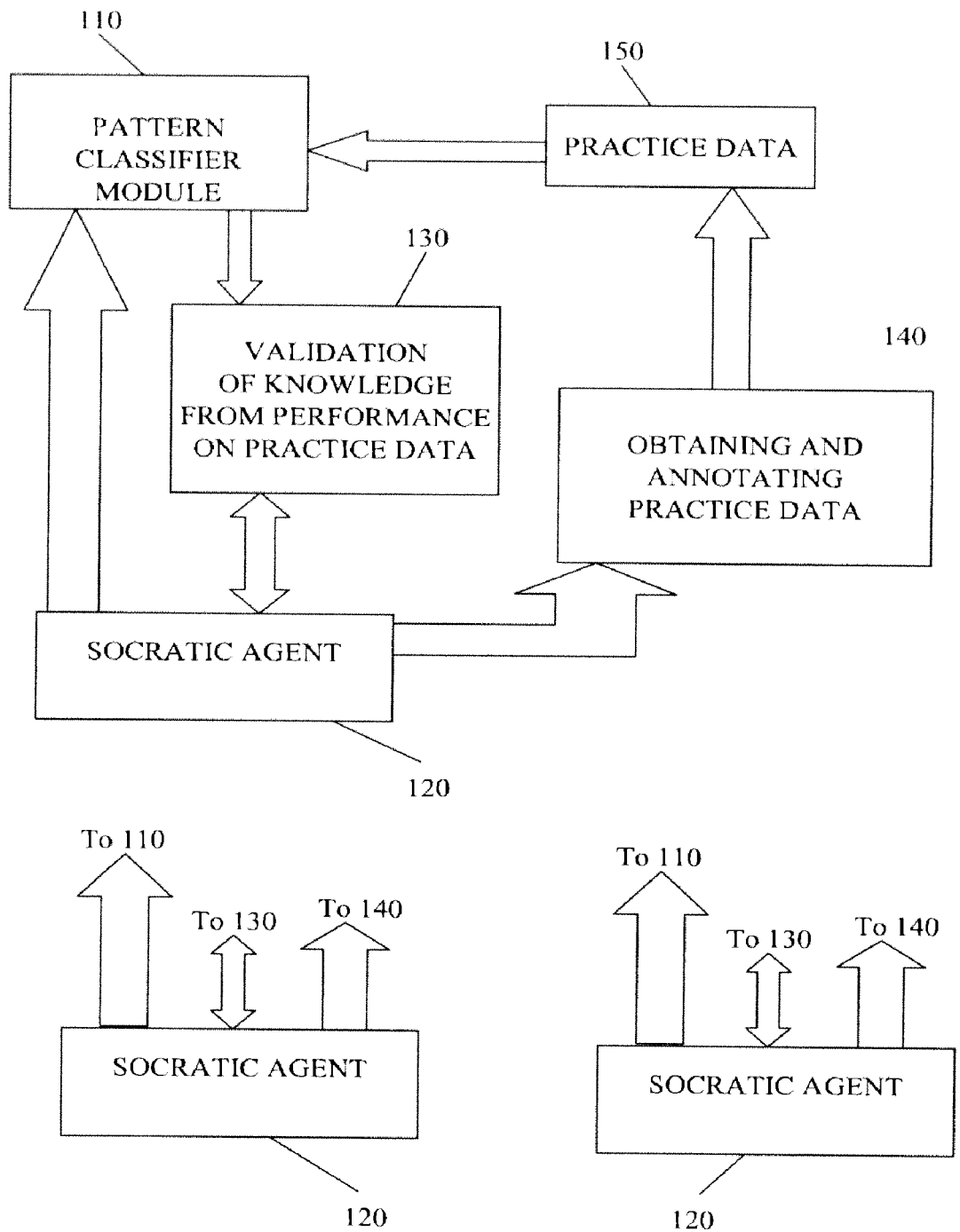
FIG. 2 is a block diagram of a classifier module and a plurality of associated Socratic agents.
Figure 21:
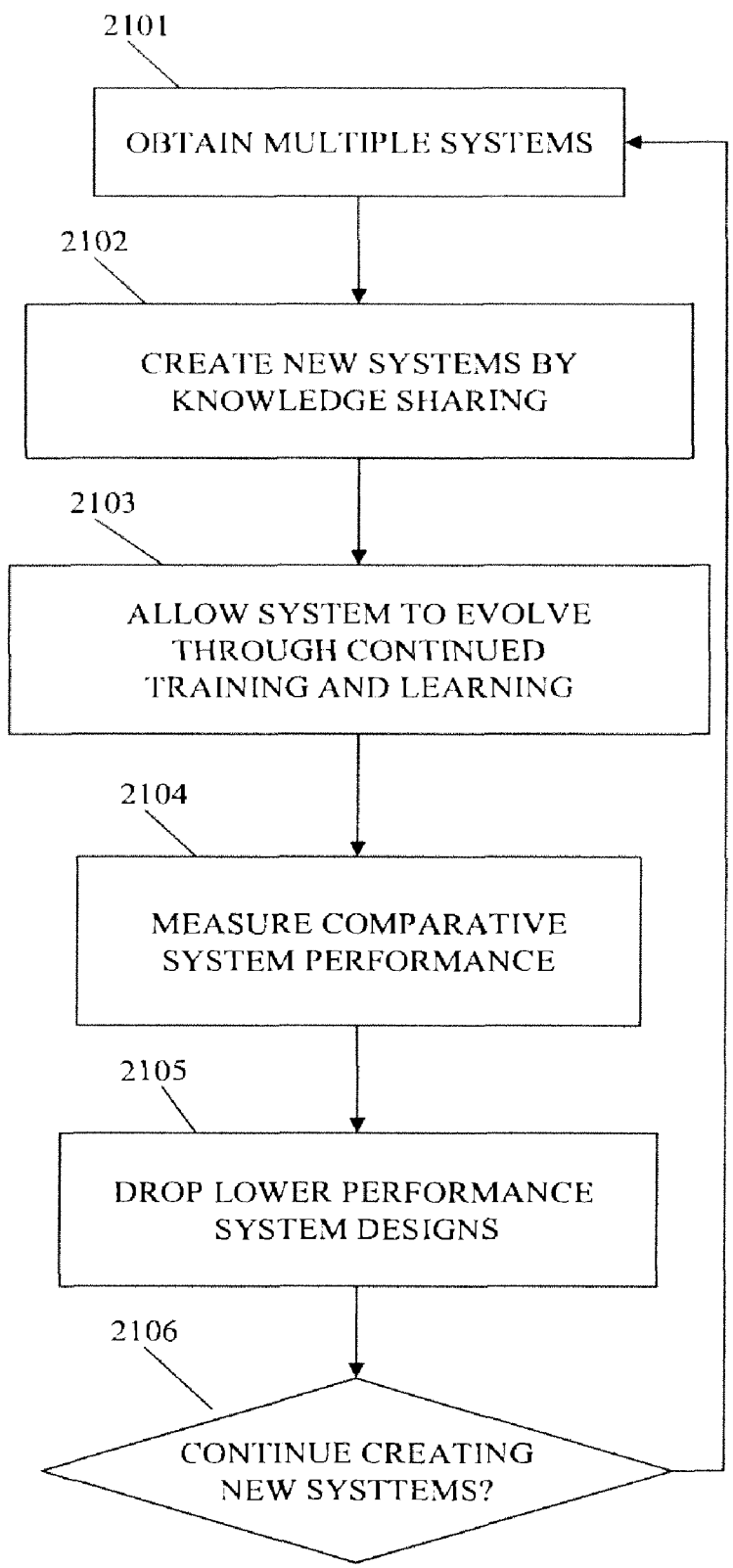
FIG. 21 is a flowchart of a process for managing multiple evolving systems.
Figure 22:
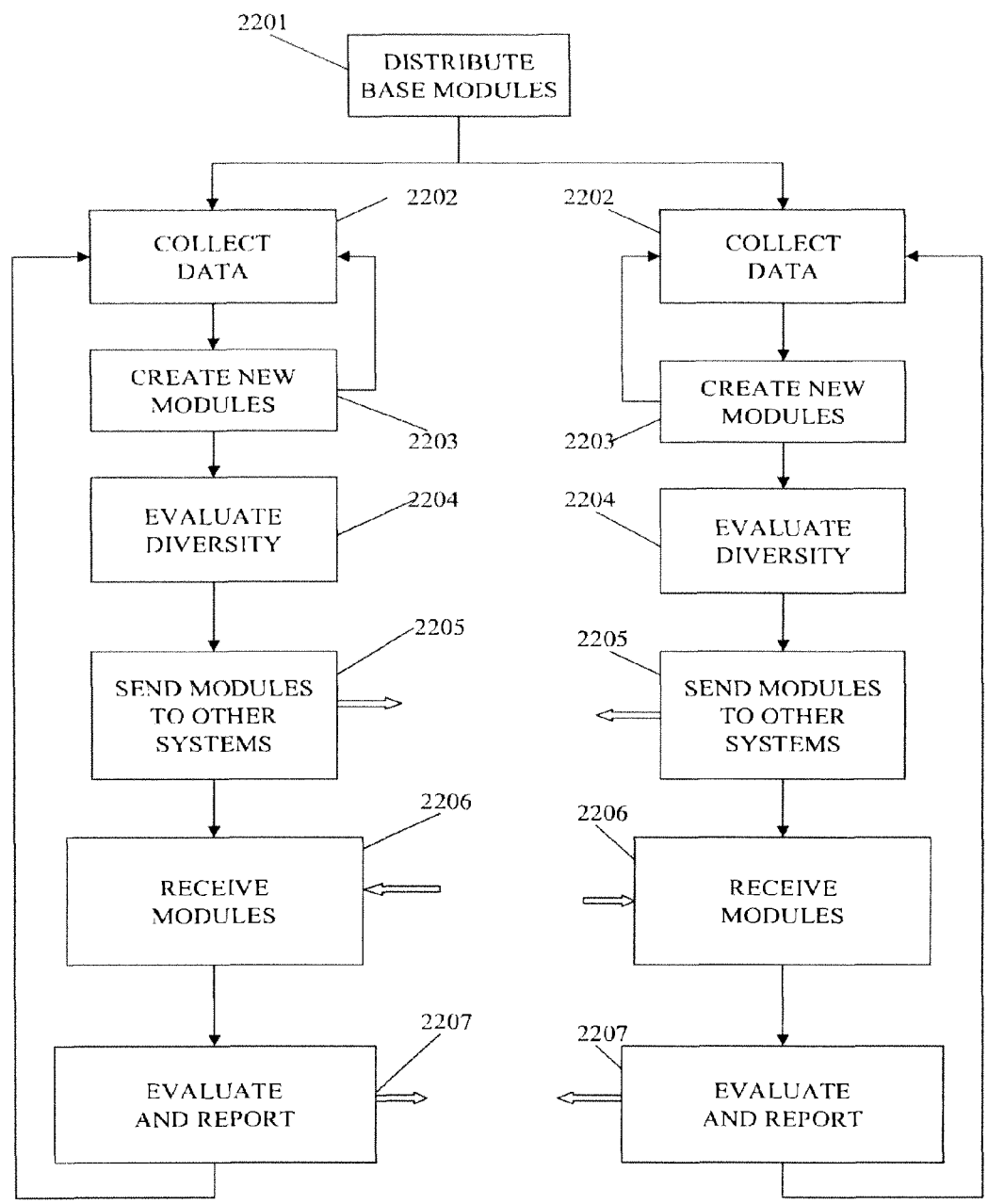
FIG. 22 is a flowchart of a process for module sharing in a distributed system.

FIG. 2 shows the same components and relationships as FIG. 1. In addition, FIG. 2 illustrates the fact that a single lower-level classifier module 110 may have many semi-autonomous Socratic agents active simultaneously, each representing and acquiring Socratic knowledge about different pieces of the knowledge within the lower-level classifier module 110. In FIG. 2, it is to be understood that the invention may have an arbitrarily high number of such Socratic agents 120 associated with each lower-level classifier module 110, not just the three illustrated. It is also to be understood that the dangling arrows leaving each of the Socratic agents 120 connect to the blocks 110, 130 and 140 respectively. These other Socratic agents may reside on the same system or may be distributed across a network. In one embodiment, Socratic agents on other systems distributed across a network will have their own instances of block 130 and 140. However, since some knowledge may also be shared across multiple system, as shown in FIGS. 21 and 22, in one embodiment Socratic agents on separate systems may also share a distributed implementation of blocks 130 and 140.

Figure 3:
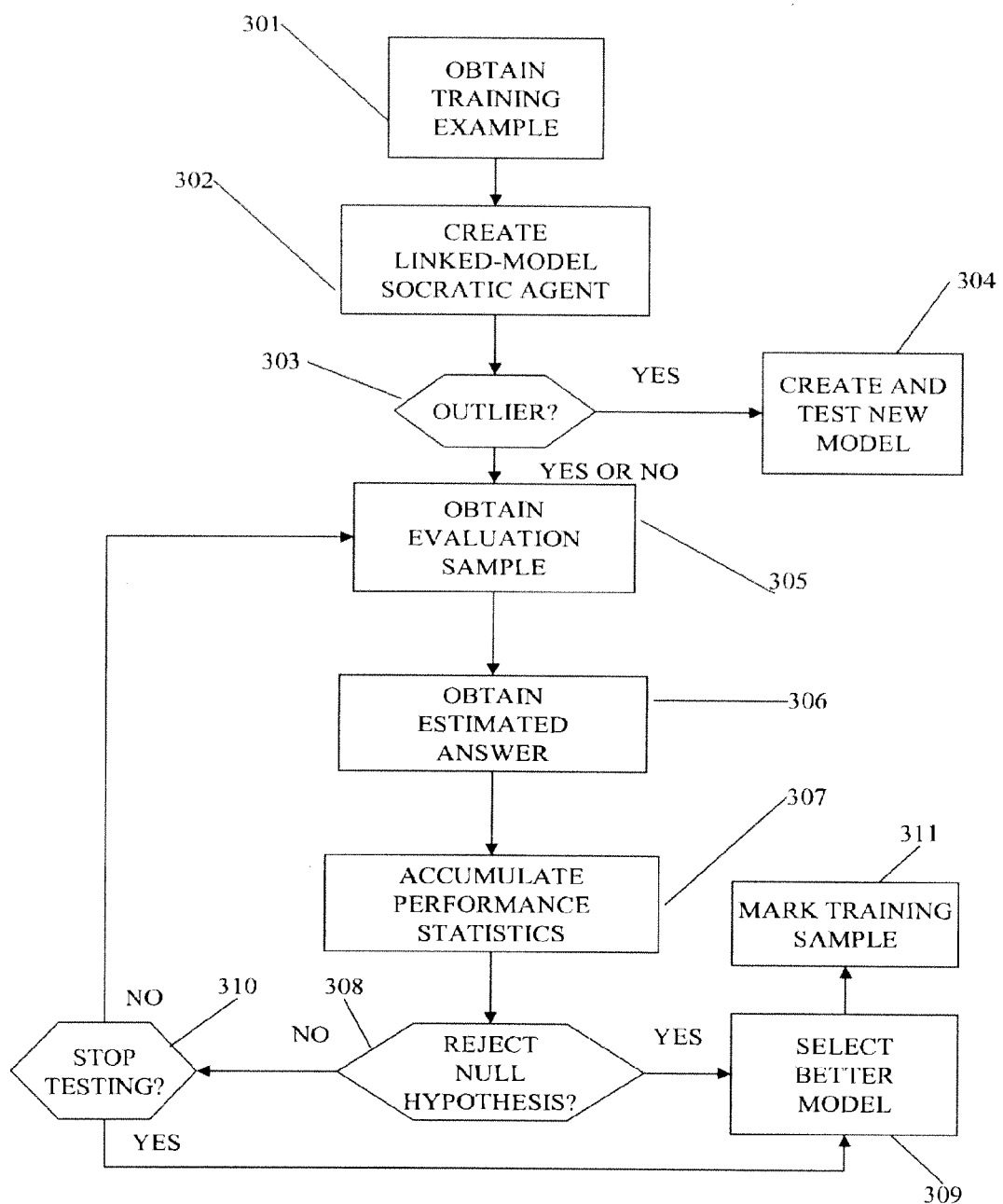
FIG. 3 is a flowchart of a process of delayed-decision training

FIG. 3 illustrates a process, based on Socratic agents, of knowledge acquisition that is robust against mislabeling in the training data (as well as other sources of variability) and is even robust against a high rate of errors in the evaluation or practice data.

A distinguishing feature of a Socratic agent is that the Socratic agent makes use of data or knowledge that is not available to the system, subsystem, module or model with which the Socratic agent is associated either not available at the current time or not available because the data is coming from another system or subsystem. One example of such knowledge is illustrated in FIG. 3. In the process shown in FIG. 3, the Socratic agent delays a decision and uses the knowledge of the future performance of the associated model.

In an online or real-time pattern recognition application, such knowledge is not available during a given recognition task. The answer to the current problem must be given more or less immediately before proceeding to the next problem. In such a case, neither the answer nor an associated (non-Socratic) confidence measurement may be indefinitely postponed. However, the Socratic agent illustrated in FIG. 3 operates differently and does indefinitely postpone the decision as to whether or not the current training sample and its associated label should be used to train or update the model or module with which the Socratic agent is associated.

Referring now to FIG. 3, in block 301 a training sample is obtained. A training sample includes a data item and an associated label. A large complex pattern recognition system may require a large quantity of such training samples. However, it can be very expensive to have humans label such a large quantity of data or to have humans check the labeling that might be available from a less expensive source. Therefore, this invention is designed to be tolerant of errors in the labels associated with the training samples. It is also tolerant of variability in the data associated with the training sample. Therefore, for the training sample obtained in block 301 it is not assumed that the label is necessarily correct and it is not assumed, even if the label is correct, that the associated data is typical of the population represented by the model associated with the label. The invention views these assumptions as hypotheses to be tested, not as known facts.

In block 302, a copy of the current model or module being trained is saved unchanged and a second, modified copy is also saved after being trained on the training sample obtained in block 301. Typically, a classifier module will represent knowledge as a set of models. If the change in the knowledge representation caused by training on a particular sample is limited to a single model, then only that model needs to be duplicated. If the change is distributed throughout the knowledge representation of the classifier module, then a set of models or the entire module may need to be duplicated.

These two versions of the model or module are linked so that in future steps of the process both versions of the model or module are available and statistics may be obtained on their comparative performance. This linked pair of models or modules is called an allele. Associated with this allele is a particular statistical hypothesis, called the null hypothesis. The null hypothesis states that the average performance of the two linked models is the same. The later blocks of FIG. 3 will be performing a statistical sequential decision process deciding whether the null hypothesis can be rejected. The performance measurement may be any appropriate performance measurement that may be computed as if the given labels for the practice data are the correct labels. In the illustrated embodiment, however, the invention is actually very tolerant of errors in these labels of the practice data.

In one embodiment, the performance measure is simply the average error rate on the given classification task. However, when the classifier module being training is a component of a larger recognition system, in another embodiment the performance measure is the average error rate of the larger recognition system at the end of the complete recognition process, rather than the average error rate of the classifier module by itself. Depending on the system design, in other embodiments other performance measures may be used. For example, when the particular classifier module being evaluated is a early component in multi-stage recognition process, the performance measure may be the percentage of instances in which the correct answer is passed on to the next stage of recognition given resource constraints, rather than the percentage of time that the early component module gives the correct classification as its first choice.

An important property to note is that the invention in the embodiment illustrated in FIG. 3, does not require that the correct labels be known for the practice data. No decision is made and no model is trained or updated based on the single item of practice data, whether or not its label is correct. Rather, the process illustrated in FIG. 3 gradually accumulates evidence and the process terminates and takes action only if eventually sufficient evidence can be accumulated to reject the null hypothesis. Even a substantial fraction of mislabeled practice data will not effect the probability of falsely rejecting the null hypothesis if the labeling errors are unbiased relative to the two paired models.

In block 303, the data sample obtained in block 301 is compared with the current model, that is the model before any adaptive or other training based on the given data sample. If the data sample is very different from the current model, it is considered to be an outlier. The degree of difference for a sample to be considered an outlier is an empirically adjusted control parameter. This parameter, and other control parameters, may be empirically adjusted by the process illustrated in FIG. 16.

Figure 4:
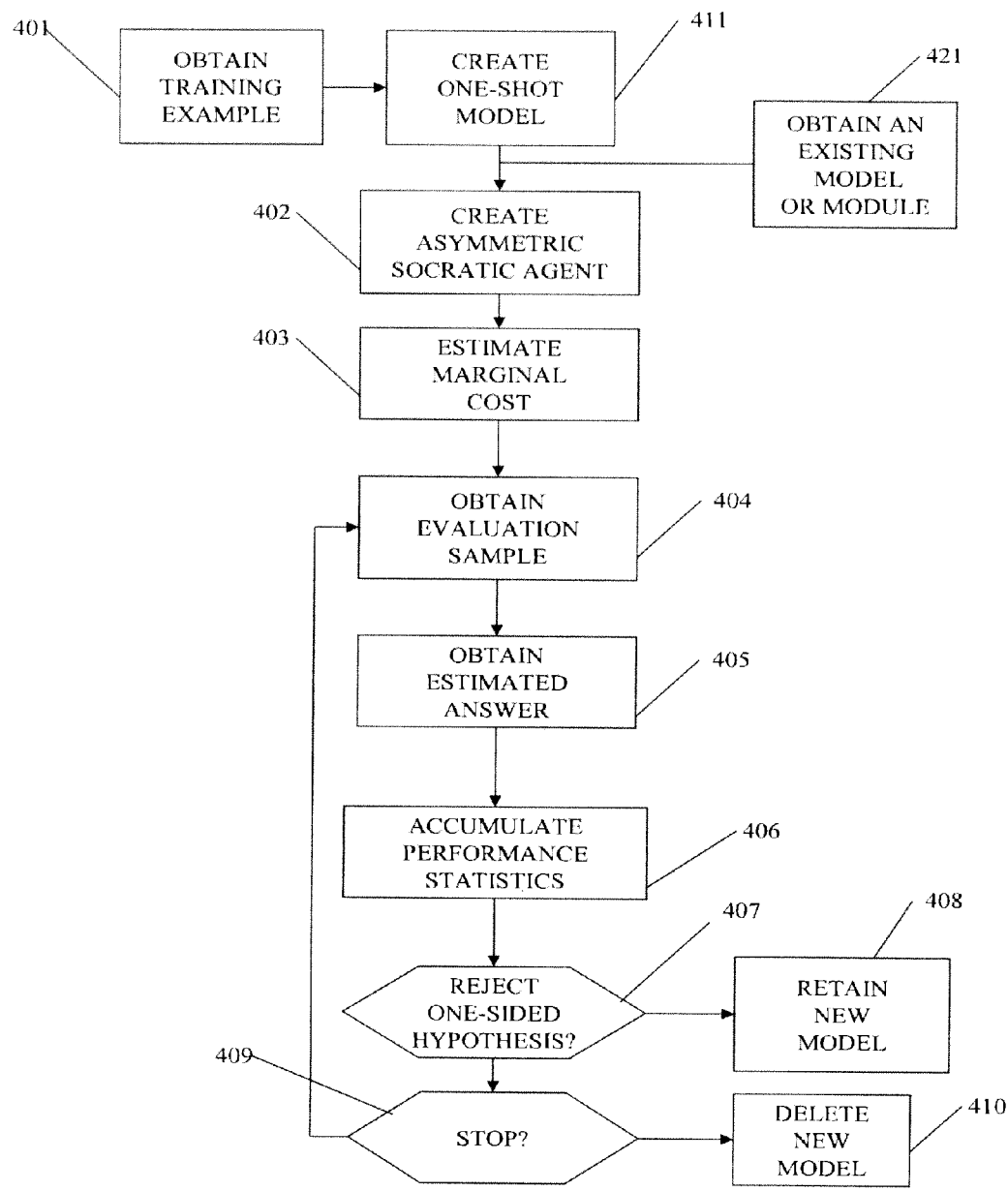
FIG. 4 is a flowchart of delayed-decision one-shot learning and asymmetric delayed-decision testing, which may be applied to structure learning.

If it is determined that a training sample is an outlier, it is not rejected for training Instead, block 304 creates a new model, which is tested by the process illustrated in FIG. 4. In addition, training also continues with block 305. This training process is tolerant of outliers as well as mislabels in the training sample. Training on outliers increases the robustness of the model or module to similar variability in future data items.

Continuing in reference to FIG. 3, block 305 begins a loop that is repeated many times until enough evaluation data pertaining to the allele has been obtained. In the illustrated embodiment, the data that is used to evaluate the null hypothesis is either new practice data that is obtained in the future after the Socratic agent has been created, or it is practice data (separate from the training data) that has been set aside. Thus, it may be called either practice data or evaluation data.

Block 306 obtains an estimated answer or label for the evaluation data obtained in block 305. In prior art pattern recognition methods, the evaluation data usually must be hand labeled and very carefully checked. As stated before, this process of hand labeling and checking can be very expensive for a large quantity of data. However, as already mentioned, this invention tolerates a very high error rate in the labeling of its evaluation or practice data if certain reasonable conditions are met. This is in addition to the tolerance of mislabels in the training sample. The two kinds of tolerance occur for different reasons. Because of this error tolerance, block 306 may use labels or estimated answers that have been obtained by automatic processing rather than hand labeling. Hence it is practical to obtain a large quantity of evaluation data at reasonable expense, so the process may loop through block 305 many times.

Block 307 accumulates performance statistics based on the evaluation data and the estimated answer. These performance statistics will not try to measure the absolute performance of the pattern recognition system, which is one of the reasons that it is not essential to hand label and check the evaluation data. Rather, these performance statistics will only measure the comparative performance of the two, paired versions of the models in the allele. Note that a wrong label will tend to not affect the null hypothesis, as it is equally likely to favor either model in the allele, provided the wrong label in the practice data was generated by an independent system, i.e., not the model under test. If the classifier module being trained is a component of a larger system, in one embodiment the Socratic agent is environment-aware as well as self-aware. That is, the comparative performance is not measured in isolation but rather in the context of the surrounding system. For example, if the module is a component module in a collection of cooperating modules, the measurement will be based on whether or not there is a difference in the combined result of the whole collection, depending on which of the paired versions in the allele is used.

Block 308 tests whether the accumulated performance difference between the two, paired model versions is statistically significant according to sequential decision theory. For example, sequential decision theory might determine that a performance difference is statistically significant if the probability of rejecting the null hypothesis by chance is less than 0.01. Compared to simple hypothesis testing, sequential decision theory can decide to postpone a decision and wait until more data has been accumulated. Sequential decision theory is well known to those skilled in the art of statistics. Even if the evaluation labels have a high error rate, if the null hypothesis is true for the portion of the evaluation data that is mislabeled, then the decision to reject the null hypothesis will merely be postponed until eventually enough data is accumulated to reject the null hypothesis in favor of the better model version.

If it is available, block 308 will use a human-supplied or human-verified answer. However, if a human-supplied or verified label is not available, block 308 obtains an automatically generated label. Preferably, the automatically generated label will be generated by a system that includes additional sources of knowledge beyond the classifier module being tested. For example, in a speech recognition system, if the classifier module being evaluated is a collection of acoustic models, the automatically generated label may be generated by a complete system that includes a language model. In a multi-stage system in which the given module attempts to approximate a higher-stage module, preferably the automatically generated labels may be generated by that later stage module. Since in such a case the task for the given module is to approximate the later-stage module, the label generated by the later-stage module is by fiat the "correct" answer.

If the evaluation data is labeled with an automatic recognition process that includes the classifier module being trained, in one embodiment the active version in the given allele is set to be the version that, at the current point in the evaluation, is the worse performing of the two versions even though the difference is not yet significant. This prevents an accumulation of bias in favor of the current favorite. The model is switched between the two versions whenever the preference changes.

If the accumulated performance statistics are sufficient to reject the null hypothesis, then one of the model versions performs significantly better statistically than the other. Therefore the process proceeds to block 309 at which the better model is selected and the testing of this particular allele is terminated. Control then proceeds to block 311.

Block 311 marks the training sample with the selected best performing label. If the null hypothesis has been rejected in favor of the model version that has been trained on the given training sample, then the associated label for the training sample is marked as reliable. If the null hypothesis has been rejected in favor of the model version that has not been trained on the given training sample, then the associated label is marked as unreliable. Thus, a module with a Socratic agent as illustrated in FIG. 3, will not only be self-aware and system-environment-aware, but will also self-correct the presented training samples. In one embodiment, the training sample is also annotated with all or a portion of the information that has been gathered in the process of evaluating the null hypothesis or a summary thereof. In this embodiment, this additional information will be stored for possible use in subsequent analysis.

Figure 16:
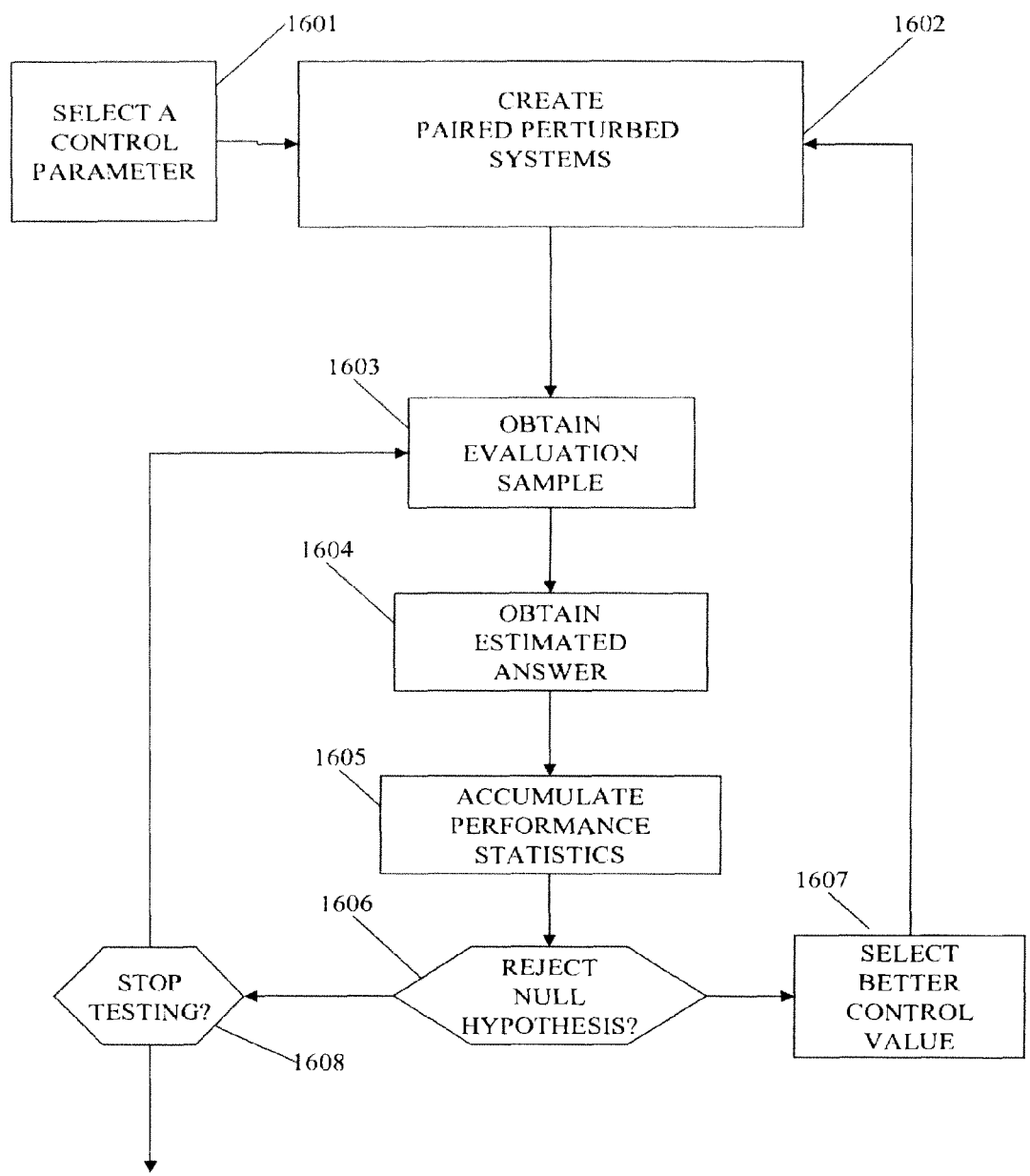
FIG. 16 is a flowchart of a process for optimizing control parameters in a system.

If the accumulated performance statistics are not yet sufficient to reject the null hypothesis, the process proceeds from block 309 to block 310. Block 310 tests a stopping criterion based on how much evaluation data has been accumulated so far without the null hypothesis being rejected and the relative availability of system resources to be testing such model pair alleles. The system may have created and be testing many such pairs simultaneously. However, if there is no shortage of resources, the testing of a given allele may continue indefinitely. With limited resources, block 310 may decide to stop testing of this particular allele based on a control parameter that may be empirically determined as shown in FIG. 16. If block 310 stops the testing process without the null hypothesis being rejected, it is somewhat arbitrary which model version is selected because the performance difference is not statistically significant. The selection could be made at random. For definiteness, FIG. 3 illustrates the embodiment in which the better performing of the two models is selected.

If the stopping criterion has not been met, which will usually be the case, the process returns to block 305 to continue accumulating more evaluation data that uses the models in the allele.

The process illustrated in FIG. 3 represents a kind of "delayed decision." The decision as to whether or not the training sample is a good sample is not based on the information available at the time the training sample is encountered. The decision is based on the actual observed (future) performance of the system on an accumulation of evaluation data. Furthermore, the decision is delayed until a statistically significant amount of evidence has been accumulated. The process is tolerant of errors in the labeling of the evaluation data as long as the null hypothesis is true for the portion of the evaluation data that is mislabeled. The process is self-aware such that it is not only tolerant of errors in the training sample, but also it can mark those errors in block 311, producing better labeled training data for other training.

Because there may be a substantial delay before a decision is reached to reject the null hypothesis or otherwise stop the process, more training samples for the particular model or module may be encountered. If so, a new allele may be created for each of them, so that a substantial plurality of Socratic agents may be operating at a given time.

In summary, the creation and operation of the Socratic agent illustrated in FIG. 3 causes the following steps to be performed:

1) creating the Socratic agent (block 302) creates an electronic linkage among the different instances of the model obtained from training on or skipping the given training sample;

2) in the embodiment illustrated in FIG. 3, the Socratic agent creates a null hypothesis between the linked pair of models;

3) in this embodiment, the Socratic agent accumulates measurements of comparative performance in order to accept or reject the null hypothesis (block 307,308);

4) the accumulated evidence is transmitted back to select the better model (block 309) and to annotate the training sample (311);

5) if the null hypothesis is rejected, then the better performing model becomes the active model for subsequent recognition and subsequent training uses or skips the given training sample as indicated.

Notice that these steps apply to any form of trained pattern recognition, not just to one application. Note further that no decision is made based on a single evaluation sample taken from the practice data. Indeed, no selection is made of the better model nor is any annotation information transmitted back to mark the training sample unless and until sufficient evidence has been accumulated to reject the null hypothesis at a statistically significant level.

By way of example, consider an optical character (OCR) recognition system. For the illustrative example, assume that the OCR system is a multi-stage recognition system including a low-level classifier module that matches the observed data features from the two-dimensional array of pixels from the optical image to models for the characters, and a higher-level module that models the sequences of characters in terms of word and word sequences. Assume that the models being trained are the models of the pixel patterns in the low-level classifier module. Suppose that a particular character in the training data is smudged. Should the smudged character be used in the training? It is difficult to decide initially. If the smudge makes the character look more like some other character than like the actual character underneath the smudge, then including this particular sample in the training could degrade the model for the actual character and make the model falsely accept instances of the other character that looks like the modeled character as smudged. For example, if an instance of the letter "o" is smudged so that it looks like only part of a circle with a smudge to the right, it might look like the letter "c". On the other hand, if such smudges are common and will occur frequently in the data to be recognized, the models must somehow be trained to expect such phenomena. It is difficult to decide which choice will work better merely by examining the smudged character, even with the advice of a human expert much less fully automatically.

However, continuing the illustrative example based on one embodiment of FIG. 3, the decision is not to be made merely by looking at the smudged character. Instead, a Socratic agent is created with a linked pair of models and a null hypothesis is formulated between the linked pair. One member of the pair of models is created by skipping the particular training sample comprising the smudged character. The other member of the pair of linked models is created by training on the smudged character. Note that the system does not need to know that the particular training sample is smudged. The same operation can be performed on any training samples. The assumption that the character is smudged is merely part of the illustrative example so that the behavior of the recognition system upon training on the particular sample may be understood.

The system continues on in its normal operation. In the illustrative example, assume that there is no special set aside practice data, but rather the recognition data that is subsequently encountered by the system is used as practice data for the purpose of finding samples for evaluating the comparative performance of the linked models and for accumulating evidence to accept or reject the null hypothesis. In this subsequent recognition process at any one time only one of the pair of linked models is active. In a complex recognition system, not every model participates in a particular recognition decision. Only the models for the best matching class and the models for the close scoring alternatives matter in the recognition of a particular sample. Whenever the active member of the linked pair of models so participates in a recognition decision, the linkage tells the system to take special action if changing which member of the linked pair is active might change the recognition result. The system replaces the active member of the linked pair of models with the other model and rescores the recognition. If the rescoring results in choosing a different class as the best scoring class, then there is a difference in performance between the two linked models and comparative performance statistics are accumulated.

Note an important property of the one embodiment illustrated in the example. Note only is the decision of whether to train on the particular training sample, which for purpose of the example has been assumed to be smudged, not made just by examining the smudged sample itself, the decision is not made by a looking at a single practice or evaluation sample. In some embodiments, the decision is only made after accumulating statistically significant evidence.

Given the null hypothesis, the average performance of the two linked models is the same. Therefore, if there is a difference in performance on a particular evaluation sample taken from the practice data, either of the linked models is equally likely to be the one that performs better on the particular sample. Since there are only two alternatives, that means that the probability that either particular model is the one that performs better is exactly 0.5. Under the null hypothesis, for any other evaluation sample the probability for either model performing better is again 0.5 and the choice of which model performs better on a given evaluation sample is made independently. As a specific example of possible evaluation results, suppose that the same model performs better on the first six evaluation trials. Because the probability is 0.5 for each trial, the same model could perform better just by chance with a probability of $(0.5)^6=1/64=0.015625$. That is, the probability is greater than 0.01, and the statistic would still not be significant at the 0.01 level.

This example also illustrates another aspect of one embodiment. In the example, the practice data may be taken from the subsequent regular use of the recognition system. In such regular use there may be feedback in the form of a user correcting any errors that are made by the recognition system. If such error correction feedback is available one embodiment of the invention will make use of such information. However, if such information is not available, one embodiment of the invention still operates as shown in FIG. 3. In this case the practice data is merely labeled automatically by the recognition system.

Note that the labeling of the practice data is done by the whole recognition system, not just by the classifier module being trained. In the illustrative example, that means that the automatic labeling also makes use of the knowledge of the words and word sequences that is available in the overall recognition system. The knowledge that only certain character sequences form words, and the knowledge of which words are more likely, helps the system fix many of the errors that would be made by the lower-level character classifier model operating by itself. However, a minority fraction of the time the application of the knowledge of the words and word sequence may introduce an error. For example, if an ambiguous character occurs in a less common word, the overall recognition system may choose a more common word with a different character, even though the lower-level character classifier module operating by itself might have chosen the correct character. In one embodiment shown in FIG. 3 and illustrated by this example these errors introduced by the overall recognition process do not cause the process to fail. The process does not depend on the correct labeling of any one practice sample. The process only requires that the errors at least average out so that the statistical significance of the test of the null hypothesis is not destroyed.

In the particular illustrative example, all that is required is that, when the overall system introduces an error, the probability distributions of errors not be biased in favor of one or the other of the linked models. That is, if the word or word sequence knowledge causes the overall system to make an error, the null hypothesis should be true for data restricted to the errors. Given that such an error has been made, either of the two linked models should be equally likely to perform better over a significant plurality of samples. In the illustrative example, the difference in the two linked models comes from training on or skipping a particular training sample, which has been assumed to be smudged. Since the presence of a particular kind of smudge is completely independent of identity of the words and the word sequence, in the example the conditions should be satisfied such that the null hypothesis test should remain valid. The derivation that the null hypothesis test is valid is not based on any assumption that the error rate in the automatically labeling is low or that it is less than any particular value. Essentially the process will work with an arbitrarily high error rate in the automatic labels as long as there is no bias created between the linked models as a result of these errors. A different aspect of this question will be considered in a later illustrative example.

As a final step in the illustrative example, assume that eventually the null hypothesis is rejected in favor of the model for which training is performed on the smudged sample. Then, the training sample is marked as reliable and this better model is made part of the standard version of the character classifier module. In particular, as further training is performed that includes particular smudged training sample, that training will include the particular smudged sample as labeled. However, if the null hypothesis had been rejected in favor of the model that skipped that particular training sample, then in subsequent training the annotation on the particular training sample would tell other training processes to also skip that particular sample with the smudge.

Figure 23:
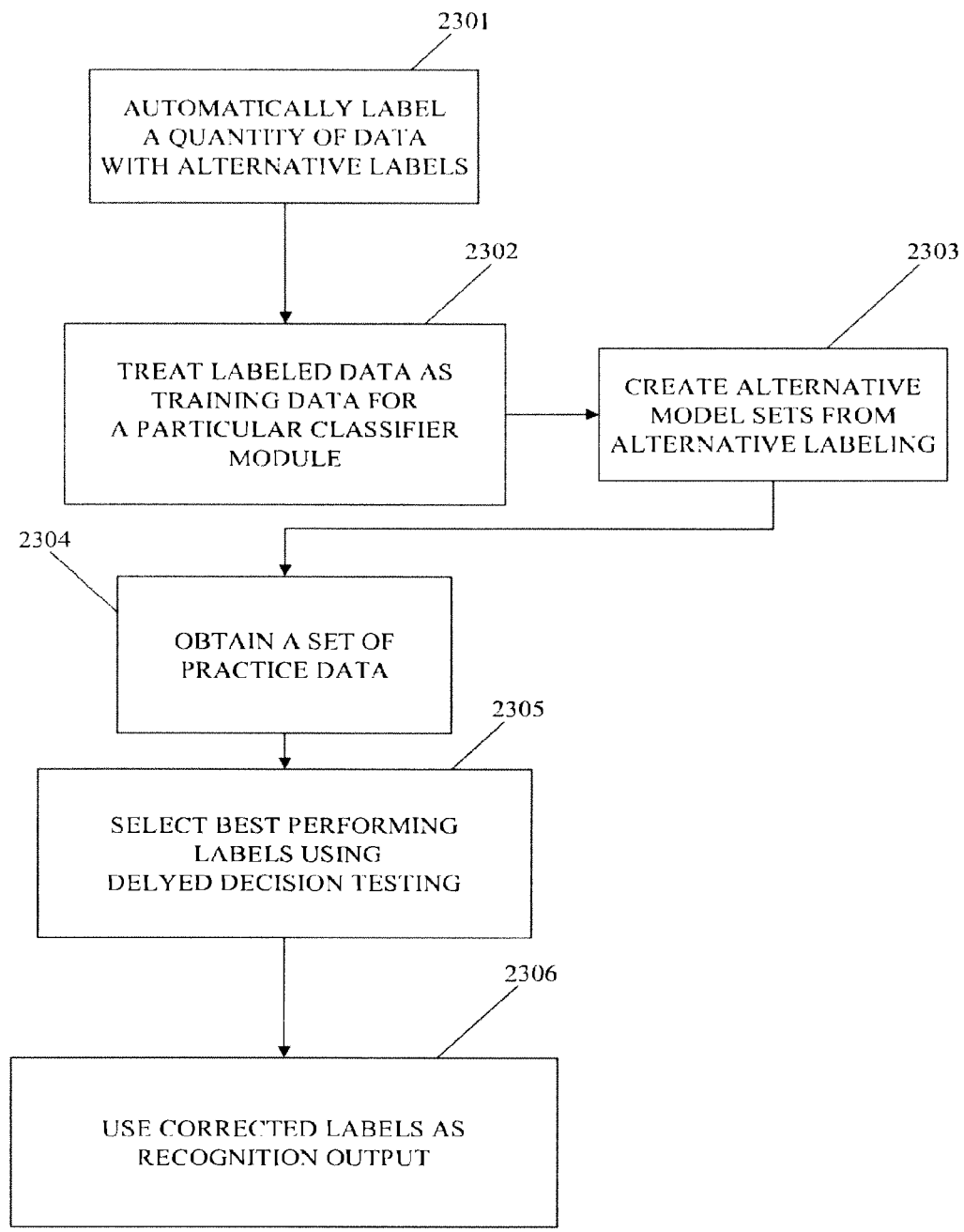
FIG. 23 is a flowchart of a process of recognition by feedback from delayed decision training on automatically labeled data.

In one embodiment, to be discussed in more detail in reference to FIG. 23, the allele contains models not merely obtained from training on the given training sample as labeled, but also models based on training on the given training sample with alternate labels. In the example, assume that the character classification module in the OCR system not only reports the best matching character classes, but also the identity of any other character class that matches nearly as well as the best. Then the process shown in FIG. 3 may be modified to set up a null hypothesis that hypothesizes that the performance of all the alternate models is the same. When this null hypothesis is rejected, then the alternate model is associated with a particular alternate label for the particular training sample if those that alternate label yields a better performance. In this case, block 311 marks the training sample with this new label that performs better at a statistically significant level.

Following FIG. 4, some further comments will be made referring to this example.

With reference to FIG. 4, consider a new model or module that was created by block 304 in FIG. 3. Such a model or module may be tested as illustrated in FIG. 4. In this case, the Socratic agent is responsible for acquiring the knowledge as to whether the new model increases performance by an amount sufficient to make up for the resources that it requires. The process of FIG. 4 may also be used to test the value of an existing model or modules.

To make the process easier to understand, it will be explained with reference to an example taken from speech recognition, but the same principles will apply to any kind of pattern recognition. When a speaker says a word with a pronunciation that is very different from any pronunciation for that word currently in the dictionary, a decision must be made as to whether to add a new pronunciation to the dictionary that matches this particular instance.

There are several things that could go wrong when a new pronunciation is added to the dictionary. If either the script is wrong or if the speaker misspoke, the actual word spoken may be a different word from the word in the script. Adding an instance of that other word as a pronunciation for the script word would mean that future instances of the other word will match the pronunciation and sometimes be incorrectly recognized as the script word. Even if the script is correct, the particular instance may be an unusual pronunciation. In many speech recognition systems, once a pronunciation is in the dictionary there is no way of representing that it is very rare, or that it only occurs in certain contexts. Even if the pronunciation is common and ought to have been included in the dictionary, deducing the correct representation of the pronunciation in terms of units of sound such as phonemes is an error-prone process, especially when done from a single instance. Adding a pronunciation to the dictionary in which there are errors in the phonemes may make the performance worse. On the other hand, leaving a valid pronunciation out of the dictionary will cause the system to repeat the same mistake over and over.

It is impossible just from measuring how well the particular instance matches the existing pronunciation to decide whether or not the instance is a valid pronunciation that should be included in the dictionary. Valid variations in pronunciation may be as great as the difference between two words. For example, the acronym AAAS may have the dictionary pronunciation "AY AY AY ESSE." However, a speaker may instead say "triple AY ESSE." We can see from understanding the nature of the letter string that the new pronunciation is reasonable, that is, it is likely to occur again, and that it should be in the dictionary. Acoustically, however, it is as different as a completely different word. In fact, it actually is a different phrase, with the two words "AY AY" replaced by the word "triple."

The Socratic agent, however, does not need to make a decision just based on the sounds in the current instance and how well it matches or how much it fails to match the existing models. Instead, it delays the decision and makes the decision based on whether the system performance improves across a series of evaluation data samples if the pronunciation is added. The same principles apply in deciding whether to add any new model to any pattern recognition system.

Returning now to FIG. 4, block 401 obtains a training sample that is a candidate for creating a new model. For example, this training sample could be a training sample from block 304 of FIG. 3 that was detected as an outlier by block 303. Generally the new model will be part of a particular subsystem or module within a larger system. The assignment of the model to a module will be determined by the kind of unit being modeled. For example, in a speech recognition system the unit may be a phoneme, a syllable, or a word. In a handwriting recognition system, the unit may be a stroke, a letter or a word. The evaluation illustrated by FIG. 4 will be an evaluation of the performance of this module. This performance evaluation may be fully supervised with human-supplied or human-verified labels, or may be semi-supervised by labels automatically generated by the larger system of which the module is a part.

Block 411 creates a one-shot model from the training sample obtained in block 401. A one-shot model is one built, at least initially, from a single example. Block 411 may use any method of model building that is capable of one-shot learning. The new model may be, but is not required to be, of the same kind as are built by the recognition system in its standard training from multiple examples. Block 411 may also use model-building techniques that are specifically designed for one-shot learning.

It may be possible to represent the unit being modeled as a sequence of subunits. For example, a word in a speech recognition system may be represented as a sequence of phonemes. In a handwriting recognition system or an optical character recognition system, a word may be represented as a sequence of letters. In such a case, in one embodiment recognition of the sequence of unknown subunits is performed, using existing models for the subunits, and taking into account statistics of relative likelihood of different sequences of subunits and any additional information that might be available, such as the spelling of the word in speech recognition. The examples of the subunit that occur within the data sample may be used as training samples for their respective subunit labels, preferably using a robust procedure such as illustrated in FIG. 3.

Another method of one-shot learning that may be used in block 411 is to use a network with multivariate Gaussian distributions associated with the nodes. If the data is a stream of data frames, and if the feature attributes of the unit to be modeled may vary as a function of time within the data sample, the unit is represented as a simple network that is a sequence of nodes, each node (except the first) connected with the previous node and each node (except the last) is connected with the following node. If the features of the unit are to be modeled as not varying as a function of time, then the unit may be represented as a single node. If the unit is represented by a network with more than one node, the network may be segmented and time aligned with the data sample using dynamic programming as shown in the following pseudo-code. The distance function $D(t1,t2)$ may be the Euclidean distance or any other distance function defined on the vector space of data features.

Pseudo-code for segmenting and time aligning a sample to a network with N nodes For time t1 going from the beginning of the sample T0 to the end of the sample Tend

```
For time t2 from T0 to Tend
    Compute M(t1,t2), the mean of the feature vectors from t1 to t2.
    Compute D(t1,t2), the summed deviation from the mean from t1
        to t2
For time t from T0 to Tend
    Score(1,t) = D(T0,t)
    For node n going down from N to 2
        BestSegTime(n,t) = t
        BestSegScore = Score(n-1,t-1)
        For time t1 from t-1 down to T0
            SegScore = Score(n-1,t1-1) + D(t1,t)
            If (SegScore<BestSegScore) then
                BestSegScore = SegScore
                BestSegTime(n,t) = t1
        Score(n,t) = BestSegScore
Set node n = N, time t = Tend
While (n>1) do
    SegmentTime(n) = BestSegTime(n,t)
    Time t = SegmentTime(n)
    Node n = n -1
SegmentTime(n) is the beginning time of the n th segment, which is
aligned to the n th node.
```

Once the data sample has been segmented and aligned to the network, a multivariate Gaussian model is created for each node. The mean vector for the Gaussian for a given node is the sample mean of the time frames aligned to the node. The covariance matrix is taken to be a diagonal matrix and the variance vector is estimated by an empirical Bayes procedure, well known to those skilled in the art of statistics, based on the sample variance and the model variance for sounds similar to the sound aligned to the given node.

Block 402 builds an allele representing the two alternatives. In this case, however, the alternatives are asymmetric. One alternative is to not create (or not retain) the new model (or an existing model obtained in block 421). However, if the (new) model is retained permanently, it will take up resources, that is, memory to hold the model and computation whenever the model must be matched against incoming data.

Block 403 estimates the marginal of the resources that would be used if the model were made permanent. This marginal cost estimate controls the rate at which new models are added to the system. In one embodiment, the marginal cost is computed as the product of a constant times the additional amount of computation time required to do a pattern classification with the additional model. In another embodiment, the constant is replaced by a variable parameter that can be adjusted to control the rate at which new models are added to the system. If resources become scarce, then the marginal cost is made very high (increased toward infinity) to prevent the system from running out of resources. If the marginal cost is high then very few new models will be able to increase the performance by an amount greater than the marginal cost for a statistically significant number of practice samples. Thus, in this situation few new models will be accepted, which is desirable in a situation in which resources are becoming scarce. If resources are not scarce, the marginal cost is nominal, and the constant can instead be used as a control parameter, which may be empirically tuned by the procedure shown in FIG. 16.

In a system with multiple redundant models, the contribution of a given existing model may drop below its marginal cost. In such a system, existing models may be obtained by block 421 and tested in the same manner as new models. An existing model may be volunteered to block 421 by the model's Socratic agent or a model may be selected at random at a rate controlled by an empirically tuned parameter.

Whatever the source of the model being tested, block 404 begins an evaluation loop. This evaluation loop is similar to the evaluation loop in FIG. 3, but the null hypothesis is being tested against a one-sided alternative. That is, to reject the null hypothesis the evidence must show that performance with the given model is significantly better than without the model by at least an amount determined by the marginal cost. The one-sided test with margin means that the test will be somewhat robust against bias in the evaluation data. On the other hand, with the margin some models will be rejected even though they make a small improvement in performance. Furthermore, a higher error rate in the evaluation data may cause additional models to be rejected because the accumulated performance statistics have higher variance and fail to reach the margin threshold. Thus, the evaluation loop in FIG. 4 is conservative in its acceptance of new models in order to remain robust against errors in the evaluation data.

Block 404 obtains an evaluation sample.

Block 405 obtains an estimated answer. If it is available, block 405 will use a human-supplied or human-verified answer. However, if a human-supplied or verified label is not available, block 405 obtains an automatically generated label. Preferably, the automatically generated label will be generated by a system that includes additional modules or sources of knowledge beyond the module being tested. For example, in a speech recognition system, if the module being evaluated is a collection of acoustic models, the automatically generated label may be generated by a complete system that includes a language model. In a multi-stage system in which the given module attempts to approximate a higher-stage module, preferably that higher-stage module will generate the automatically generated labels. Since the task for the given module is to approximate the higher-stage module, the label generated by the higher-stage module is by fiat the "correct" answer.

Block 406 computes two answers for the module being tested: one without the given model being tested and one with the given model. These answers are compared with the estimated answer obtained in block 405. The performance on this evaluation sample is then accumulated with the performance statistics previously accumulated in previous iterations through this evaluation loop.

Block 407 checks to see if enough evidence has been accumulated to reject the hypothesis that the new model fails to improve performance by the specified margin. FIG. 3 tested two models, so the null hypothesis could be rejected in favor of either model. This is called a two-sided test of the null hypothesis. FIG. 4, however, is comparing the performance with an extra model or element to the performance without that model or element. The extra model or element requires additional resource, as estimated by the marginal cost. If not enough evidence has been accumulated to reject the null hypothesis than the additional model or element will not be accepted. Furthermore, if the performance with the additional model or element is not enough better than the performance without the additional model or element, then the additional model or element will not be accepted whether or not the null hypothesis could have been rejected. Thus, it is only necessary to see whether the null hypothesis could be rejected because there is statistically significant evidence that the system with the additional model or element performs better than without by an amount greater than the marginal cost. This is called a one-sided test of the null hypothesis, which is a form of hypothesis testing well known to those skilled in the art of statistics.

If the hypothesis is rejected, the process proceeds to block 408 at which the new model is made permanent, or the existing model or module under test is retained.

If the hypothesis is not rejected, then the process proceeds to block 409 at which a stopping criterion is checked. If the hypothesis has not yet been rejected by the time the stopping criterion is met, the model being tested is judged as not contributing to improved performance by more than its marginal cost. The process then proceeds to block 410 and the model is deleted.

If the stopping criterion has not been met, then the process returns to block 404 to gather more evidence.

Figure 5:
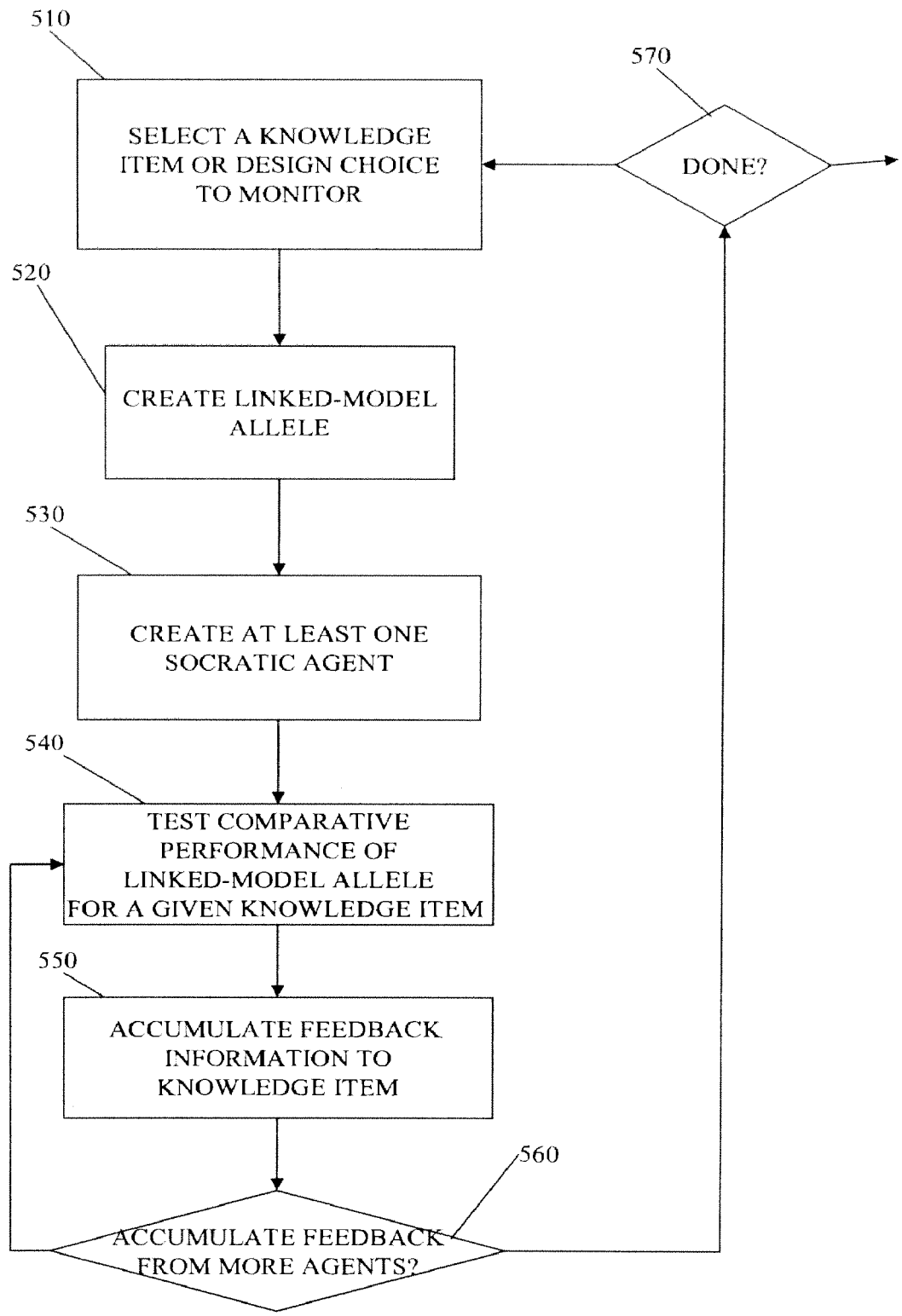
FIG. 5 is a flowchart of a process of feeding back information about the labels associated with a given training sample.

Socratic agents and the processes of FIGS. 3 and 4 may be further understood by consideration of the following illustrative example. This example should be construed only as an example and not as imposing on the invention any limitation that may be present in the illustrative examples. FIG. 5 presents the broad concept of delayed-decision testing. FIGS. 3 and 4 are instances of a particular form of delayed-decision testing, namely delayed-decision training.

For an illustrative example, consider a speech recognition system in which the training data was automatically labeled, so there are a non-negligible number of label errors in the training data. For the example, assume that a particular training sample is actually the word "fog," but has been mislabeled as "frog." Following the process of FIG. 3, this particular training sample would be obtained in block 301. Then a linked-model Socratic agent is created in block 302. This Socratic agent saves of copy of the pre-existing acoustic models, that is, the acoustic models from before this training sample was encountered. If there is an on-going training process, then these pre-existing models will not be frozen but rather will continued to be trained with the particular training sample skipped. The Socratic agent also creates a set of models that includes this particular wrong training sample. That is, the Socratic agent creates a set of models in which this training sample is used with the label "frog."

Under the assumption of the illustrative example, the nominal label "frog" is incorrect, but that fact is not known at this stage to the Socratic agent or to the training process in which it is participating. The Socratic agent would create the same two sets of models if the nominal label of "frog" were correct. The differences between the two situations will only show up under the future testing.

In the illustrative example of speech recognition, there will actually be several linked models that will be different under the two conditions of whether or not the particular training sample is skipped. A complex, state-of-the-art speech recognition system may model the acoustics at several levels, incorporating varying amounts of context into the modeling. In particular example, not only might there be an acoustic model for the word "frog," there would probably be models for each of the phonemes in the word "frog." That is, there would be acoustic models for /f/, /r//, /aw/, and /g/. There may be acoustic models for the phonemes that might be dependent on the context of surrounding phonemes. For purposes of the illustrative example, assume that the system has a acoustic model for the whole word "frog," a context-independent acoustic model for each of the phonemes and a context dependent model for each phoneme given the context of one phoneme on each side.

Block 303 tests the particular training sample to see if it is an outlier relative to the current models. Because the training sample is actually an instance of the word "fog," but is labeled as "frog," it is likely to be labeled as a potential outlier for one or more of the models. For purposes of the example, assume that the particular training sample is considered to be an outlier for the whole word model for the word "frog" and is also considered to be a potential outlier for both the context-independent model and the context-dependent model for the phoneme /r/, since no actual /r/ sound exists in the given training sample.

However, the process of FIG. 3 does not reject training samples merely because it appears that they might be outliers. In either case, it continues with the process of FIG. 3. However, for the models for which the sample is likely to be an outlier, the process also goes to block 304, which creates a new model and tests it using the process of FIG. 4. To summarize what has happened so far in the example, a Socratic agent has been created for testing each of the acoustic models that is affected by training on the given training sample. Each Socratic agent has a pair of linked models in which one member of the pair is trained on the particular sample and one member of the pair skips training on the particular sample. In addition, for several of the word "frog" and the phoneme /r/, new models have been created to be tested by the process of FIG. 4.

In FIG. 3 and in FIG. 4, the corresponding Socratic agent for each of the linked model pairs creates a null hypothesis that states that the performance will be the same (at least on average) for the two linked models. Continue following the example to see how the evaluation proceeds.

Block 305 (or block 404 of FIG. 4) obtains an evaluation sample. This evaluation sample is obtained from practice data, e.g., data for which putative labels are available just as for training data, but the data is used for recognition rather than for training As practice data, it may be used for development and tuning of the recognition system. In the illustrated embodiment of the invention, it will be used for evaluation of the null hypotheses of the Socratic agents.

Block 306 (or block 405 of FIG. 4) obtains the estimated answer for the evaluation sample obtained in block 305. For the example, assume that the practice data is actually data obtained from on-going operation of the recognition system. That is, it is new data that is sent to the recognition system to be recognized and it has no human-supplied labels. The recognition process generates a set of labels as part of its normal operations. This data becomes practice data simply because these automatically generated labels are used the same as if there were labels that were known to be correct. The illustrative example will evaluation samples in which the evaluation sample itself is mislabeled.

Although some embodiments of the invention use the same recognition system with either of the linked models active for labeling the practice data, for the illustrative example assume that either a different recognition system is used or that the active models are the ones in which the particular training sample is skipped.

The evaluation samples that will contribute to the evidence of comparative performance will be samples in which the word "frog" or one of its phoneme models actually occurs as part of the best scoring answer or an answer with a score close to the score of the best scoring answer.

In the case of the phoneme /r/, this will include instances of words that actually contain /r/ and a random selection of other words that are misrecognized as words that contain the phoneme /r/. For the model of the phoneme /r/ in the context of a preceding /f/ and a following /aw/, the evaluation samples will come from samples in which any of a limited set of words such as frog, fraught, froth, etc. is either the top choice or a close score.

The models for the phoneme /r/ that skip the particular sample will be normal acoustic models for /r/. The models for the phoneme /r/ trained on the particular sample (which doesn't actually contain an /r/) will have performance results that are somewhat degraded.

Of the evaluation samples in which /r/ occurs as a top choice or close call, some of these evaluation samples will actually have an instance of /r/ and some of them will not have an instance of /r/. For the evaluation samples that do not include an actual instance of /r/ the direction in which the acoustic model for /r/ is degraded is random relative to the direction of the difference between the nominal label for the practice sample and the best close scoring other word. That is, in such cases the change in the /r/ model is equally likely to improve the recognition performance or to make it worse. This conclusion is true regardless of the error rate in the labeling of the practice data.

In practice, the error rate in labeling the practice data can be measured and the criteria for selecting the evaluation data can be tuned to optimize the efficiency at accumulating data for rejecting the null hypothesis. For purpose of the illustrative example, assume the following criterion for the selection of evaluation data. This selection criterion has been chosen not for efficiency but rather to simplify the theoretical analysis for the illustrative example. For evaluation data for the null hypothesis for the linked models for the phoneme /r/, select only data in which either the top choice answer or a very close scoring second best answer contains an instance of the phoneme /r/. Also, only select samples in which one of the two top scoring hypotheses contains and /r/ and the other one doesn't. If a recognizer chose randomly between these two close choices, then it would be correct half the time.

Consider now the practice samples that actually contain an instance of /r/. Any recognition system that does better than chance will rank the hypothesis that contains an /r/ as the top choice more than half the time. Since the practice samples now being considered all contain an actual /r/ and the /r/ model is degraded, the relative score of the hypothesis containing an /r/ will usually be made worse by the degraded model. More than half the time this model will be the top scoring model, so most of the time the worse score of the hypothesis that contains the /r/ will be judged as making the score worse for the correct answer rather than for an incorrect close call.

Thus, for data that does not contain an /r/ there is on average no accumulation of evidence in favor of either model, for data that does contain an /r/ with practice data labeled any better than by chance there will be a bias toward rejecting the null hypothesis in favor of the conclusion that training on the particular sample makes the performance worse. Thus, the chance of rejecting the null hypothesis in favor of the conclusion that training on the particular sample makes the performance better is less than the specified statistical significance level, say less than a probability of 0.01, and otherwise the process will eventually reject the null hypothesis in favor of the conclusion that training on the particular sample makes the performance worse.

A similar analysis applies to the word model for the whole word "frog" and to the context-dependent model for the phoneme /r/, except that instances of these hypotheses will be much less frequent so it will take much longer to accumulate statistically significant evidence that the null hypothesis is false.

On the other hand, the one-shot models created by the process shown in FIG. 4 may be able to reject the null hypothesis much more quickly. Although FIG. 4 has not yet been discussed in detail, all we need to know for the purpose of this example is that a new model is created based just on the single instance that is available from the particular training sample. In the example, the training sample is actually an instance of the word "fog" and the new model for the phoneme /r/ will probably be taken from the initial portion of the phoneme /aw/. Because it is actually a sample of an /aw/, this new model will match very well against most instances of the phoneme /aw/ and will almost never match well against any instance of the phoneme /r/. For purpose of the example, assume that the recognition system used to label the practice data is robust against some of its models being poor. For example, assume it has multiple models for each sound or has multiple lower-level classifiers. Then, the new model for the phoneme /r/ will usually only actively participate in the recognition decision when the actual speech sample contains an /aw/. However, it also obviously can only participate when one of the hypotheses contains an /r/. Thus, the evaluation samples will primarily consist of instances in which the hypotheses contain both /r/ and /aw/. The new model for /r/ will systematically improve the score for word hypotheses that contain an /r/ followed by an /aw/ whenever the actual speech contains only an /aw/. Furthermore it will systematically degrade the score for any word hypothesis that contains an /r/ whenever there actually is an /r/. That is, it will systematically improve the scores of the incorrect answers or systematically degrade the scores of the correct answer, depending on whether an actual /r/ is present. In either case it degrades the relative score of the correct hypothesis compared to the incorrect hypothesis. In other words, evidence will rapidly be accumulated to reject the null hypothesis in favor the conclusion that creating a new model from the particular training sample degrades performance at a statistically significant level.

As a second illustrative example, refer to the OCR example discussed following FIG. 3. In that example, the smudged character is correctly labeled in the training data, but of course is smudged. Therefore, further assume that the particular smudged training sample is flagged as an outlier by block 303 of FIG. 3. Then the process of FIG. 4 is applied with respect to the particular training sample. In particular, a new model is created by block 411. Because the additional model requires additional resources, the null hypothesis test is slightly different than for the embodiment shown in FIG. 3. The test is one-sided and asymmetric. The version of the module with the new model must perform better by an amount that is not only sufficient to reject the null hypothesis at a statistically significant level, but must also improve performance by an amount that makes up for the additional resources required to implement the additional model. Furthermore, the linked allele associated with the Socratic agent created in block 402 has a somewhat different form. In this case, the linked pair comprises a one version of the classifier module in which the extra model is present and a second version in which the extra model is not present.

Continuing with the example, suppose that there are a large number of smudged characters. Eventually a large number of new models will be created. One embodiment addresses the potential problem of an excess of models. Block 421 obtains an existing model or module to be tested by the process shown in FIG. 4. This model or module does not need to be a module or module that was originally created by one-shot learning as in block 411. It can be any model or module. In the illustrative example, assume that an excess of smudged models eventually accumulates. In one embodiment, the performance metric for the comparative performance measurement in block 406 is the performance of the overall system with all of the models currently active, in particular all of the models created from smudged training samples. Then, if there is an excess of smudged models, measurements performed for some of these smudged models, will no longer be adequate to pass the asymmetric test set up by the Socratic agent. Therefore, eventually the process will come to block 410 and the model being tested will be deleted.

Thus, in the example it can be seen that models and modules can both be added and deleted. The same testing process may also be applied to elements within a data structure, such as nodes and arcs within a graph. Thus, the process of FIG. 4 can be applied to a kind of learning other than just estimating the parameters in a given set of models. By adding and deleting models and adding and deleting elements within a data structure, the process of FIG. 4 also learns new structure. One danger in attempting to learn new structure is that any structural change is likely to make some things better and some things worse. Therefore it is difficult to decide whether a particular change will make an overall improvement in performance based on a single example or a small number of examples. In particular, it is hazardous to try to estimate the performance impact of a structural change based on the data that caused the structural change to be hypothesized. One embodiment of the invention, as illustrated in FIG. 4, avoids most of this hazard. The decision to accept a structural change is based on independent statistical evidence gathered from a significant number of samples and the evidence must be sufficient to reject an asymmetric, one-sided null hypothesis at a statistically significant level. Furthermore, even if a structural change is incorrectly accepted or if the situation changes, there is a mechanism (selecting the given change to be tested, starting in block 421) for detecting that the change is no longer successful and for reversing it.

In summary, the process shown in FIG. 4 involves essentially the same steps as the process shown in FIG. 3, with just a few key differences. One difference is that the process in FIG. 3 measures comparative performance of an allele of linked models in which the linked models each have the same number of elements and use essentially the same computational resources. The linked models in FIG. 4, on the other hand, have differing numbers of elements and use differing amounts of computer resources. This difference then results in other differences. For example, the null hypothesis test in FIG. 4 is one-sided and is offset or biased to compensate for the cost of the additional computational resources.

FIG. 5 is a flowchart of the process by which one embodiment of the invention gathers information about a given knowledge item or design choice. Block 510 chooses a particular knowledge item or design choice to monitor. A knowledge item may be any discrete piece of knowledge in the classifier module. For example, it could be a single training sample together with the associated putative label. As a second example, it could an optional context-dependent model transformation rule. A design choice could be any decision point in the design of a pattern recognition system, such as the analysis bandwidth in the signal processing. In a typical classifier module or pattern classification system, there will be a large number of knowledge items and a large number of design choices in the system design process. Thus, there are a large number of possible selections for block 510. In one embodiment, the process of FIG. 5 can be done many times with different selections in block 510, which will lead to the creation in block 530 of many different, semi-autonomous Socratic agents. Furthermore, even for a single knowledge item in a complex system the knowledge item might be a hierarchy or other data structure involving a number of knowledge items related to subunits of the first knowledge item. Therefore, even for a single knowledge item there may be more than one Socratic agent.

For any selected knowledge item, there is also an implicit design choice. For example, for a given training sample, either the training can be included in the model training, or the sample could be rejected and be excluding from the model training, as in the example mentioned in the discussion of FIG. 3. As another example, a given context-dependent transformation rule may either be applied or may be ignored. From any explicit design choice or implicit design choice in the training process, two sets of models may be created by following each alternative in the design choice. Block 520 creates two such sets of models and builds cross-reference data structure such that whenever one of the paired sets of models is used in the recognition process, the recognition results can be recomputed using the alternative model set and both sets of recognition results can be obtained and compared. In a typical embodiment, the difference in the two model sets may be localized to a small portion of the overall model set. There then may be many such small changes being monitored at different sites within the model set. The paired-model sets with such a localized change may be called a paired-model allele.

Notice that the Socratic agent for delayed-decision training shown in FIGS. 3 and 4 is a special case of a paired-model allele in which one member of the pair has models obtained from training on the designated training sample and the other member of the pair has models obtained by not training on the designated training sample. In the more general case shown in FIG. 5, one member of the paired-model allele results from one decision alternative in block 510 and the other member of the allele results from another decision alternative in block 510. In fact, in spite of the name paired-model, a paired-model allele is not limited to only two members. If the design choice selected in block 510 has more than two alternative decision possibilities, then the allele will have more than two sets of models that are associated through the allele. Hence, the more general name is a linked-model allele. When there are more than two members in the allele, the null hypothesis is that all the decision alternatives have equivalent performance, and the sequential decision test is terminated as soon as enough evidence is accumulated to reject the null hypothesis in favor of any one of the allele members.

Block 530 creates a Socratic agent associated with the linked-model allele for the knowledge item or design choice selected in block 510. Block 540 collects statistics comparing the relative performance of the linked sets of models for a plurality of evaluation data samples. In one embodiment, the Socratic agent formulates a null hypothesis, that is, the hypothesis that there is no difference in performance of the linked sets. Then, block 540 collects comparative performance until enough evidence has been accumulated to reject the null hypothesis in favor of one of the alternative model sets. The testing may be continued until either the null hypothesis is rejected at a specified level of significance or until a specified criterion is met, such as an indication that cost of further testing exceeds its expected value.

After comparative performance data has been collected until a specified stopping criterion has been met, block 550 feeds back the accumulated information to a knowledge representation associated with the knowledge item selected in block 510.

Block 560 tests whether there are additional Socratic agents that might accumulate evidence for a given knowledge item. If so, control returns to block 540 to continue testing with another Socratic agent related to the given knowledge item.

The process then proceeds to block 570, where it is determined whether the process is completed. If not, the process continues by selecting another knowledge item or decision point to be tested.

The processes shown in FIGS. 3, 4 and 5 have quite a bit in common. The common elements comprise the following steps:
1) Create a Socratic agent associated with a given lower-level classifier module, with an allele linking two or more models such that any one of the models may be made the active model in the given lower-level classifier module.
2) In the Socratic agent create a null among the set of two or more models.
3) Accumulate evidence to accept or reject the null hypothesis. Continue collecting evidence until either the null hypothesis is rejected at a statistically significant level or until a stopping criterion is met.
4) Transmitting the accumulated evidence or a summary of the accumulated evidence back to the data structure or software associated with the origin of the models. In FIG. 3, the original of the models is the particular training sample. In FIG. 4 it may be a training sample plus the associated creation of a new model by one-shot learning. It may be a model modified by a change in structure. It may be an existing model that is being tested to see if its incremental contribution is worth its cost. In FIG. 5 it is a decision point in which different models result from different decisions.

In any of the cases, if the null hypothesis is rejected, the best performing model in the allele is made the one active model in the recognition process.

Figure 6:
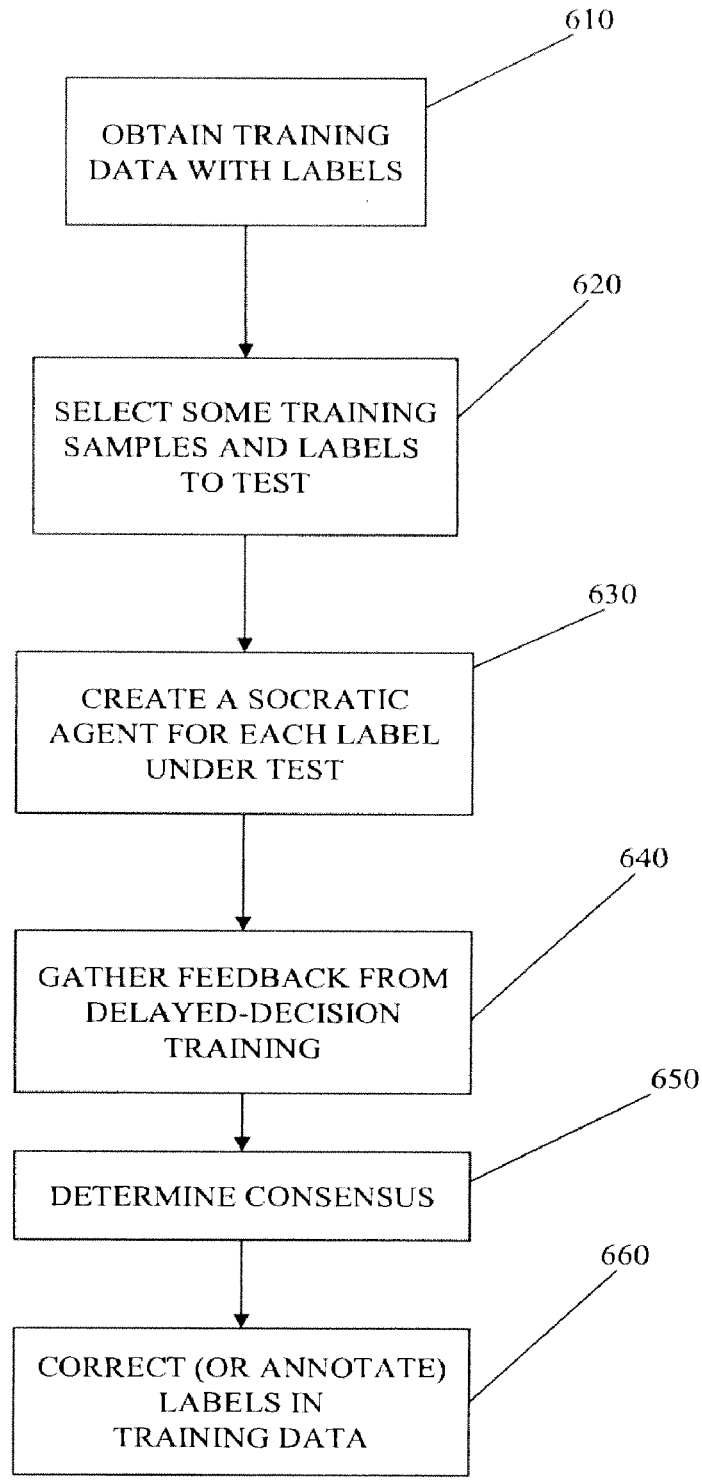
FIG. 6 is a flowchart of correcting labels in training data.

FIG. 6 is a flowchart of a particular application of the process shown in FIG. 5. FIG. 6 shows the application of the performance feedback to correct errors in the labeling of training data.

Block 610 obtains a collection of training data with labels. In non-Socratic model training it is important to have a very low error rate in the labels associated with the training data. Because the process illustrated in FIG. 6 can correct errors in the training data, it is more tolerant of errors in the labeling of the training data than is non-Socratic training. Therefore, block 610 may obtain the labels for the training data by a less expensive process than would be needed to obtain a set of labels with a very low error rate. In particular, block 610 may obtain labels for the training data automatically by running a recognition process, rather than requiring the labels to be marked by human labor.

Block 620 selects a particular set of training samples to have their labels tested.

Block 630 creates a Socratic agent for each label under test.

For each label under test and its associated Socratic agent, block 640 performs the delayed-decision testing illustrated in FIG. 3 on a plurality of evaluation data samples. The training done by block 640 may be discarded, because the purpose in the context of FIG. 6 is to correct the training labels not to do the training. However, the feedback information is retained and added as an annotation to the particular training sample label. The feedback information includes the results of the testing of the null hypothesis, in particular whether the null hypothesis has been rejected either indicating improved performance or degraded performance from training on the given training sample with its associated label. In one embodiment, the annotation information is stored for use in subsequent analysis. In particular, in a complex recognition system the given training sample may actual represent a complex data structure with associated labels. In speech recognition, for example, if a word label is incorrect, then usually one or more of the associated phoneme labels will also be wrong. In addition, training samples that are actually mislabeled are likely to be determined to be outliers by block 303 of FIG. 3, so that a tentative new model will be created and tested by the process of FIG. 4 as well as the allele created and tested by the process of FIG. 3. The annotations then would store the information from one of these processes to be combined with the feedback information from the other process. In making a decision as to whether a label is wrong or whether a particular training sample is simply very noisy, in one embodiment null hypothesis testing feedback information will be stored and accumulated across multiple unit types associated with a given training sample before a consensus decision is attempted.

If there is feedback from more than one Socratic agent, then block 650 determines whether there is a consensus. In one embodiment, the consensus rules will depend on the amount of data available and on a design criterion as to whether or not to be conservative in accepting questionable training data. With lots of data and a conservative design criterion, a training sample may be skipped if even one Socratic agent reports back that using the training sample decreases performance. Since some Socratic agents may accumulate less evidence, for example if they are monitoring a rare type of event, then some Socratic agents that may reject the null hypothesis while others fail to reject the null hypothesis before reaching some stopping criterion. In such a case, in one embodiment it would be regarded as a consensus as long as all the agents rejecting the null hypothesis are in agreement as to the direction of the reject. That is, as long as all either agree that performance is improved or if all agree that performance is worse for a given alternative.

Block 660 corrects the marked training sample labels. That is, for any training sample label which decreases the performance of the system, the training sample is marked to be skipped in future training, or the label is changed to a label for which the training sample with the changed label improves performance. The entire set of training data, with the rejected samples of corrected labels may be used to run training to create a new set of models. They also may be used to train other classifier modules.

Figure 7:
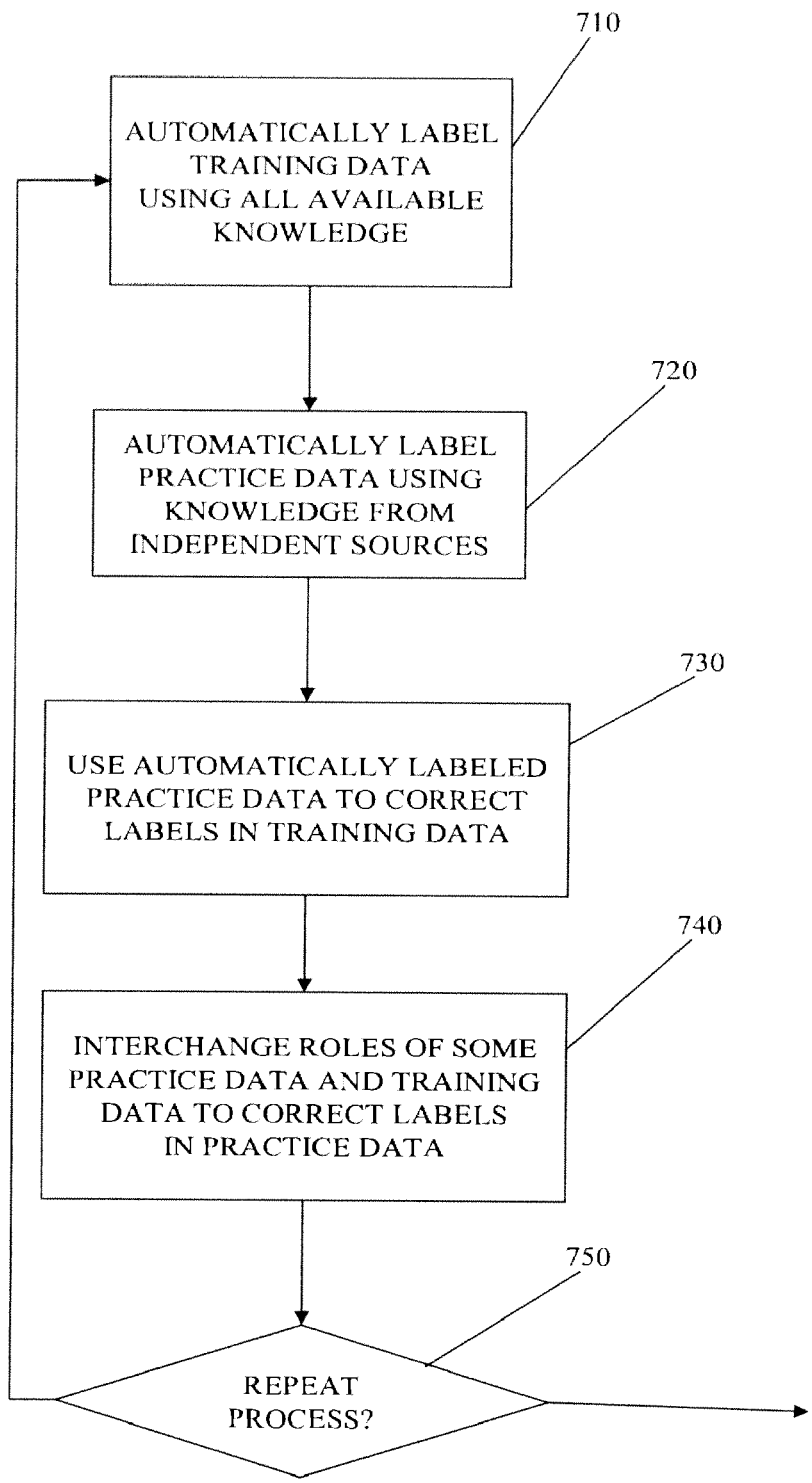
FIG. 7 is a flowchart of a process of iteratively correcting the labels in training and practice data.

FIG. 7 is a flowchart of a process in a particular embodiment of the invention in which the labels both in the training data and in the practice data are corrected.

Block 710 labels a set of training data. In the embodiment illustrated in FIG. 7, block 710 automatically labels a set of training data using all available knowledge. That is, block 710 uses any other classifier modules that may be available in addition to the classifier module being trained. In speech recognition, handwriting recognition or optical character recognition, block 710 may use knowledge about the probabilities of word sequences, such as a statistical language model, in addition to the models of the sounds or text characters in the classifier module being trained.

Block 710 also uses any prior knowledge or partial labeling of the training data. For example, it may use close captioning of the audio from television broadcasts or subtitles for movies or videos, even though closed captioning or subtitles are often far from being accurate verbatim transcripts. However, if no prior information or other classifier modules are available, block 710 simply runs automatic recognition with the best models currently available.

Block 720 automatically labels the collection of practice data. This practice data is to be used for delayed decision training, as illustrated FIG. 3 and FIG. 4. Block 720 also uses all available knowledge. However, for the illustrated embodiment of block 720 the automatic labeling in block 720 should use at least one source of knowledge other than the classifier module being trained.

Block 730 then performs delayed decision training as illustrated in FIG. 3 or FIG. 4 to obtain feedback information as illustrated in FIG. 6. Block 730 uses the feedback information to correct the labels in the training data.

Block 740, which is optional, interchanges the roles of the training set and the practice set, and uses the process of blocks 710 through 730 to correct the labels in the data that at first was used as practice data. Thus, the labels in both the original training data and in the original practice data are corrected. With the corrected labels, the training data may then be used either for non-Socratic training or for an additional round of delayed decision training. For non-Socratic training, the original practice data may be combined with the original training set to create a larger training set.

Block 750 checks whether the process should be repeated with the now improved labels.

Figure 8:
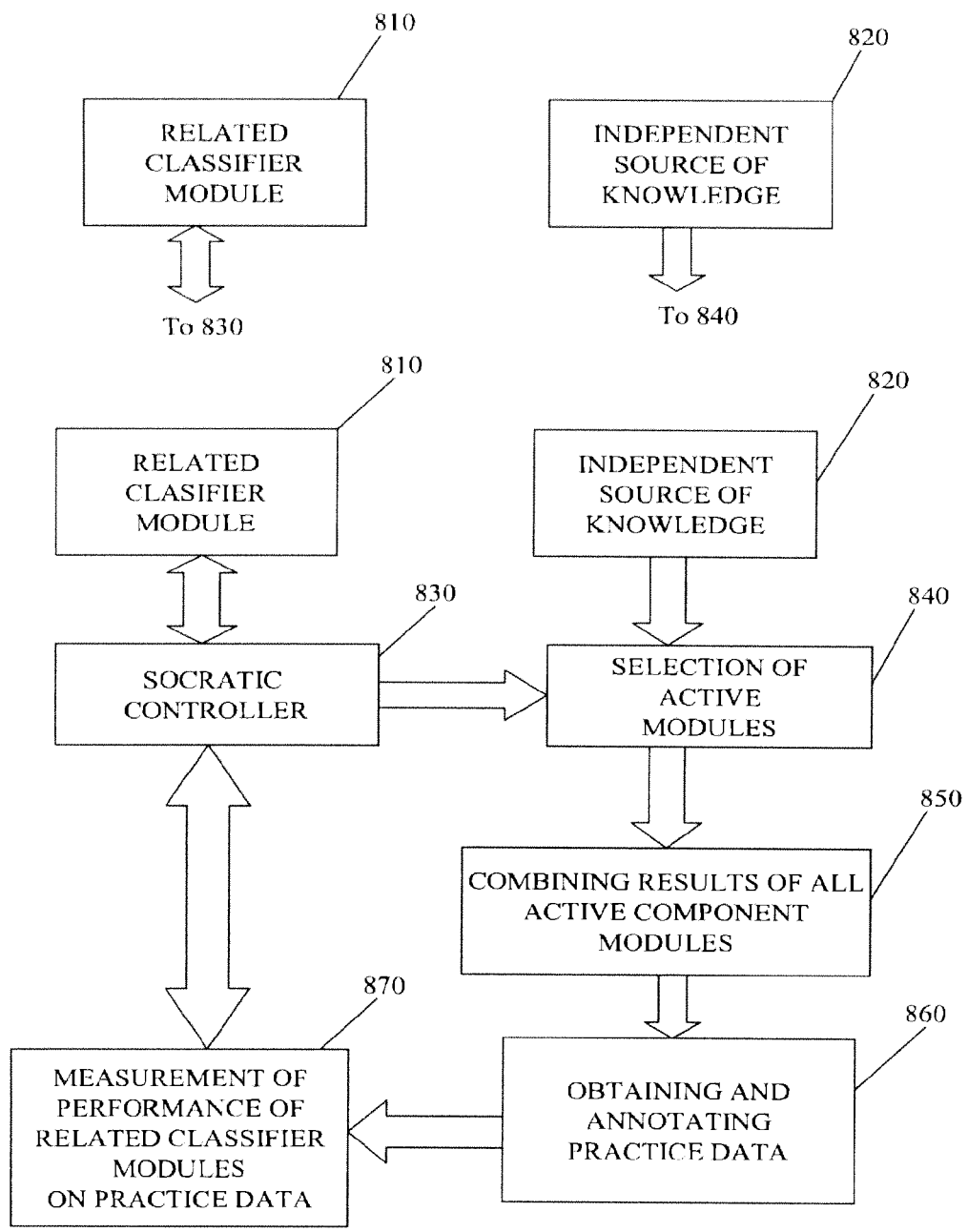
FIG. 8 is a block diagram of a Socratic controller with related classifier modules and independent classifier modules.

FIG. 8 is a block diagram of an embodiment of the invention with a specialized Socratic agent with knowledge about the knowledge of a plurality of related lower-level classifier modules. In this embodiment, the Socratic agent not only has knowledge about the collection of related lower-level classifier modules, but actively controls the use of the lower-level classifier modules during recognition and controls their training process. Such an active multi-classifier module Socratic agent is called a Socratic controller.

In reference to FIG. 8, in this embodiment there are a plurality of related lower-level classifier modules 810 that are controlled by a single Socratic controller 830. In relation to this embodiment, each of the related classifier modules is a pattern classifier such that all of the related classifier modules share the same set of target classes. The independent classifier modules 820 are other classifier modules that work cooperatively with the related classifier modules 810 on an overall task, but the independent classifier modules 820 do not necessarily have the same target classes as the related classifier modules 810.

The Socratic controller 830 will be discussed in more detail in reference to other Figures. It represents and acquires knowledge about the knowledge of the collection of related classifier modules 810. For example, in one embodiment it models, as a function of the data and the context, the knowledge of each individual classifier module 810 relative to the knowledge of the other related classifier modules 810. In a typical embodiment, each of the lower-level classifier modules will have as input a vector of values for a number of observations or measurements called "features." For example, in image recognition the features may include the raw values of the color and intensity of individual pixels in the image. The input data features may also include measurements or derived features, such as rate of change or the gradient of the intensity, or even more complex features such as whether or not an edge has been detected at a given location. With the plurality of related lower level classifier modules, different input features may be used by different modules in the collection of modules. In a typical embodiment of one lower level classifier module, the module computes as output the value of the class that the particular lower level classifier module believes best matches the given input features. In another typical embodiment, the lower level classifier module computes as output a score for each candidate class, indicating how well the particular lower level classifier module believes the particular candidate class matches the given input features. In addition to the union of all the feature observations that are available to the individual lower level classifier modules 810, the Socratic controller 830 also observes the output classification results and associated scores computed by the related lower level classifier modules 810.

Given these observations, in one embodiment the Socratic controller 830 itself has a pattern recognition task. However, this is a higher-level indirect pattern recognition task, not directly the task of recognizing the correct class in the set of target classes. Rather, the Socratic controller represents and acquires context-dependent knowledge about the performance of the lower-level related classifier modules 810. That is, it performs a pattern recognition task in which the output is not directly a class label among the target classes, but rather a vector with a component for each of individual lower-level related classifier modules 810. The component corresponding to a particular lower-level classifier module 810 is the estimate by the Socratic controller 830 of the likelihood that the particular related lower level classifier module 810 is correct in the current classification. These estimated likelihoods are then used by Socratic controller 830 in the process of combining the results from the individual related classifier into a single joint classification. This process is explained in more detail in other Figures.

In relation to the FIG. 8, it is important to understand that the Socratic controller 830 performs a classification task, but that this pattern classification task is based on higher-level knowledge about knowledge, and this classification task takes a very different form than the direct classifications performed by the lower-level related classifier modules 810. For example, as a function of the data observed by the Socratic controller 830 in a given instance it may be determined based on training on similar data that a particular one of the related lower level classifier modules 810 is very reliable in a region of the space of possible data feature vectors that includes the current instance. In this region of the data space there may be subregions in which different classes from the set of target classes are more likely to be the correct class. Each of the lower-level related classifier modules will attempt to correctly classify the target class in each of these subregions.

Thus the data space partitioning task for the Socratic controller 830 is very different from the pattern recognition task of one of the lower-level classifier modules. Each lower-level classifier module is attempting to match the correct class label. To the extent that the pattern recognition task of one of the lower-level classifier modules is viewed as a data space partition task, the lower-level classifier module is attempting to partition the space to separate regions in which different classes are the correct label. The Socratic controller 830, however, only attempts to separate regions in which there is a change as to which lower-level classifier modules are likely to be reliable. That is, the Socratic controller 830 does not attempt to separate two regions of data space in which different classes are the correct label, so long as the same lower-level classifiers are expected to be correct in their labeling (even though the actual labeling will change in agreement with the correct class label).

Thus, it can be seen that even though the Socratic pattern recognition problem is a standard pattern recognition problem, it has a very different form than the lower-level pattern recognition problem. There are many possible embodiments for implementing the Socratic pattern recognition done by the Socratic controller 830 in estimating the reliability of the lower-level related classifier modules, because once the pattern recognition task of the Socratic controller 830 is represented as a separate pattern recognition problem, any one of many standard pattern recognition techniques may be used. Later Figures will explain in more detail specific aspects of how the Socratic controller 830 may be implemented in one embodiment.

Referring again to FIG. 8, in one embodiment there may be a large number of related classifier modules 810 controlled by a particular Socratic controller 830 and a large number of independent classifier modules. For efficiency, it may be desirable to have only a fraction of all the related classifier modules controlled by the Socratic controller 830 active. Therefore, block 840 selects a subset of the related classifier modules to be active in each particular instance. In one embodiment, the Socratic controller 830 performs this selection process for its associated related classifier modules 810. It performs this selection based in part on the estimate of reliability that has been discussed above. For example, in one embodiment the active subset may be selected as described in relation to FIG. 10.

Block 850 combines the results of all the active classifier modules. The Socratic controller 830 combines the results of the active related classifier modules 810 based in part on the estimated reliability. For example, the Socratic controller 830 may determine a set of weights for weighted voting by fitting the observed reliability data as a regression problem as described in relation to FIG. 10.

Using all of the available knowledge, block 860 uses the best available recognition system to label practice data to be used for delayed-decision training of individual classifier modules 810, as explained in FIGS. 3 and 4, and for training the Socratic controller 830.

Block 870 measures the performance of the related classifier modules 810 on the practice data. These performance measurements are used for training the pattern recognition task performed by the Socratic controller 830 in estimating the reliability of each of the related classifier modules 810 in a particular instance.

A Socratic agent is any higher-level classifier module that contains knowledge about the knowledge of at least one other classifier module. The mechanism of creating alleles of linked models and of testing null hypotheses about these linked models has been discussed with reference to FIGS. 3 and 4. A Socratic controller is a Socratic agent that has a plurality of associated lower-level modules. Moreover, several new mechanisms for acquiring, evaluating and utilizing knowledge about this plurality of associated lower-level modules are introduced in embodiments of Socratic controllers associated with certain aspects of the invention. In particular, in one embodiment, a Socratic controller will perform one or more of the following processes:

1) it will measure the performance of the plurality of associated lower-level classifier modules as a function of the data available to the Socratic controller for each sample to be recognized and will solve a higher-level pattern recognition problem to determine parameters for combining the results of the lower-level modules such that the combined result is dependent on the data available to the Socratic controller for the given sample being recognized;

2) it will solve a pattern recognition problem that, as a function of the data available to the Socratic controller, estimates which subset of the plurality lower-level classifier modules is likely to be most reliable for classifying a particular data sample;

3) it will actively select a subset to the lower-level classifier modules based on the estimate of their reliability for a particular data sample;

4) it will actively control the training of the plurality of lower-level classifier modules to optimize their joint performance.

A Socratic controller is not just another classifier module. It differs in several ways. First, the Socratic controller has data that is not available to the individual lower-level classifier modules. To begin with, it has the total of all the data available to all of the lower-level classifier modules, whether or not that total data is available to any individual lower-level classifier. More significantly, the Socratic controller has available as input data the output results of the plurality of lower-level modules. A lower-level classifier module may always observe its own output results. It also may receive as input data the output of a yet lower-level module. However, under the principle of modularity, if two or more of the lower-level "modules" both receive output results from each other, they would no longer be considered distinct modules but rather would be regarded as being combined into a single composite module. Such an architecture is possible even for the entire plurality of lower-level modules associated with a Socratic controller. If any of the functions of a Socratic controller are implemented in such an inter-communicating composite module system, it should be regarded as an alternate, less modular, embodiment of a Socratic controller.

In reference to an example of a modular embodiment, the Socratic controller thus has input data not available to the lower-level modules. The greatest distinguishing characteristic, is that the Socratic controller solves a very different pattern recognition problem than any of the lower-level classifier modules. Each lower-level classifier module tries to recognize the correct class label for each data sample. The Socratic controller, however, does not try to directly recognize the class of the data sample. Instead, it tries to recognize which of the lower-level classifier modules is most likely to correctly identify a given data sample.

At first glance it might appear that the Socratic controller has a much more difficult pattern recognition problem than the lower-level classifiers. Can a Socratic controller solve this problem well enough to improve the overall system performance? Might it actually make the overall performance worse?

Just as informative example, consider an embodiment of a Socratic controller that uses only a small part of its available information. This simplified example will show that even a restricted Socratic controller can do at least as well as system without a Socratic controller. For this example, assume that the recognition system is an optical character recognition system, that the particular lower-level classifiers being discussed classify characters based on their optical images, and that the overall recognition system also has available knowledge of the vocabulary and of the likelihood of particular word sequences. A similar example would be a speech recognition system in which the lower-level classifiers for the example Socratic controller are phoneme recognizers.

Just for this informative example, assume that the Socratic controller restricts the input information that it uses: assume it takes the output results of the best performing individual lower-level classifier, but ignores all other input data available to the Socratic controller. In specifying the higher-level pattern recognition problem for the example Socratic controller, use the particular lower-level classifier as a reference. As output to the higher-level classification problem, estimate results from each lower-level classifier sample on data as correct if it agrees with the chosen reference lower-level classifier and as incorrect if it disagrees with the chosen reference.

By construction, this example Socratic controller will solve the higher-level classification problem such that the end result is no worse (and no better) than the best performing individual lower-level classifier. This example demonstrates that it is straight forward to design a Socratic controller that at least doesn't make things any worse.

Furthermore, this simple example Socratic controller can be easily modified to one that will at least incrementally improve its performance. Note that the lower-level classifier was used as a reference only for the purpose of specifying a particular embodiment of a higher-level pattern recognition problem for the example Socratic controller. For practice data, other information is available for estimating the correct answer for each practice sample, for example the final output of the overall recognition system including knowledge of the vocabulary and word sequences, not just the character recognition in isolation. Assume for the example that there is at least one data condition that can be detected under which there is some other individual lower-level classifier that performs better on practice data than the chosen reference classifier module. For example, suppose that when two particular other lower-level classifier modules happen to agree, then the answer that they agree on performs better than the answer of the reference module. By running an on-going process of continuing to search for such conditions, a Socratic controller could make an indefinite number of incremental improvements by looking at additional data features as input and training on practice data, no longer just taking the single best individual lower-level classifier as a reference.

From this example, it is clear that a system with a Socratic controller can do at least as well as a corresponding system with the same lower-level classifier modules without a Socratic controller, in spite of the apparent complexity of the higher-level classification problem. Furthermore, it is apparent that further improvement can be achieved making the final classification result depend on tests on the data available to the Socratic controller. That is, the higher-level classification process can further improve the overall performance. Embodiments of these processes will be described in more detail in reference to the following diagrams.

Figure 9:
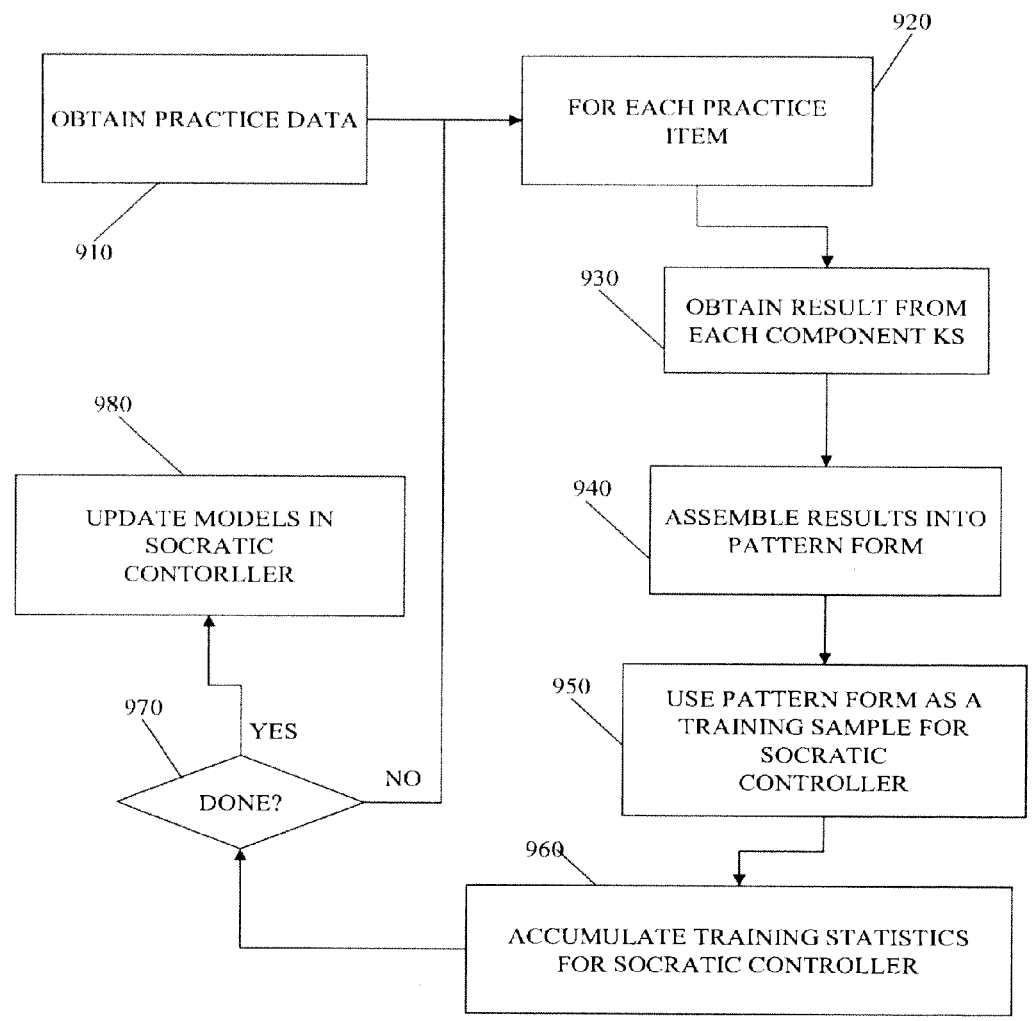
FIG. 9 is a block diagram of a process of a Socratic controller acquiring knowledge about the performance of one or more lower-level classifier modules.

FIG. 9 is a flowchart of a process by which a Socratic module, such as the Socratic controller 830 in FIG. 8, may be trained in the Socratic pattern recognition problem of estimating the reliability of the lower-level classifier modules.

Block 910 obtains a set of practice data. Then block 920 controls a loop such that blocks 930 through 970 are performed for each item in the practice data. It is to be understood that, in some embodiments the process of progressing from item to item in the practice data may be more complex than simply indexing though a sequence of items. For example, in continuous speech recognition, the system may perform recognition of complete sentences as units. However, the lower-level component classifier modules for the particular higher-level classifier module being trained would typically model shorter units, such as words or phonemes. In such a case, the control block 920 would actually be implemented as a multi-level control block that would index through sentences, performing a system-level recognition task for each sentence, and then would index through the shorter units within each sentence.

Block 930 obtains classification results from each of the component lower-level classifier modules. In the embodiment illustrated in FIG. 8, these component lower-level classifier modules are the related classifier module 810. In one embodiment, if there are a large number of component classifier modules, there may be a selection of a smaller active subset, in which case block 930 obtains results only from the active subset.

Block 940 assembles the results from component classifier modules into a pattern form. The particular pattern form may be chosen by the designer to fit a particular application. In one illustrative embodiment, a vector is formed with one bit for each component classifier module. The bit for a particular component classifier module would be a 1 if the particular component classifier module makes a correct classification for the given item and is a 0 if the particular component classifier module makes an incorrect classification. In another embodiment, in addition to the bit vector just described, there would also be a vector formed, with a numerical score computed by each component classifier module.

Block 950 uses the pattern form created in block 940 to create a training sample for the pattern recognition task being performed by the Socratic controller. In this training sample the input observations would include the union of all the input observations of all the component classifier modules. The input observations would also include any output results obtained from the component classifier modules. In addition to the particular best label chosen by each component classifier module in its pattern classification task, these output results may include other things computed by the component classifier module, such as the score of the best scoring class, a vector of estimated a posteriori probabilities for all the target classes, or a score indicating the component classifier module's own estimate of its likelihood of being correct in this particular instance. The target output for the Socratic controller for this particular set of input observations would be the pattern form assembled in block 930. Thus, together these input observations and this target output would form a standard input-output pair of a training sample. That is, these input observations are given as a training sample with the target output designated as the correct "answer," and one sample of training statistics is accumulated by the designated training process.

Block 960 accumulates training statistics from multiple training samples as the loop from 920 to 970 is executed multiple times.

Block 970 checks to see if a stopping criterion is met. The stopping criterion may simply be that there is no more practice data available. If the stopping criterion is not met, control returns to block 920 to get another practice item.

If the stopping criterion is met, control proceeds to block 980, which updates the models in the Socratic controller.

Figure 10:
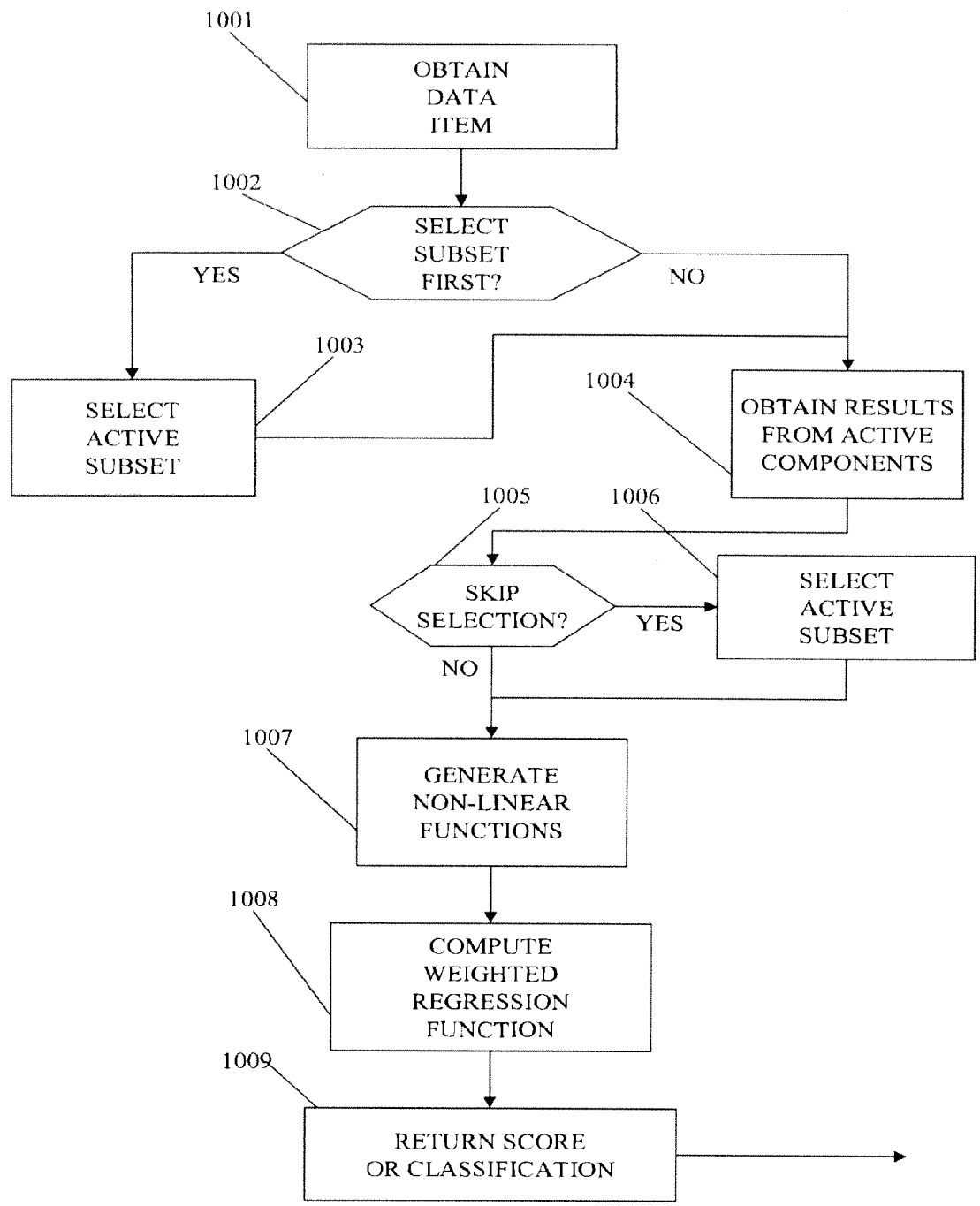
FIG. 10 is a flowchart of an implementation of the operation of a Socratic controller in the recognition process.

FIG. 10 is a flowchart of the operation of a multi-module controller such as a Socratic controller. FIG. 10 illustrates the operation in a recognition task, rather than in the training process.

Block 1001 obtains a data item to be recognized.

In one embodiment, the Socratic controller, or other multi-module controller, may have many component modules, so there are two points in the process at which a smaller subset of the modules may be selected as the active subset. Block 1002 checks to see whether such a selection of an active subset should be performed based on the directly observed data alone.

If such a selection is to be performed, control passes to block 1003, which performs such a selection. In one embodiment, the selection would be based in part on the estimated reliability of the component lower-level classifier modules, as estimated by the higher-level, multi-classifier module controller or Socratic controller. If a selection of an active subset is performed by block 1003, then the inactive component classifier modules do not need to perform any classification for the obtained data item, so a considerable amount of computation may be saved.

If block 1002 determines that no active subset selection is to be performed at this stage, then all the component classifier modules are active and control passes directly to block 1004.

Block 1004 obtains results from all of the active component classifier modules for the data item.

Block 1005 checks whether the selection of a smaller active subset is to be performed at this stage. At this stage, the selection process has available the component output results obtained in block 1004 as well as the original obtained data item. Therefore, in some embodiments it is beneficial to perform a further, more precise selection.

If a subset selection is to be performed at this stage, block 1006 performs that selection. The selection is based in part on the higher-level module's estimate of the reliability of the lower-level component classifier modules for the particular obtained data item. However, at this stage the input data for this Socratic pattern classification problem includes the comparative results of all of the active lower-level classifier modules and the scores and confidence measures computed by these active components.

In some embodiments, there may be a large number of component classifier modules, including classifier modules that specialize in handling particular situations. In this case, the number of active components selected at this stage may be a very small, sparse subset of the total set of component classifier modules. Restricting the active components to such a small subset greatly simplifies the problem of training the weights or other parameters used in the process of combining the component results into a single overall result.

Blocks 1007 through 1009 illustrate one particular embodiment for the process of combining the component results. However, any general method of non-linear regression may be used for this process.

Block 1007 generates a specified set of non-linear functions. In one embodiment, the component modules are trained to work cooperatively, rather than merely being trained independently on each component's individual task. The training process may include collecting statistics on correlations among the results of the component modules. In some embodiments, new specialized components may even be created specifically to handle cases in which the previous components fail. Thus, there is knowledge about the correlations and interactions among the component modules. In one embodiment, the non-linear functions generated by block 1007 will include functions of products of scores and bilinear and other functions with variables from more than one component.

In the illustrated embodiment, block 1008 computes a weighted regression function in the expanded vector space that includes the values of the non-linear functions computed in block 1007, as well as the feature values of original obtained data item and the output results of the active component classifier modules.

Finally, block 1009 returns the computed composite score and/or classification result.

Figure 11:
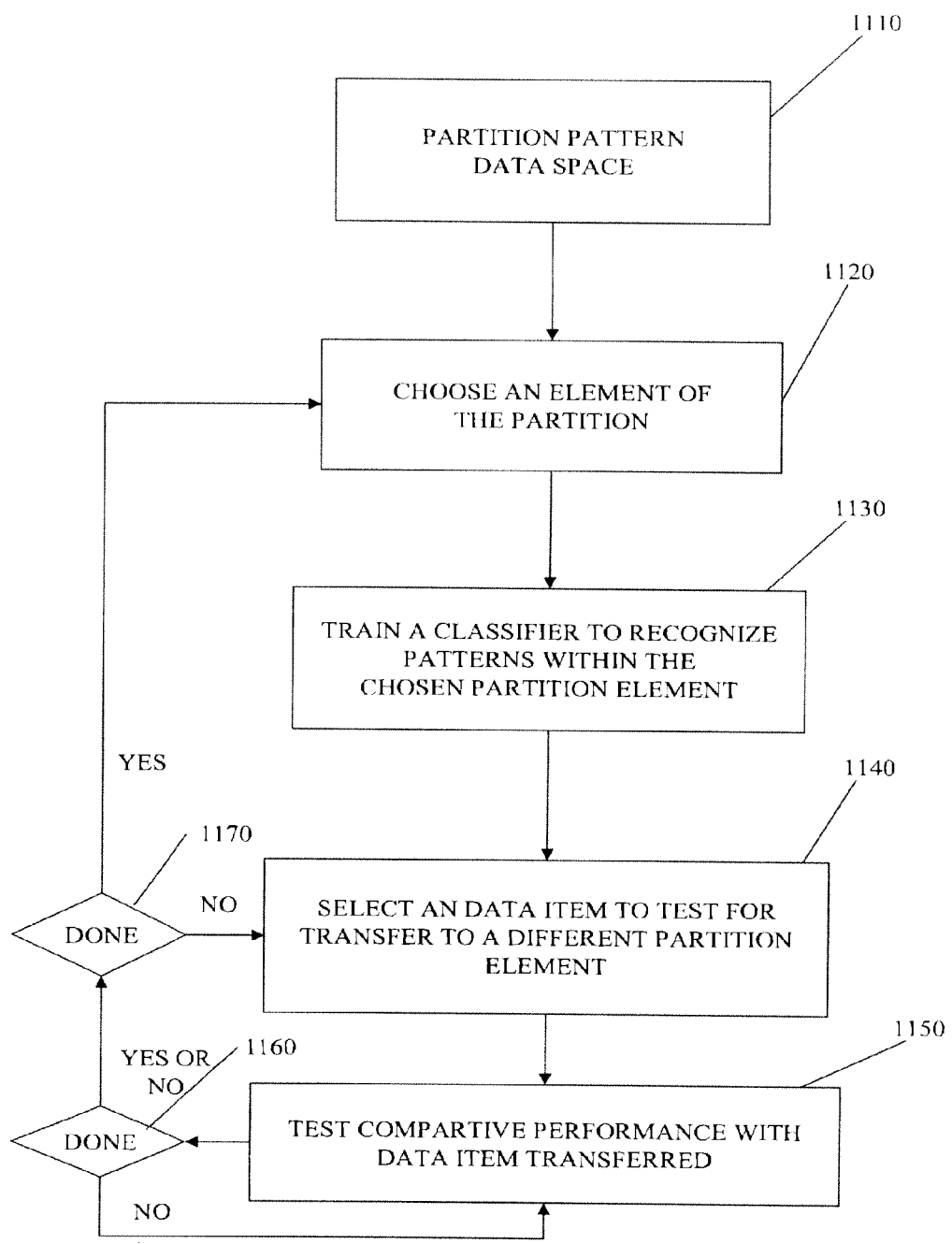
FIG. 11 is a flowchart of an implementation of the operation of partitioning a pattern space to create multiple specialized classifier modules.

FIG. 11 is a flow chart of a process that may be used in some embodiments as part of the process of a Socratic controller estimating the reliability of a collection of lower-level component classifier modules. The process shown in FIG. 11 is more general, however, and may be applied as a method of training a pattern recognition system in any situation in which it is expected that different models should be used in different parts of the data space.

Block 1110 obtains a partition of the data space. For example, this initial partition may be obtained by building a decision tree to solve a specified classification problem with each element or sector in the data space representing a region of data for which the classification decision is a particular value.

Block 1120 chooses an element of the partition obtained in block 1110. That is, it chooses one of the regions into which the data space has been divided.

The underlying concept is that a different set of models may be trained in each element of the partition. The process shown in FIG. 11, however, is focused on a particular subproblem. The process shown in FIG. 11 uses the technology of Socratic agents to optimize the assignment of training samples to elements of the partition.

Block 1130 trains a classifier module to recognize patterns for a specific classification task, but restricted to data items from the chosen element of the partition. Different models and even different classifier modules may be used in different elements of the partition. In particular, in some embodiments the partition may be used in the process of selection of active components in a multiple component Socratic controllers such as shown in FIGS. 8 to 10.

Block 1140 selects a sample from the chosen element of the partition. This sample is chosen as a candidate for transfer to a different partition element. Preferably, the sample will be selected based on measurements that indicate that the classification of the selected sample will be better using the models and classifier modules in the new element than in the current element. However, the overall process shown in FIG. 11 does performance optimization, so even a random selection of a sample in block 1140 will work, but perhaps less efficiently.

In one embodiment, typically the partition will be determined by a finite set of training samples, with the partition being computed based on these training samples. Preferably, block 1140 chooses one of these training samples or adds the chosen sample to the training set. The chosen sample is not explicitly transferred to a different element of the partition, but the partition is merely recomputed with the chosen sample labeled in training so as to be attempted to be assigned to the new partition element. This process is called a soft transfer rather than a hard transfer. When a transfer is completed, it signifies that the sample that has been transferred is more consistent when grouped with region to which it has been transferred, in that the performance is improved when using the new partition compared to using the partition computed from the sample assignments from before the transfer.

Block 1150 tests whether the performance, comparing the performance doing the selected soft transfer versus not doing the selected soft transfer. In one embodiment this comparison is done as a delayed-decision test by a Socratic agent. The Socratic agent creates a paired-model structure and performs a sequential decision test of the null hypothesis. The null hypothesis in this case is that the performance is the same whether or not the soft transfer is done.

Block 1160 tests whether or not the null hypothesis for a particular Socratic agent can be rejected at the specified level of statistical significance. If so, the accumulation of evidence for a particular Socratic agent may be terminated. If not, control is returned to block 1150 and further evidence is accumulated for the particular Socratic agent.

In one embodiment, many such Socratic agents may actively be evaluating their null hypotheses at the same time. One implementation would be a multi-threaded process with each Socratic agent running in a distinct thread. In FIG. 11, this process is represented by the fact that in the test in block 1160 even if the current Socratic agent is not finished the process creates a thread that proceeds to block 1170, in addition to the returning to block 1150 to continue with the current Socratic agent.

Block 1170 tests whether the process should merely continue with the selection of another sample from the current partition or if control should instead return to block 1120. Control should return to block 1120 if either a stopping criterion is met that indicates that the current partition element has been processed enough, or if a stopping criterion is met that indicates that the number of changes made in the partition is such that the block 1130 training of the models specific to a given partition element should be recomputed.

If neither stopping criterion is met, control returns to block 1140 and a new sample is selected as a candidate to soft transfer to a different partition element. If either stopping criterion is met, control goes to block 1120 to again choose a partition element. The choice in block 1120 is with replacement. That is, a previously chosen partition element may be chosen again. In the one embodiment, the process continues indefinitely, so each partition element is chosen many times as the system continues to evolve. However, if for any reason, it is desired to have a stable partition, the process of FIG. 11 may be suspended for an arbitrary period of time and the partition elements may be frozen as soon as all the active Socratic agents terminate.

Figure 12:
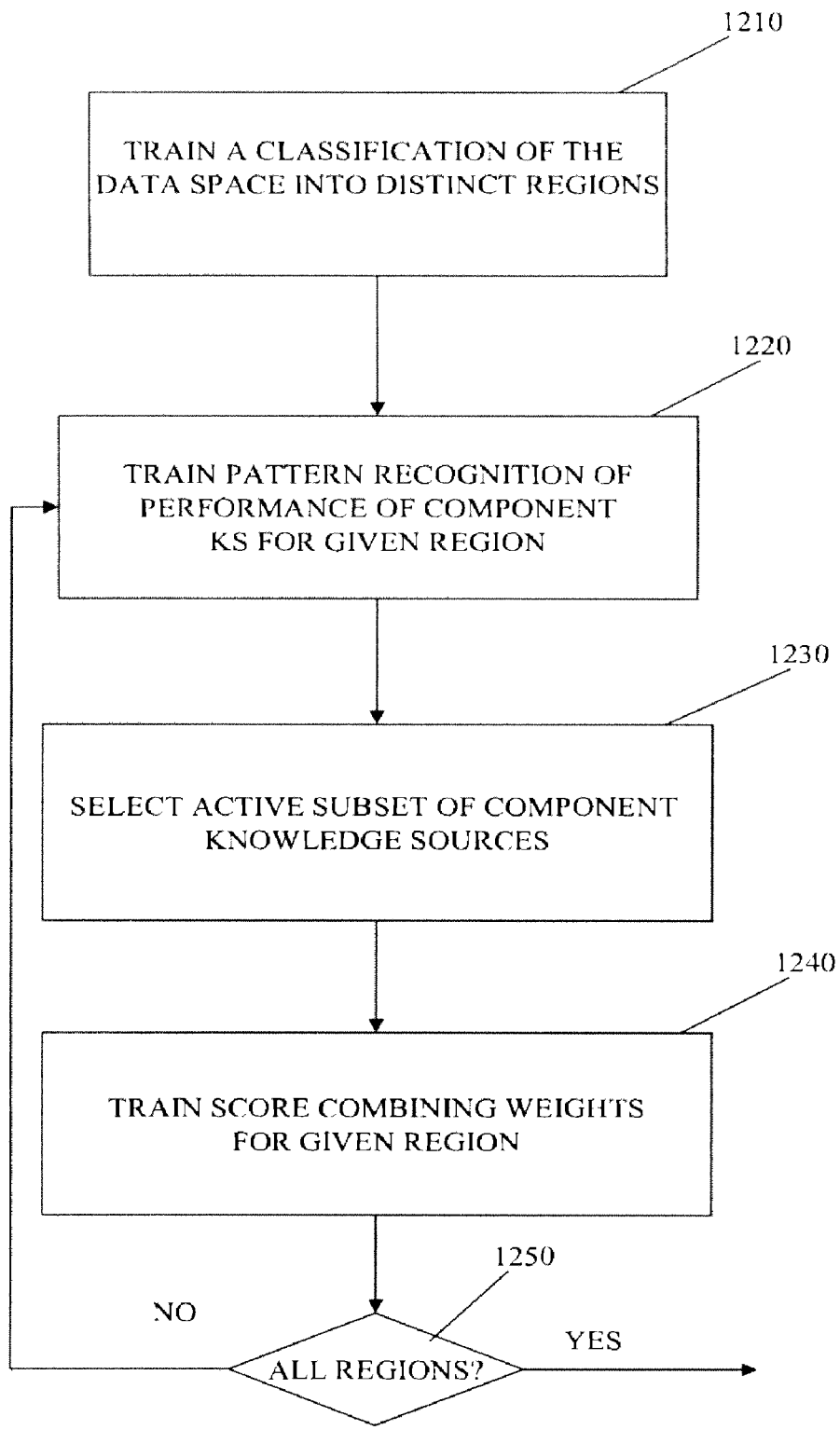
FIG. 12 is a flowchart of an implementation of a Socratic controller by partitioning the data space.

FIG. 12 is a flowchart of one embodiment for the knowledge representation and training for a Socratic controller with multiple lower-level classifier modules. As already discussed in reference to other Figures, one task of a Socratic controller as a Socratic controller is to estimate the reliability of the lower-level classifier modules. This task of estimating the reliability of the lower-level classifier modules is itself a pattern recognition problem. One approach to the problem of combining the results of the lower-level classifier modules is to treat it as a problem in non-linear regression.

FIG. 12 is a flowchart of one embodiment of a Socratic controller to accomplish these tasks.

An underlying concept in this one embodiment is that in a system with many classifier modules, certain classifier modules will work well in certain regions of the data space and other classifier modules will work well in other regions of the data space. For example, a classifier module that has been based on human design effort will often perform well on cases that are like those that have been explicitly considered by the designer but may perform less well on some of the cases that have not been explicitly considered in the design. As another example, a classifier module that has been trained primarily on samples from a given environment may not perform as well on data obtained from a different environment. In many applications this property will occur naturally. In one embodiment of the invention, this property will be further enhanced because each classifier module will be specifically trained to do well in certain assigned regions of the data space and new specialized classifier modules will be automatically created to improve performance in regions of the data space in which existing classifier modules do not perform adequately.

Block 1210 trains a classification of the data space into distinct regions. In the one embodiment, this classification is done by a decision tree, which is a process well known to those skilled in the art of pattern classification. A classification of the data space is a classification that determines a partition of the data space. In the one embodiment, the partition of the data determined by the decision tree is further optimized by the process shown in FIG. 11.

Block 1220 trains the lower-level classifier modules of the Socratic controller being trained. In one embodiment, the lower-level classifier modules are trained for data within a given region of the data space. That is, in this embodiment each lower-level classifier module is trained to have a set of models specific to the given region of data space, by training on data only from that region.

Block 1230 selects a subset of active lower-level classifier modules. In one embodiment, the Socratic controller performs a higher-level classification task modeling the performance of the lower-level classifier modules. The subset of lower-level modules that are estimated as the highest performing lower-level modules in the given region of data space is selected as the active subset. The set of active classifier modules will be different for different regions, even for a given Socratic controller.

Block 1240 trains the weights for combining the scores returned by the lower-level classifier modules. In one embodiment, the weights are computed by estimating a regression function associated with the higher-level classification task in which the Socratic controller estimates the performance of the lower-level classifiers for the given region of data space. A different regression function of combining weights is computed for each region.

Block 1250 tests whether blocks 1220 through 1240 have been executed for each of the regions in the data space. If not, control returns to block 1220 to train another region. When all the regions have been done, the process exits.

Figure 13:
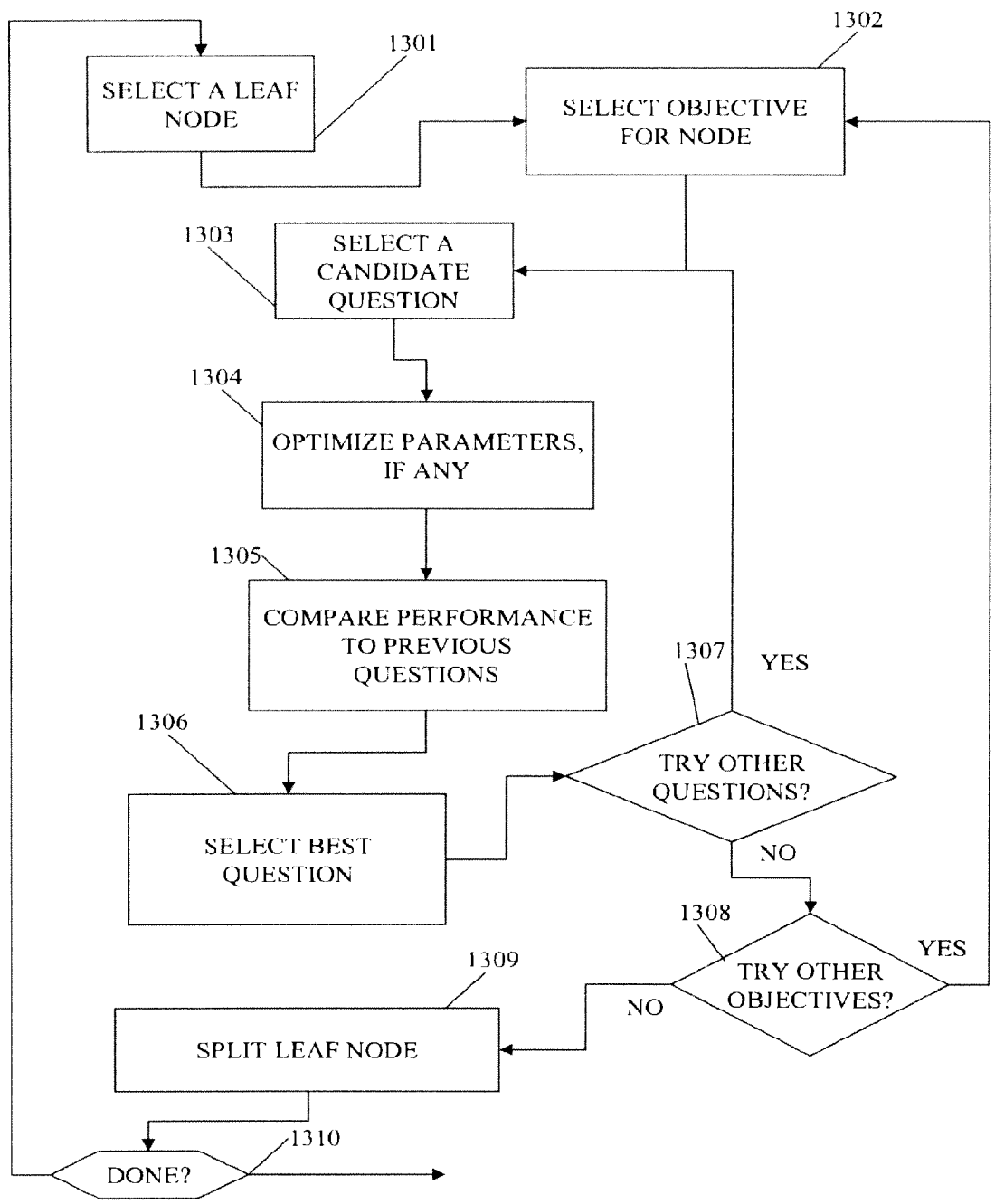
FIG. 13 is a flowchart of a decision tree builder.
Figure 14:
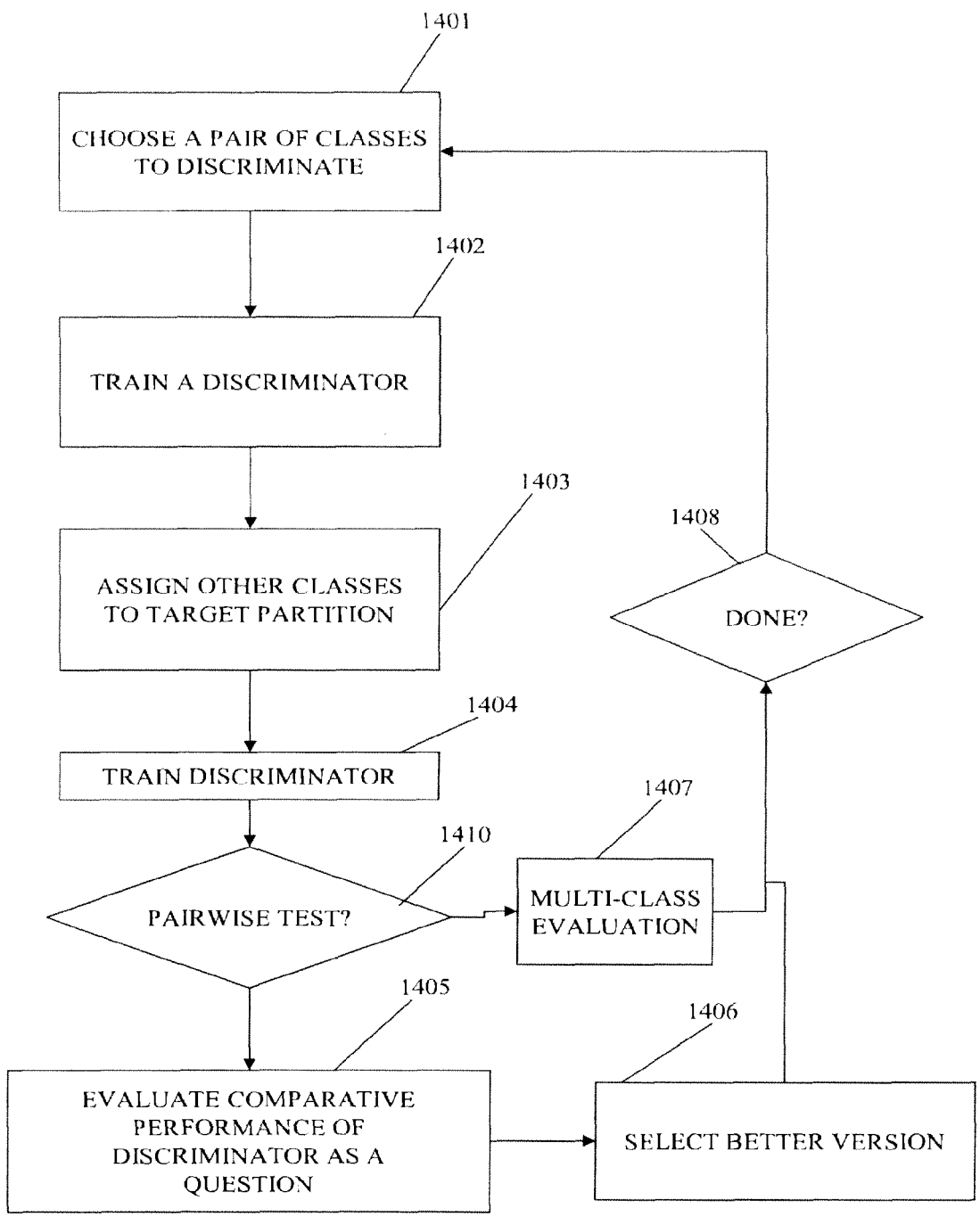
FIG. 14 is a flowchart of a process for developing questions of a multiple class decision tree.

FIGS. 13 and 14 relate to methods for building a decision tree. Decision tree building may be applied to recognition on any kind of patterns. To provide a illustrative examples for some of the steps in the processes shown in FIGS. 13 and 14, examples will be draw from the recognition of phonemes in continuous speech. Phonemes are the basic sound units in speech, roughly corresponding to letters in written test. These examples from the recognition of phonemes are provided only as illustrative examples and not as imposing any limitations or restrictions on the embodiments described or on the invention.

FIG. 13 is a flowchart of one method for building a decision tree such as could be used to classify regions of the data space in the embodiment of block 1240 of FIG. 12.

Block 1301 selects a leaf node (a node without any branches). The process begins with an empty tree, that is, a tree with a single node and no branches. The single node is the root node. Initially, since it has no branches it is also a leaf node.

There are well-known algorithms for building classification and regression trees. These well-known algorithms may be used to build a decision tree for partitioning the data space for a Socratic controller. However, the purpose for partitioning the data space is not the normal objective of a classification problem. One embodiment of the invention uses a non-standard algorithm, adding blocks 1302 and 1307 to a standard tree building algorithm.

Block 1302 selects an objective for the node selected by block 1301. In a standard binary classification problem, the objective of each node in typical tree-building procedure is simply to maximize the decrease in entropy that is achieved by splitting the data according to the data test that is selected for the node. In building a tree for partitioning the data space for a Socratic controller, the objective of each node is less well defined.

Overall the purpose of the tree is to partition the data space such that for each region of the space the reliability of each lower-level classifier module is relatively constant, whereas the reliability of the lower-level classifier module may vary from one region to another. Rather than having a single objective, this decision tree has an objective for every one of the lower-level classifier modules controlled by the Socratic controller. In one embodiment, these multiple objectives are addressed by having different objectives be optimized at different nodes within the tree.

Block 1302, therefore selects a particular subset of the lower-level classifier modules. The tentative objective for the selected node then becomes to maximize the amount of information that is obtained about the reliability of the selected subset of classifier modules by the data split that is made at the node. By way of illustration, one embodiment of a phoneme recognizer might have a separate classifier module as a detector for each phoneme. In this embodiment, an example of a subset of the classifier modules would be the set of classifiers that detect vowels. Another example of a subset would be the set of classifiers that detect voiceless sounds.

Block 1303 selects a candidate question. A question is some test on the data that splits the data at the node into two complementary subsets. For one embodiment of a phoneme recognizer, the data to be recognized would be the result of signal processing the speech waveform using techniques such as a Fourier transform. An example data feature might be the magnitude of the Fourier transform of the speech signal at a given frequency for a given placement of a time window within the speech utterance. An example question in this embodiment would be whether the magnitude of this Fourier feature exceeds a certain specified value. Another example question would be whether the magnitude of the Fourier transform at a particular frequency is greater or less than the magnitude at the same frequency in the next time window. Another example question would be whether the magnitude is a local maximum in frequency, that is, whether it is greater than the magnitude at the two adjacent frequencies, one lower frequency and one higher frequency.

Block 1304 optimizes parameters if the selected question has adjustable parameters. For example, one type of question is a linear discriminant function. In one embodiment of the phoneme recognizer example, a linear discriminant function might be constructed to discriminate vowels from fricatives. The parameters of this discriminant function would be optimized for the discrimination task before measuring the performance of the question on the node splitting task in the tree building process. Another form of question compares the value of some function of the data with a decision threshold value. In one embodiment of the phoneme recognizer example, an example of this form of question would be the comparison of the magnitude of the Fourier transform at a particular frequency of a particular placement of a time window of the speech to a specified value. The specified value would be adjusted to optimize the performance on the node splitting performance measurement to be applied in block 1305.

Block 1305 compares the performance of the selected question, with its optimized parameters, to the performance of previous trial questions. In one embodiment, the performance of a selected question is the amount of mutual information or decrease in entropy that is achieved by the refined partition based on the question compared to the partition without the question. That is, in this one embodiment the performance of a given question (after optimizing parameters) is measured by the amount of decrease in the function i(N) given by $$i(N) = -\Sigma_j P(w_j) \log_2 P(w_j),$$

where $P(w_j)$ is the fraction of data samples at node N that are in class $w_j$.

Block 1306 selects the best performing question among those evaluated so far.

Block 1307 applies a stopping criterion to test whether additional trial questions should be evaluated. If so, control returns to block 1303. If not control proceeds to block 1308.

Block 1308 applies a criterion to test whether other objectives should be evaluated for the selected node. If so, control returns to block 1302. If not, control proceeds to block 1309.

Block 1309 selects the best objective and the best question for that objective. It associates the selected question with the selected node. It applies the question to split the training data. Two new branches leaving the selected node, each with a new leaf node, are created. The data that answer the selected question one way follow the left branch and the data that answer the selected question the other way follow the right branch. For example, in one embodiment of the phoneme recognizer for a particular selected node the best objective in terms of the node splitting performance measured in block 1305 might be the objective of separating the vowel detectors from the fricative detectors. The best question for that objective might be the ratio of the magnitude of the Fourier transform summed across all the high frequencies compared to the magnitude of the Fourier transform summed across all the low frequencies. In this example, the data samples with greater magnitude in high frequencies would go down one branch, say the left branch. The data samples with greater magnitude in the low frequencies would be sent down the right branch. That is, the high frequency data samples would be presented as samples to the node at the end of the left branch and the low frequency data samples would be presented as samples to the node at the end of the right branch.

Block 1310 applies a stopping criterion to test whether the tree-building process is complete. In one embodiment, there a minimum is set for the quantity of data available at a node in order for the node to be selected in block 1301 as a node to be split. The tree building process is terminated if there are no more nodes to be split, or if some other stopping criterion, such as a maximum number of levels for the tree, is reached. If no stopping criterion is met control returns to block 1301.

FIG. 14 is a flowchart of one process for developing questions to be used in a multiple class decision tree, such as the decision tree used in one embodiment of a Socratic controller to partition the data space for estimation of reliability of the lower-level classifier modules. In one embodiment, this will be a source for the questions selected in block 1303 of FIG. 13.

For the reliability estimation in a Socratic controller, the classes to be discriminated are implicit rather than explicit. For the data at any node in the decision tree there will be some lower-level classifier modules whose performance varies substantially across different regions of the space. For example, suppose in one embodiment of a phoneme recognizer that the preceding node has been split based on a comparison of high frequency energy with low frequency energy in order to satisfy an objective of separating vowels from fricatives. For the example consider the node for which the data samples have more high frequency energy. Although fricatives generally have more high frequency energy than vowels, there is much more high frequency energy in some fricatives than in others. The fricative /s/ has the most high frequency energy. The fricatives /sh/ has a considerable amount of high frequency energy, but it is mostly at a lower frequency than for the /s/. The fricatives /f/ and /th/ have less energy overall and the energy is spread out over both low and high frequencies. Thus in the illustrative example it is likely to be the case that the performance of the lower-level detectors for /f/ and /th/ varies depending on the data even though the data has already been selected to have more high frequency energy. On the other hand the performance of the /s/ detector might be high for most of the data samples that come to this node. For lower-level classifiers that do not already classify the data consistently, the objective is to ask an additional question to divide the data space such that for each of the lower-level classifier modules the performance will be relatively constant in each of the two divisions of the space. For lower-level classifiers whose performance does not vary much across the undivided space, whether that performance is good or poor, it doesn't matter very much where the space is divided.

Block 1401 chooses a pair of classes to discriminate. In one implementation of a Socratic controller, the choice in block

1401 is of a particular lower-level classifier module. The two classes to be discriminated are the region of good performance by that particular lower-level classifier from the region of poor performance by that particular lower-level classifier. Carrying forward the example above, the chosen lower-level classifier might be the /f/ detector. The pair of classes to be discriminated is the data on which the /f/ detector makes a correct decision (that is, it decides correctly whether or not a given data sample is an /f/) versus the data on which the /f/ detector makes an error.

Block 1402 trains a discriminator for the two class problem. There are many well-known techniques for training a two-class discriminator. In one embodiment, a simple form of discriminator is used in which a test is made on only one data feature. In this one embodiment, the training is done by trying each data feature, and for each data feature creating a discriminator by testing whether the value of the feature is greater or less than a specified threshold value. The threshold value is set to optimize a data splitting criterion, such as the one described in reference to block 1305 of FIG. 13.

Block 1403 assigns other classes to the target partition. In one implementation of a Socratic controller, the performance of the lower-level classifier is measured on the two regions of the division computed in block 1403. If the performance of a particular lower-level classifier is significantly better in one of the two divisions, then that division is assigned to the class indicating good performance by that particular lower-level classifier and the opposite division is assigned as a target class the indicator of poor performance by that particular lower-level classifier. Continuing the above example, it may be that the /th/ detector performs well on data for which the /f/ detector performs well and performs poorly on the data for which the /f/ detector performs poorly. Then the /th/ detector would be assigned to the same class as the /f/ detector. This good-class versus poor-class assignment is made for each lower-level classifier for which the performance varies significantly between the two parts of the division. In the example, it might be that many of the vowel detectors perform uniformly poorly on both of the divisions determined by the /f/ detector and that the /s/ detector performs well on both divisions. In one embodiment, these lower-level classifiers that perform uniformly on the two divisions are not assigned to either class, regardless of whether the uniform performance is good or poor. Lower-level classifiers that perform poorly at a given node in the decision tree will be prime candidates as objectives in nodes further down the tree.

The classification assignments made by block 1403 define a new discrimination problem. In this discrimination problem, each data point is targeted to be assigned to the division that has the most agreements with the good-class, poor-class target values.

Block 1404 trains a discriminator for this new discrimination problem.

Block 1410 checks whether a pairwise test is to be made on the quality of the discriminator trained in block 1404. In one embodiment of a Socratic controller, such a pairwise test is always to be used. If a pairwise test is not to be used, then the process proceeds to block 1407, which uses a non-Socratic multi-class objective measurement. In one embodiment, the multi-class evaluation is performed by a Socratic agent as described with reference to FIG. 5, with more than two decision alternatives in block 510 of FIG. 5.

If a pairwise test is to be conducted, control proceeds to block 1405. Block 1405 sets up a Socratic agent to compare the performance of the discriminator trained in block 1404 to the best discriminator previously found. The two candidate discriminator form a paired-model allele. The Socratic agent performs a sequential decision test on this paired-model allele as shown in FIG. 5.

Block 1406 selects the better of the two discriminators evaluated in block 1405, which now is the best discriminator which has been found so far.

Block 1408 checks whether a stopping criterion has been met. If not, then control returns to block 1401 and another pair of classes is chosen. In one embodiment of a Socratic controller each candidate pair of classes is associated with a particular lower-level classifier module, so the number of possible choices in block 1401 is limited to the number of such lower-level classifier modules.

Figure 15:
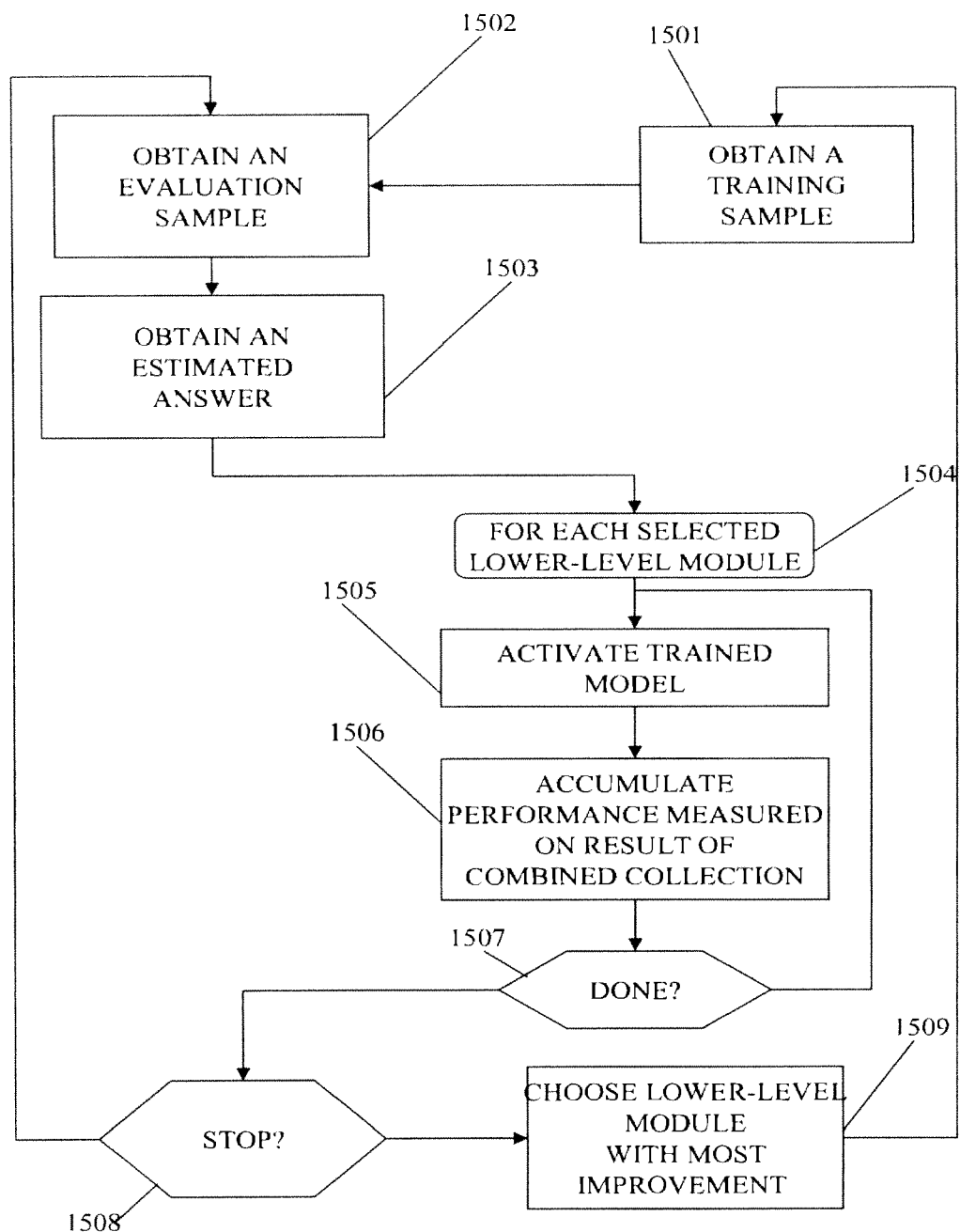
FIG. 15 is a flowchart of a process for choosing which component to train in a multiple classifier system.

FIG. 15 is a flowchart of a process for choosing which lower-level classifier modules to train when training a collection of lower-level classifier modules controlled by a Socratic controller. For this training, there is a set of training data and a set of practice data, which in this context is also called evaluation data.

Block 1501 obtains a training sample, that is a training sample comprising a data item and an associated label.

Block 1502 obtains an evaluation or practice sample. In one embodiment, the labels for the training data and the practice data will already have been corrected by using delayed decision training with label correct as shown in FIGS. 3 and 6.

Block 1503 obtains an estimated answer for the evaluation sample. The estimated answer is simply the label associated with the evaluation sample. It is called an estimated answer here to emphasize the fact that it is not assumed that the labels for the practice data have been created or verified manually. Rather they may be automatically generated labels for data that is originally unlabeled or only partially labeled. The process of FIG. 15 is as tolerant of labeling errors in the practice data as is the delayed-decision training process for Socratic agents.

Block 1504 controls the loop that evaluates lower-level classifier modules as candidates to be trained using the training sample obtained in block 1501. In one embodiment, the Socratic controller first selects a subset including the lower-level classifier modules that the Socratic controller estimates as the most likely to improve performance by training on particular training sample. Block 1504 is positioned in the flowchart based on its role of controlling the loop through all selected lower-level classifier modules. In one embodiment, the selection depends only on the data features of the training sample, so the subset selection can be done outside the loop beginning at block 1505. In one embodiment, each lower-level classifier module is trained on the given training sample and the amount of change in the models in each module is measured. A subset of the modules with the greatest change in their models is selected.

For each selected lower-level classifier module, block 1505 trains the model for the given lower-level classifier module and creates a matched-pair allele of models with and without training on the training sample obtained in block 1501.

Block 1506 basically follows the procedure of delayed decision training However, rather than making a decision to train or not on the given evaluation sample, block 1506 merely records the information as to how much improvement in performance is achieved for the given lower-level classifier module. It accumulates such performance measurements across all passes through the loop from block 1502 to block 1508.

Block 1507 completes the loop of selected lower-level classifier modules. For each selected classifier module, further performance data has been accumulated, but the decision of which lower-level module or modules to choose will be based on multiple evaluation samples, and is postponed to block 1509.

Block 1508 applies a stopping criterion to test whether enough evidence has been accumulated to select which lower-level classifier module or classifier modules should be chosen to train on the training sample obtained in block 1501. If the stopping criterion is not met, control returns to block 102 to obtain another evaluation sample. Otherwise control proceeds to block 1509.

Block 1509 chooses the classifier module that achieves the most improvement by training on the given training sample, or chooses a small number of the most improved classifier modules. The control returns to block 1501 to obtain another training sample. This training process is an on-going process that in some embodiments may proceed indefinitely. Because block 1509 chooses only one or a small number of classifier modules to be trained on any given sample, the lower-level classifier modules learn to specialize and become more diverse. Furthermore, as the process continues all performance measurements are made in the context of the performance of the composite result computed by the Socratic controller. Therefore, the training selection is chosen to optimize this composite performance, not the performance of any individual lower-level classifier module.

FIG. 16 illustrates how a Socratic agent can empirically adjust a system control parameter. Note that a system control parameter can be empirically tuned by simple hill-climbing based on measured performance if a sufficient quantity of labeled practice data has been set aside. The procedure illustrated in FIG. 16, however, is more robust and an unlimited quantized of semi-supervised evaluation data may be used. If practice data is available, then either non-Socratic hill-climbing based on performance on practice data, or the procedure of FIG. 16 may be used, on a case-by-case basis at the option of the system designer.

As an illustrative example, consider an image recognition system. For the example, assume that the image recognition system has a collection of low level classifier modules that detect components of images and features of objects within an image, such as edges, corners, texture, shading, reflectivity, and do forth. Further assume the image recognition system has a number of intermediate level classifier modules that receive as input the results output by the low-level modules. Assume that these intermediate-level modules all try to segment and classify objects within the image. For the purpose of this illustrative example consider a Socratic controller that has this set of intermediate-level modules as its lower-level classifier modules. For purpose of the example, call the intermediate-level modules that are the lower-level modules for the Socratic controller the "given modules." Assume that the given modules use a variety of techniques to identify different kinds of objects. For example, assume that some of the given modules specialize in recognizing that a given portion of an image is a face. Assume that other modules specialize in distinguishing the face of one person from the face of a different person. Assume that some modules specialize in recognizing geometric shapes and that others specialize in recognizing animals. More generally assume that the Socratic controller is associated with a wide variety of given modules that use a wide variety of pattern recognition techniques.

Consider now the training of the Socratic controller and the given modules, which are in this context its associated lower-level modules. One embodiment of a process for training the higher-level classifier module on the higher-level pattern-classification problem within the Socratic controller was shown in FIG. 9. This embodiment is not dependent on the particular type of lower-level pattern classification being done by the associated lower-level classifier modules, and will not be discussed further in this particular illustrative example.

However, in this example, the given modules also need to be trained, with the assistance of the Socratic controller. One embodiment for such training has been shown in FIG. 15. The key steps of the training process are a follows: First a collection of classifier modules is obtained. In the example, these modules are the intermediate-level image classifier modules, but they are referred to as lower-level modules relative to the Socratic controller. The Socratic controller optionally performs a higher-level pattern recognition process to select the lower-level classifier modules most likely to improve from training on a particular sample obtained in block 1501. In any case, the Socratic controller performs a higher-level pattern recognition task as part of the recognition, in selecting the active subset of lower-level classifier modules and/or in combining the results of the lower-level classifier modules into a composite result, as shown in FIG. 10.

In the training process, the Socratic controller actively controls the training of its associated lower-level classifier modules. The overall effect of the process shown in FIG. 15, is that only one or a very small number of lower-level classifier modules is selected to be trained on any one training sample. Training different lower-level classifiers on different samples will tend to increase diversity even if the assignment of training samples to modules is made randomly or is made based on some criterion that is not directly related to diversity. However, in the process shown in FIG. 15 the training assignment are made to directly increase the end objective, which is improved recognition performance. Diversity is increased directly in proportion to the extent that the diversity contributes to improved recognition performance.

In terms of the illustrative example, the example image recognition system has many different kinds of intermediate classifier modules, which are the lower-level modules for the given Socratic controller. Consider a specific training example of an image that includes a person's face. The subset selection among the classifier modules would select a subset composed mostly of classifier modules that either recognize that a face occurs in the image or that distinguish one face from another. The selected subset is trained on the given training sample. In one embodiment the trained version is made the inactive member of a linked allele. In one embodiment, the image recognition system proceeds with its normal recognition tasks. The data to be recognized is made into practice data by assigning labels based on the automatic recognition plus human-supplied error correction, if any happens to be available. From this practice data, any practice samples that involve the models in the linked allele may be used for evaluating the comparative performance of the training of the respective lower-level classifier modules.

Assume that a particular one of the lower-level classifier modules has never been trained on a face that is similar to the face in the given training sample. Assume that another one of the lower-level classifier modules has been trained on a large number of faces that are somewhat similar but that have a high degree of variability among them. It cannot be determined from the given characteristics which of the described lower-level classifier modules will benefit the most from being trained on the given training sample. More importantly, just from these characteristics it cannot be determined which choice will most improve the overall recognition performance.

In particular, training the lower-level module that has never seen a similar face might significantly improve is performance on other similar faces, whereas training the other lower-level module might make less difference since for that module it would only be one more example among a large number of similar examples. However, if the first module has never seen a similar face, it might have learned to specialize in other kinds of faces for which the given training sample would be an outlier. Forcing this module to train on the given training sample might degrade its models (depending on internal details that will be ignored for the example). It might further be the case that, if the first module has specialized in other kinds of faces, then not training it on given training sample will not hurt overall system performance because other modules, including the second described module handle faces like the one in the given training sample. This example indicates that it might be difficult to decide which lower-level modules should be trained on a given training sample.

The Socratic controller actively controls the training process. It answers the question of which lower-level classifier modules to train on a given training sample by a kind of delayed decision testing. The process is robust against labeling errors in both the training data and in the practice/evaluation data, because decisions are based on the accumulation of statistically significant evidence across a substantial plurality of practice samples.

In reference to FIG. 16, block 1601 selects a system control parameter. A system control parameter is a scalar-valued parameter that controls the process flow, such as the amount of data to accumulate before applying the stopping rule in block 310 of FIG. 3 or block 409 of FIG. 4. More generally, any scalar-valued parameter that does not change or depend on the particular data being analyzed in a given data item may be treated as a system control parameter and optimized by the procedure illustrated in FIG. 16.

Block 1602 creates two versions of the system or subsystem under study. In one version, the selected parameter is incrementally decreased. In the other version the selected parameter is incrementally increased. The default value for the amount to increment a parameter is itself a system control parameter, which may be optimized by the process of FIG. 16. For a given control parameter, the default increment value is adjusted by the range or scale of the given parameter, unless all control parameters are normalized to the same scale (possibly by a non-linear transformation), such as a scale of 0 to 1. If a particular control parameter has already been processed as illustrated in FIG. 16, the size of its increment may be increased or decreased from the previous value, depending on the prior behavior. If testing of the given control parameter has been stopped by block 1608 without the null hypothesis being rejected, then the increment may be increased from the size of the increment used in the previous test. If there have been inconsistent decisions among multiple previous rounds of testing, that is, if sometimes the null hypothesis has been rejected in favor of increasing the parameter and sometimes it has been rejected in favor of decreasing the parameter, then the size of the increment may be decreased from its previous value.

Block 1603 obtains an evaluation sample and begins an evaluation loop.

Block 1604 obtains an estimated answer for the given evaluation sample. If a human-supplied or human-verified answer is available, then that answer may be used as the estimate. If a semi-supervised label is available, that may be used. Alternatively, a new automatically generated answer may be obtained. If the given control parameter only affects a single subsystem or a single classified module in a multi-module system, then the automatically generated answer may be obtained from recognition by the whole system. If the control parameter affects the whole system, then either of two strategies can be used. Recognition can be performed by a collection of two or more complete systems and their consensus answer may be used. A strategy that may be used even when multiple systems are not available is to artificially restrict the application of the perturbed value of the control parameter to a subset of the subsystems or modules. The parameter may then be tested in the same way as a local parameter. The control parameter may be independently tested on the complementary subset or separately on each element of a partition of the subsystems. If the adjustments to the control parameter are inconsistent in different subsets, either the adjustment can be rejected as if the null hypothesis has been confirmed, or the control parameter can be partitioned into local control parameters tuned for each subset of subsystems or modules.

Block 1605 accumulates performance statistics comparing the performance of the system with the two incrementally perturbed values of the control parameter.

Block 1606 tests to see if the null hypothesis can be rejected at the specified level of statistical significance. The null hypothesis is that there is no net performance difference between the two system versions with perturbed values for the given control parameter.

If the null hypothesis is rejected, then the process goes to block 1607, where the better parameter value is chosen. Then the process returns to block 1602 to continue to optimize the selected control parameter.

If the null hypothesis is not rejected, control goes to block 1608, which checks to see if a stopping criterion has been met. If the stopping criterion has been met, then the null hypothesis is accepted. The parameter is left at its unperturbed value and the evaluation the given parameter is halted until the parameter is again selected by block 1601.

Figure 17:
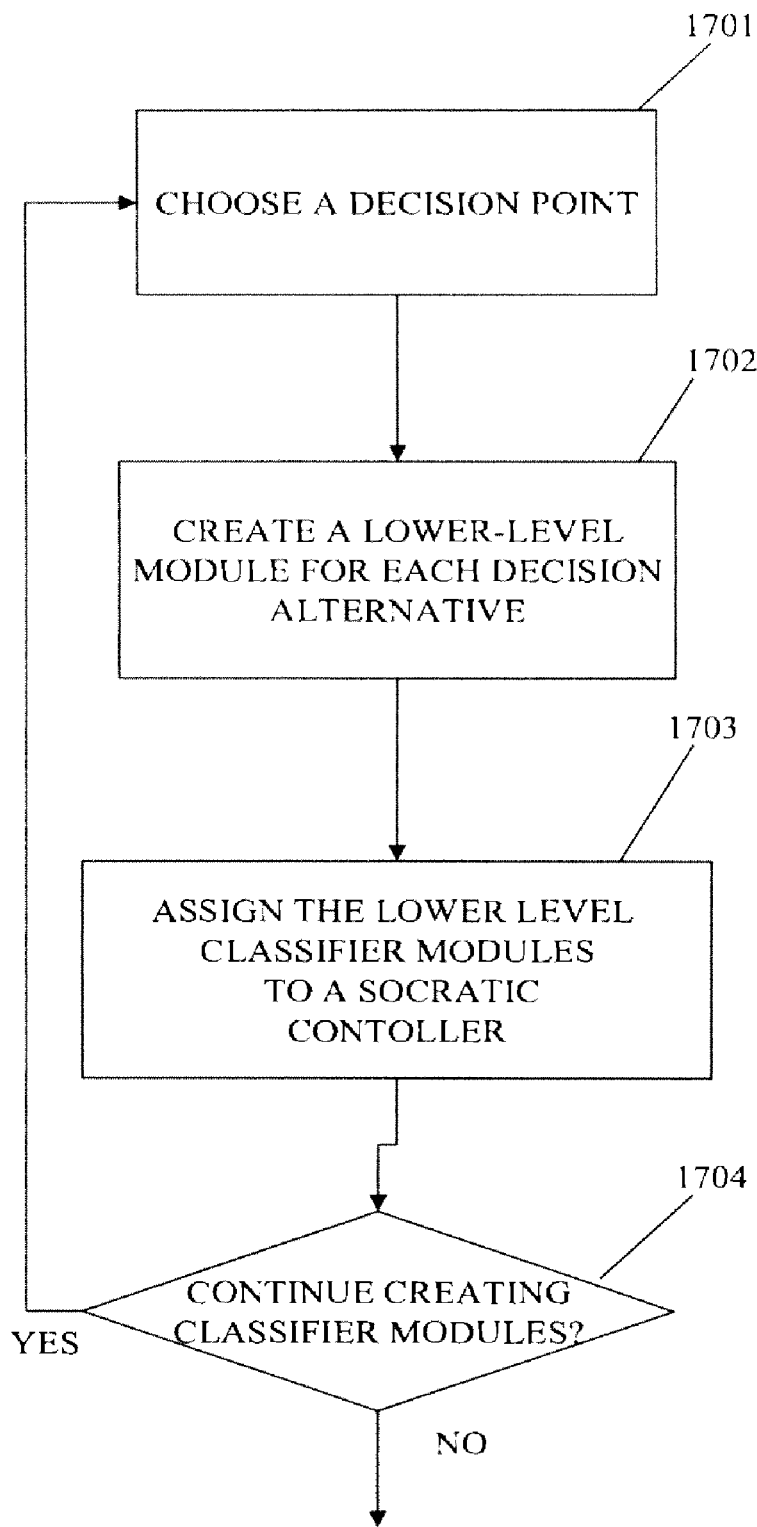
FIG. 17 is a flowchart of a process for creating modules by non-determinism.

The present invention enables a pattern recognition system with a large number of both independent and related classifier modules. FIG. 17 is a flowchart of a process that is used in one embodiment to automatically create classifier modules.

Block 1701 chooses a decision point. This may be almost any kind of decision point. For example, it could be a system design decision, such as what training algorithm to use. With regard to clustering, for example, it could be a decision of what clustering algorithm to use, or it could be a decision of what threshold to use in deciding to merge to clusters. However, it could also be a decision made by a program at a step within the clustering algorithm. In any of the algorithms with stopping rules, there is a whole range of potential decisions at different values of the stopping criterion. For the delayed-decision training procedures shown in FIGS. 3 and 4, there is the possible decision to not choose one of the two alternatives, but rather to accept both. Any choice of a control parameter such as optimized in FIG. 16 could instead be represented as a decision point with multiple alternative values of the control parameter.

Block 1702 creates a lower-level classifier module for each decision alternative at the decision point. It is preferable that these classifier modules be diverse. In particular, it is valuable if each classifier module makes mistakes in different situations than the other classifier modules. The goal of achieving diversity in turn means that there is a preference for choosing decision points in block 1701 that will result in relatively large differences in behavior in the classifier modules arising from the decision alternatives. However, it is not essential that classifier modules have great diversity when first created in block 1702 because the Socratic controller controls the joint training of the collection of associated classifier modules so as to increase the diversity among the lower-level classifier modules.

Block 1703 assigns the lower-level classifier modules created in block 1702 to a single Socratic controller. These new classifier modules may either be assigned to an existing Socratic controller, or a new Socratic controller may be created, initially with just the newly created classifier modules as lower-level classifier modules.

Block 1704 checks whether the process of creating new classifier modules should continue. If so, control returns to block 1701.

Figure 18:
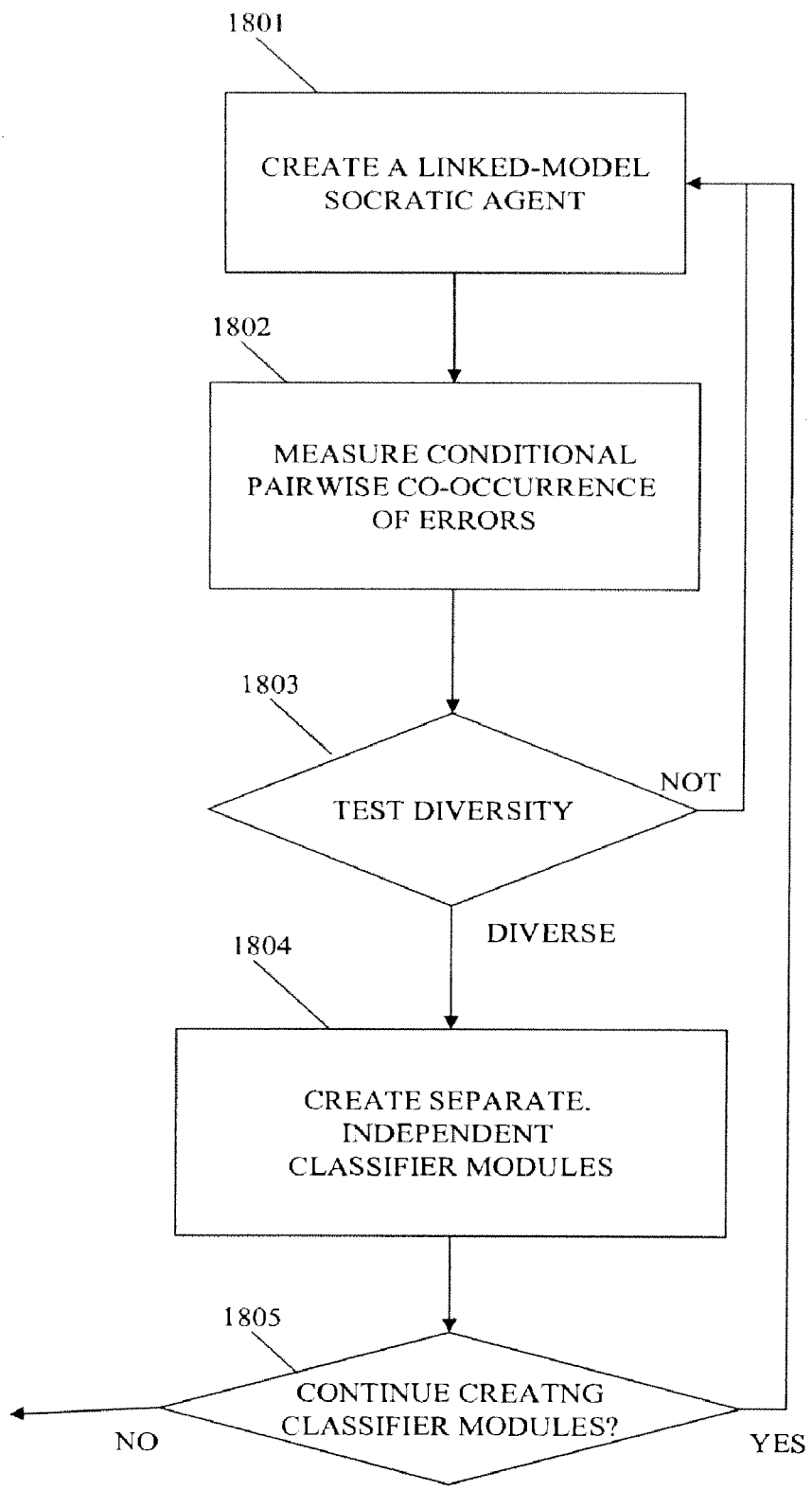
FIG. 18 is a flowchart of a process for creating modules by measuring correlation and divergence among paired models in a Socratic agent.

FIG. 18 is a flowchart of one embodiment of a process by which new classifier modules may be created as an extension of the process of creating a Socratic agent.

Block 1801 creates a linked-model Socratic agent.

Block 1802, rather than setting up a delayed-decision training evaluation, accumulates and measures statistics of co-occurrence, that is whether or not the linked models make errors of the same data sample. The co-occurrence statistics measurement might be in addition to the delayed-decision training, especially for a Socratic agent that would have been created anyway for the purpose of delayed-decision training.

Block 1803 tests the diversity between the different versions of the classifier module with the plurality linked-model sets. In one embodiment, the diversity is measured by the extent to which the errors made by each pair of linked models are diverse, If there is sufficient diversity, process proceeds to block 1804, otherwise, it returns to block 1801. In one embodiment, the diversity is estimated from the counts of the number of times one of two models makes an error and whether the other model makes an error on the same data sample. Let $E_1$ be the number of times that the first model makes an error on a data sample on which the second model does not make an error. Let $E_2$ be the number of times that the second model makes an error on a data sample on which the first model does not make an error. Let $E_{12}$ be the number of times that both models make an error on the same data sample. Then in one embodiment, the diversity d is measured by the formula $$d=(E_1E_2-E_{12}E_{12})/(E_1+E_{12})(E_2+E_{12}).$$

The diversity d will be in the range $0 \leq d \leq 1$. The greater the value of d, the greater the diversity. Higher values of diversity correspond to a greater tendency for improved performance when combining the results of multiple classifier modules. In one embodiment, the models are considered diverse if $d>-0.5$. If the models are diverse, multiple modules will be created in block 1804.

As an illustrative example to show the effect of diversity, consider a Socratic controller with three lower-level classifier modules. For this example, assume that each lower-level classifier module has a probability of making an error of 0.01. In one case, assume that the three lower-level classifier modules are completely non-diverse. That is, when any one of the three modules makes an error, the other two modules make the same error on the same data sample. The pair-wise diversity is −1 for each pair of these modules. Clearly, in this case the three non-diverse modules together have no greater value than any one of them alone. In a second case, assume that the three lower-level classifier modules are completely diverse; that is, assume that whenever one of the three modules makes an error on a data sample, the other two modules classify that data sample correctly. Assume that the method for combining the results of the three classifier modules is to use majority vote. That is, if any two of the classifier modules agree, then their agreed answer is selected as the combined answer. It can be seen that this combined answer will never be an error. Of course, a perfect diversity of d=1 is unrealistic. However, the greater the diversity the better a set of modules will be able to correct errors in creating its combined result.

Block 1804 creates a plurality of independent modules. In each of these modules, a different one of the diverse models is made active.

Block 1805 checks whether creation of new classifier modules is to continue.

In one embodiment, the process of creating new modules may be done as part of an on-going process of delayed-decision testing by Socratic agents. In this embodiment, the collection of statistics of correlation of errors is simply added to the collection of evidence to accept or reject the null hypothesis. In another embodiment, correlation statistics may be collected for any set of linked models, whatever the source of the models and whether or not the linked models are being tested by a Socratic agent. This one embodiment includes the following steps:

1) Create a linkage between a plurality of models. Interpret "model" in the broadest sense. Each "model" in the set of linked models could be a composite model that includes an entire set of simpler models. Each "model" could also be an entire classifier module, including the processing software. In one embodiment, an operational requirement is that the linkage be such that one model (or module) of the plurality of models be active at a time and that the linkage provide a mechanism by which the active model may be switched so that a different model become active.
2) Collect evidence of the degree to which the errors made by each pair of models in the plurality of linked models is diverse.
3) If two or more of the linked models are sufficiently diverse, create a set of modules such that in each module a different one of the diverse linked models is active.
4) If the process of FIG. 18 is continued indefinitely, the number of modules might grow beyond a reasonable number. In one embodiment, the plurality of linked modules are also tested to see if any of the plurality of models should be deleted. One embodiment of this testing is to test each of the plurality of models using the process shown in FIG. 4, beginning with block 421.

Figure 19:
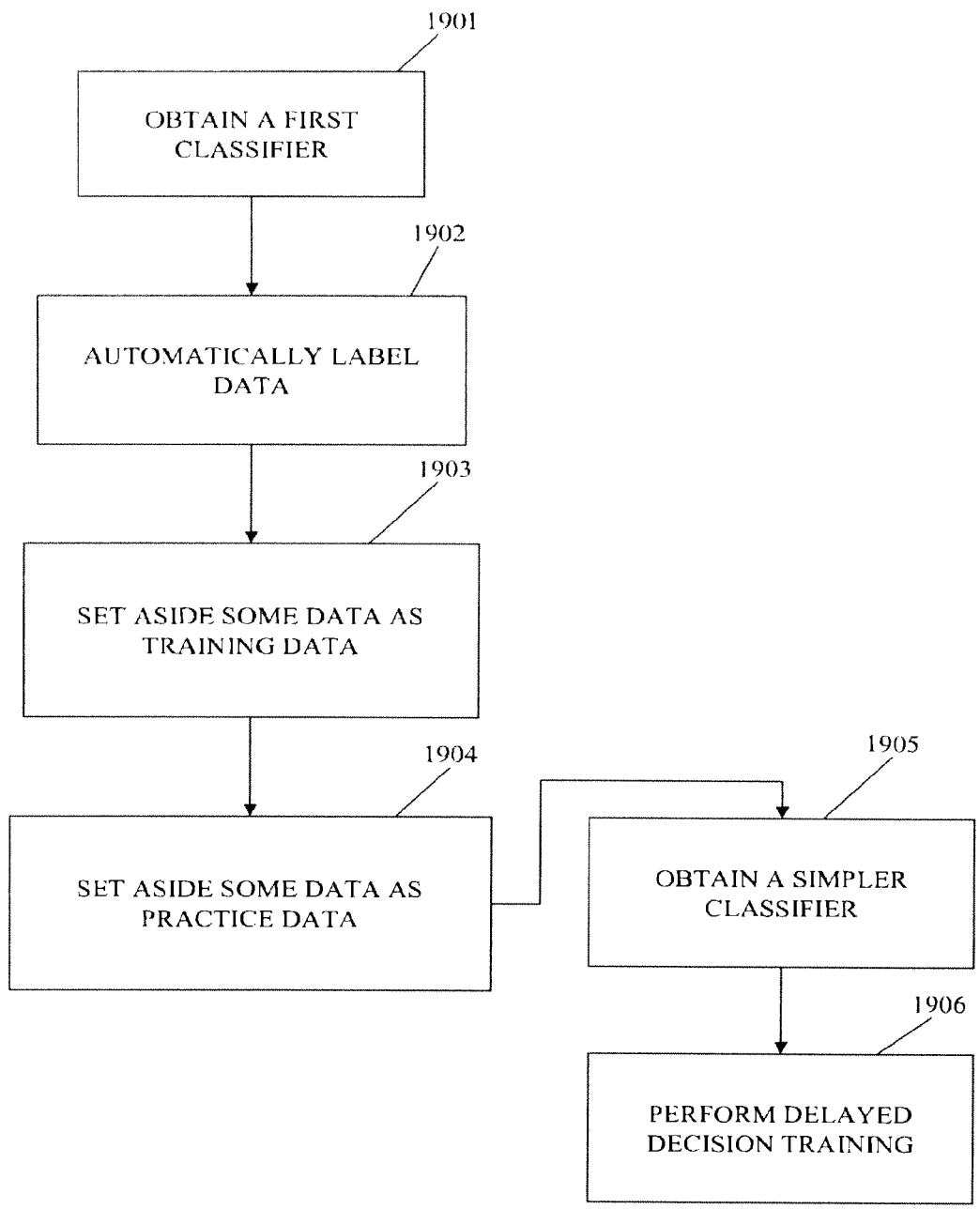
FIG. 19 is a flowchart of a process for semi-supervised training of a simplified module by a more computation intensive module.

FIG. 19 is a flowchart of the process of a form of semi-supervised training of a simplified pattern recognition module or classifier module by a more computation intensive classifier module.

Block 1901 obtains a first classifier. An example of a classifier is a large vocabulary spoken word recognizer based on modeling the acoustics of each word as a hidden Markov process and computing the match of each spoken word model by a process of dynamic programming.

Block 1902 uses the first classifier obtained in 1901 to automatically label some set of data.

Block 1903 sets aside some of the labeled data as training data.

Block 1904 sets aside some of the labeled data as practice data.

Block 1905 obtains a simplified classifier. By way of example, a simplified classifier for a large vocabulary word recognizer could be obtained by matching only the first three phonemes of each word against a fixed segmentation of the data without dynamic programming. In one embodiment, the simplified classifier will attempt to approximate the performance of the first classifier. However, it will do so with fewer computational resources. That is, it will use less computation time and/or less memory. The simplified classifier will completely achieve its objectives if it makes exactly the same mistakes as the first classifier.

In the example large vocabulary word recognizer, the simplified classifier is used as a first-stage selection process. Based on the match scores computed by the simplified classifier, a subset of the vocabulary is selected such that the match for the more computationally expensive first classifier only needs to be performed for a subset of the full vocabulary. In one embodiment of a word recognizer for a one hundred thousand word vocabulary, the simplified classifier might be used to select a subset of only around one thousand words that need to be matched using dynamic programming for the hidden Markov models. Note that the simplified classifier only introduces a new error if the best matching word in the first classifier is correct and if that best matching word is not among the one thousand best matching words as estimated by the simplified classifier. Note that to train the simplified classifier it is not necessary to know the correct word. It is sufficient to know the best matching word as computed by the first classifier. In training and practice, the performance of the simplified classifier is measured by whether the best matching word as computed by the first classifier is among the one thousand best words as estimated by the simplified classifier.

Block 1906 performs delayed-decision training of the simplified classifier as shown in FIGS. 3, 4, and 5 using the training data and practice data that has been automatically labeled by the first classifier. Because the goal of the simplified classifier is merely to approximate the first classifier without introducing any new errors, it is as if the labels on the training data and practice data are correct by fiat.

Figure 20:
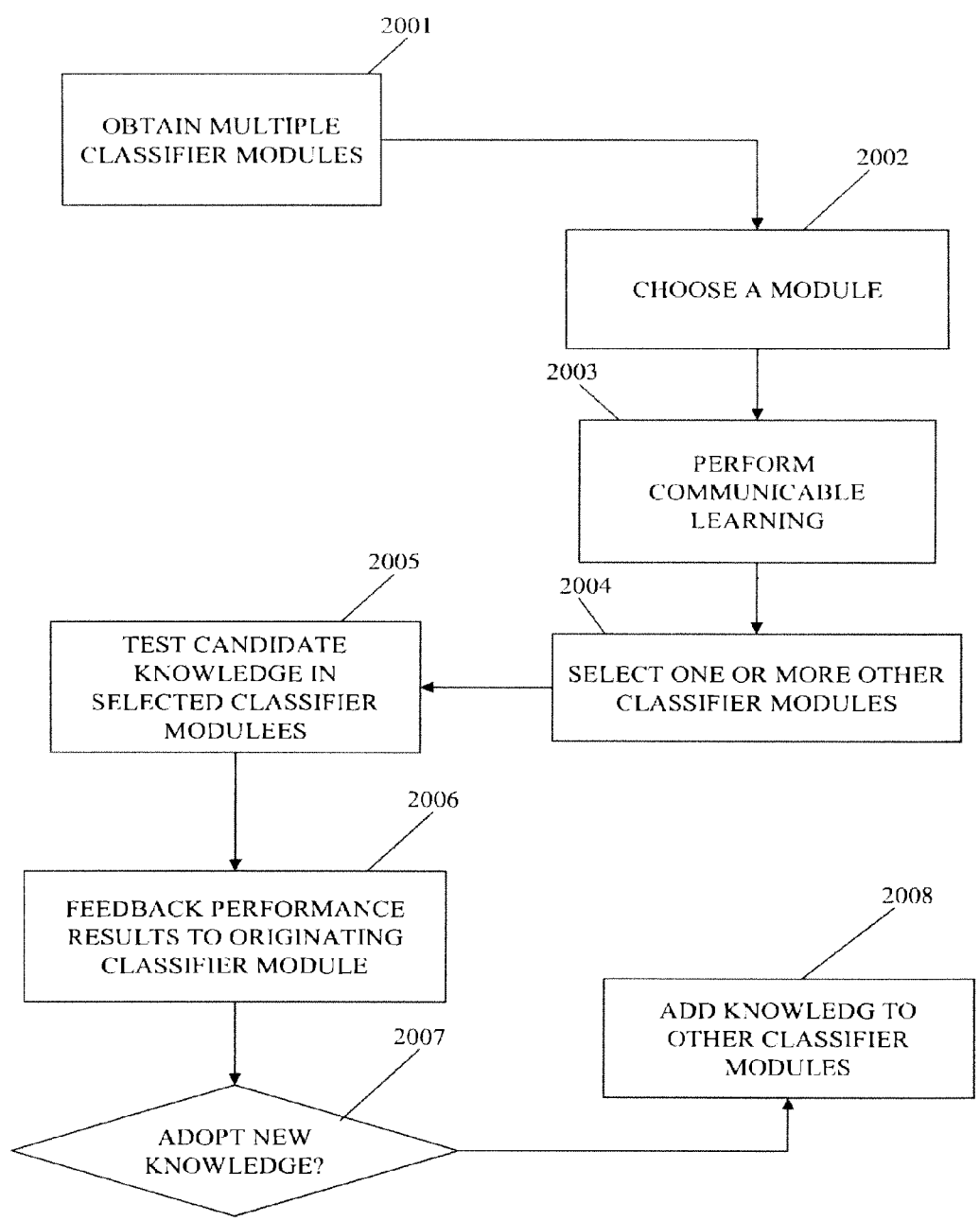
FIG. 20 is a flowchart of a process for sharing knowledge among modules.

FIG. 20 is a flowchart of a process of sharing knowledge among classifier modules.

Block 2001 obtains multiple classifier modules.

Block 2002 chooses one of the classifier modules.

Block 2003 performs communicable learning for the chosen classifier module. This learning could just be learning that takes place in the normal operation of the system that contains the chosen classifier module. On the other hand, it could be extra learning that is undertaken especially for the purpose of discovering communicable new knowledge. Communicable learning is the learning of some piece of knowledge that can be transferred into the knowledge representation of other classifier modules.

One-shot learning, in which a new entity of some kind is created, inherently tends to be communicable. Because the new entity didn't formerly exist even in the chosen classifier module there is no prior knowledge that needs to be in place to identify the same entity in another classifier module. Rather the new entity is simply added to the second knowledge in the same way that it was added to the chosen classifier module. If the new classifier module uses different features in its input data, one-shot learning can be used to create the new model in the new classifier module.

Structural learning is generally communicable between classifier modules that share a common structure. Structural learning is learning changes in a structure for pattern recognition, such as adding or deleting an arc to a graph, or additions or deletions from a finite collection, such as adding or deleting a cluster to a collection of clusters or adding or deleting a component distribution in a mixture of probability distributions.

Correction of a label through feedback from delayed-decision training is communicable knowledge to any classifier module that uses the same labeled sample, either for training or as practice data.

Depending on the particular application other learned knowledge is communicable if the sharing classifier modules have a shared knowledge representation and the new knowledge is represented as a discrete change and not merely as the value of a parameter for which the interpretation of the value is dependent on the particular context. For example, in two classifier modules for acoustic models in speech recognition, acoustic feature measurements that depend on the particular signal processing would generally not be communicable to classifier modules that use different signal processing. However, estimates of the absolute or relative position of articulators in the vocal tract would have the same meaning regardless of the method by which the estimate is made and, hence, would generally be communicable. Regardless of the application, one-shot and structural learning will generally be communicable to some new classifier modules.

In speech recognition, for example, adding a new word to the vocabulary or adding or deleting a pronunciation to the dictionary is communicable. Adding or deleting an allophone of a particular phoneme is communicable. Representing that a particular allophone is possible or impossible in a given context is communicable.

Block 2004 selects one or more other classifier modules. For structural learning, the selection would be limited to other classifier modules that share the structure to be modified. For example, in the addition or deletion of an arc or node in a graph of an acoustic model for a phoneme in a speech recognition system, the selection of other classifier modules would be limited to modules that use the same graph before the addition or deletion.

Block 2005 tests the candidate knowledge in the selected other classifier modules. In the one embodiment, this testing is done by delayed-decision testing as shown in FIG. 3, 4 or 5, respectively as appropriate to the particular form of knowledge change.

Block 2006 feeds back the performance results to the originating classifier module that was chosen in block 202.

Block 2007 decides whether to adopt the new knowledge on a semi-permanent basis, that is until a later decision is made to change the knowledge again, possibly changing it back. To permanently adopt the knowledge, an acceptance criterion must be met. In one embodiment, the acceptance criterion would be more conservative than for adopting new knowledge just in a single classifier module. In particular, the acceptance criterion would require that a substantial majority of the performance feedback results from other classifier modules be positive.

Block 2008 adds the knowledge to other classifier modules. Generally the other classifier modules will not be lower-level classifier modules of the same Socratic controller as the originating classifier module. In fact, the other classifier modules do not even need to be part of the same instance of the recognition system. For example, in a widely distributed commercial speech recognition system, the knowledge of a new word in the vocabulary or of a new pronunciation in the dictionary could be shared across a large number of systems.

With a very large number of classifier modules or a very large number of systems sharing knowledge, one embodiment would first select only a moderate number of other classifier modules in block 2004. If the decision in block 2007 is to adopt the candidate knowledge, control would return to block 2004 to select a larger set of other classifier modules. With classifier modules distributed among a large number of systems, this process might be repeated several times with the number of sharing classifier modules growing each time there are positive performance feedback results.

When the other classifier modules do happen to be other lower-level classifier modules of the same Socratic controller, block 2008 performs extra testing before adding the new knowledge to a particular lower-level classifier module. The testing in block 2005 is to check the validity in other contexts of the candidate knowledge. This validity can be checked by the performance of the other classifier module in isolation. However, for the lower-level classifiers of the same Socratic controller it is desired that the lower-level modules exhibit diversity. Therefore, before adding the knowledge to a lower-level classifier module the performance of the new knowledge is tested in the context of the full Socratic controller with the new knowledge added to the originating classifier module and any the selected other classifier modules.

As one embodiment, the process of FIG. 20 may be described by the following steps;

1) obtain multiple classifier modules (possibly hundreds or thousands), 2) obtain a communicable model, either a new model or one that has been modified, 3) transmit the communicable model to at least one other classifier module, 4) in any classifier module receiving a transmitted model, test the comparative performance of the receiving module with and without the new model, and make the better performing version the active model in the receiving module, 5) transmit back the comparative performance information to the originating module, 6) if the comparative performance results are good, select a larger set of receiving modules and repeat steps (3) through (6). If the comparative performance results are not good, then the transmitted communicable model did not significantly improve performance in the context of the receiving modules. This can happen, for example, if the receiving modules already have other models that make the transmitted model redundant. In one embodiment, if a sufficient number of receiving modules fail to get significantly improved performance, then the process is stopped and steps (3) through (6) are not repeated. However, the transmitted model may still be used in its original module and any other modules in which it has significantly improved performance. Over time, the models that will have been transmitted to the greatest number of modules will be those models that consistently improve the performance of most of their receiving modules.

Further comments may be made regarding steps (1) and (2). In particular, in one embodiment multiple classifier modules may be obtained by actively creating them. In addition, new models may be created from the alternatives at any kind of decision point, not just a decision point inherently involving models, and new modules may be created to contain these new models. In one embodiment, a model or a set of models may be made communicable by writing a software wrapper to interpret the models in a new system environment and transmitting the entire resulting module. In one embodiment, the multiple modules may be contained in multiple recognition systems. The transmission of an entire encapsulating module may facilitate the transmission of a model or model set from one system to another and its utilization in the receiving system.

A very important aspect of this invention is the concept of non-determinism, in the sense of delaying or avoiding decisions in order to avoid wrong decisions that would degrade performance. In particular, processes that have already been described embody some kinds of non-determinism. Both FIG. 3 and FIG. 4 illustrate a process by which a decision was delayed indefinitely based on sequential decision theory, accumulating more evidence until a decision could be made based on a statistically significant amount of evidence.

Another method for achieving non-determinism provides one embodiment for obtaining multiple classifier modules, as specified in block 2001 of FIG. 20. This non-determinism method is to avoid choosing one method or one model by choosing "all of the above." This "choose all" methodology results in the creation of multiple classifier modules that represent different methods of trying to do the same classification task. In particular, in designing a pattern recognition system, there are many decisions in which a trade-off must be made. One embodiment of non-determinism creates multiple modules and avoids these design trade-offs.

For example, one kind of processing may be better at recognizing certain patterns, but a different kind of processing may be better at recognizing certain other patterns. As another example, one kind of processing may be more tolerant of certain kinds of variability or noise, but a different kind of processing may be more tolerant of other kinds of variability. Even in the automatic evaluation shown in FIG. 3 or the automatic adjustment of control parameters shown in FIG. 16, the two versions being compared may make different kinds of errors than each other. In all these cases, under the principle of avoiding decisions, two separate modules (which may be complete systems or subsystems) are created. Modules created in this way have different attributes and make errors in different cases, but they are all designed to work on the same classification problem.

Such a collection of modules is called a collection of cooperating modules. If modules are created using the principle of non-determinism or delayed decisions, in one embodiment they should be tested as illustrated in FIG. 4 (starting at block 421) to verify that they are making a sufficient contribution to performance to justify the resources that they use.

FIG. 21 is a flowchart of a process for managing multiple evolving systems.

Block 2101 obtains multiple systems. In a commercial product, the multiple systems could comprises all the systems that have been sold and distributed and, connected through a network such as the Internet. In a research laboratory, the multiple systems could comprises many experimental systems with different designs. For purposes of this FIG. 21, multiple systems that share the same communicable knowledge are regarded as a single system (perhaps more easily thought of as a single system design realization). This is true even if the associated systems have system-specific adaptations or transformations to their models. Each system may also have local knowledge that is not shared across systems. The purpose of grouping together multiple systems with the same communicable knowledge is to be able to measure the performance of the knowledge independent of the environment of the individual system.

Block 2102 creates new systems by partial knowledge sharing. That is, it performs knowledge sharing as shown in FIG. 20, except that for some of the other systems two versions of the system are created, one by sharing the knowledge and one by not sharing the knowledge.

Block 2103 allows each system (or each group of associated systems) to evolve through continued training and learning. That is, each system continues is normal process of recognition, adaptive training, one-shot learning, Socratic agent supervised correction of training and practice data, and so forth. Each system will be continually acquiring new data and new knowledge. In one embodiment generally each system will be exposed to training data and practice data that is different from the training data and practice data available to other systems, although there may be some amount of sharing and overlap of data.

Block 2104 measures the comparative system performance of each group of associated systems. This measures the performance of each system design realization. For example, if a particular extra pronunciation has been added to the dictionary for some systems, then a group of associated system with respect to knowledge of this pronunciation would be the set of systems for which the particular pronunciation has been added to the dictionary.

Block 2105 drops the lower performing system designs. In the case of distributed systems, an operational system is not discarded. The system merely has its communicable knowledge replaced by the knowledge from a higher performing system and retains its local knowledge.

Block 2106 tests whether creating and testing of new systems should continue. In one embodiment, this evolution and improvement continues indefinitely. Control is returned to block 2104 to obtain more systems that might have been created by other means. In any case, new systems will be created by block 2102.

FIG. 22 illustrates a process of distributed computing and the joint training of multiple classifier modules distributed among multiple systems. In FIG. 22, the classifier modules are merely called "modules" for brevity. In particular, FIG. 22 shows the process by which the diversity among the classifier modules is increased. It is assumed that there is a collection of loosely connected, cooperating systems, each performing the same pattern recognition process, but each having its own stream of data and pattern recognition examples. Each system will also maintain its own set of models and trained modules, but the systems may share some of their models and modules, within the limitations of the communication bandwidth.

Block 2201 distributes a set of base modules to every system in a set of cooperating systems. Two systems are shown for the purpose of illustration, but an unlimited number of systems can work together using the process shown in FIG. 22. Block 2201 makes an identical copy of the base models for every system in the set. The systems operate in parallel. There is a copy of the process from block 2202 to block 2207 running simultaneously on each of the systems. From block 2201, control passes in parallel to the block 2202 in each of the cooperating systems.

Each system keeps one copy of the original base modules unmodified. However, each system also makes one or more copies of each of the base modules to be adaptively trained with data collected by the local system.

As each system proceeds with its normal operation, it will collect data in block 2202. For example, in one embodiment of the invention in a commercially distributed product each copy of the product will collect data to be recognized as the product is being used. If the product allows the user to correct recognition errors, each copy of the product will also collect data about corrected errors, although this embodiment would not assume that all errors have been corrected. This data will be used for training and evaluating the modules, and for creating new modules.

Block 2203 in each system creates new modules by several mechanisms. The copies of the base modules begin to differ from the original base modules as they are adaptively trained on the data obtained locally in a given system. Additional new modules will be created in a similar way from copies of modules received from other systems in block 2206 later in the loop. New modules are also created from the outliers detected as in block 303 in FIG. 3 and tested as shown in FIG. 4. The process of delayed design decisions and non-determinism described above also is used to create new modules. All these new modules are adaptively trained, updated and evaluated as new data is collected in block 2202.

In addition to the normal performance evaluation, there is also an evaluation of the degree to which each module contributes to diversity, performed in block 2204. The task of block 2204 is to estimate the contribution that a particular module makes to the total collection of modules in all of the cooperating systems. Therefore, for each module, block 2204 accumulates statistics measuring how well the particular module helps to correct errors that would otherwise be made by the collection of unmodified base modules and the other modules that the given system has received from other systems (in block 2206 in previous passes through the loop). That is, block 2204 measures how much a given module improves the performance over the collection of unmodified models and models received from external sources.

Block 2205 selects a number of modules that contribute the most to diversity as estimated by block 2204. For example, suppose in an image recognition system that none of the base modules measure texture. Then block 2204 may determine that when a particular module that estimates texture is included in the set of active modules then a significant number of errors is avoided. Block 2204 doesn't need to know either that the particular module estimates texture or that texture analysis is missing in the set of base modules. Block 2204 merely needs to observe the resulting reduction in error rate achieved by added the particular module.

Block 2205 then sends copies of these selected modules to one or more other systems. The amount of communication required is limited because only a few selected modules are shared at any one time and the sharing may be limited to only a few other systems at a time. Thus the communication may be done over a loosely coupled peer-to-peer network, such as the Internet, and does not require an ultra-high-bandwidth local area network or other high-bandwidth, low-latency communication channel.

Block 2206 receives the modules that have been sent by the 2205 blocks in other systems.

Block 2207 performs a delayed-decision evaluation of each received module by the process illustrated in FIG. 4, where the performance criterion is the incremental improvement in performance when the received module is added to the collection of modules on the given system. Because each system has a different collection of modules, it is expected that a module that contributes significant improved performance on one system may fail to contribute on another system that might already have other modules that can recognize the same things. Therefore, when block 2207 accepts or rejects the one-sided hypothesis, it reports back the result to the system from which it received a given module. The system originating the module will be able to tell from these reports how much a given module has contributed to diversity in other systems.

The system continues its normal operation, continuing to receive data and patterns to be recognized. Therefore, control returns to block 2202 and the process continues and may continue indefinitely. Collectively the set of systems continue to improve each of the modules, to create new modules, and to continue to increase the diversity of the collection of modules.

FIG. 23 is a flowchart of a process of recognition by feedback of delayed-decision training on automatically labeled data. The discussion of FIGS. 3 and 6 has already described how delayed-decision training can be used to correct the labels in the training data. FIG. 23 shows how, in the one embodiment, this principle may be extended to make a more accurate recognition system.

Block 2301 automatically labels some amount of data. That is, it runs the recognition process on the data using the recognition output to label the data. In one embodiment, the recognition will be the best available recognition system, using all available classifier modules.

Block 2302 treats the labeled data as training data for a particular classifier module. For example, in speech recognition it could be used as training data for acoustic modeling. It will be used as training data for delayed-decision training.

Block 2303 creates alternative model sets from alternative labelings of the data labeled in block 2301. In one embodiment, alternative labels may come from the results of the recognition system used in block 2301. In one embodiment, the recognition system returns not only its top choice classification but also a list of classes that score nearly as well as the best scoring class. In another embodiment, in addition to using one or more alternative labelings from a first recognition system, alternative labelings are obtained from one or more additional recognition systems.

Block 2304 obtains a set of practice data. This practice data may be obtained by any means that is normally used to obtain practice data. In particular, it may be obtained by automatically labeling a set of data other than the data labeled as training data in block 2302. In one embodiment, if the practice data is automatically labeled, it will be labeled by a system that includes at least one classifier module other than the classifier module being trained in block 2302.

Block 2305 corrects the labels in the training data by feedback from the process of delayed-decision testing as shown in FIG. 6. In this case the allele of linked model sets are the alternative model sets created in block 2303. The Socratic agent feedback information about whether the null hypothesis can be rejected in favor of any of the model sets related to an alternative labeling. If so, the labeling is corrected to the labeling that gives the highest performance in the delayed-decision testing.

Since all of the processes of blocks 2301 through 2305 are automatic with no human labor, the entire process can be treated as a recognition process. Block 2306 returns the corrected labels as the output of this multi-stage recognition process. Every label corrected in the automatically labeled training data represents a reduction in the errors made by the original recognition system used in block 2301, which in one embodiment is the previously best available recognition system.

The process shown in FIG. 23 is very similar to the delayed-decision training process shown in FIG. 3. Indeed, the process shown in FIG. 23 is one embodiment of delayed-decision training. The main difference between the process shown in FIG. 23 and the process shown in FIG. 3 is that FIG. 23 obtains more than one label value for any automatically labeled training sample. For training purposes, in the embodiment shown in FIG. 3, if the null hypothesis is rejected in favor of not training on a particular training sample, then it is sufficient to mark the particular training sample so as to be skipped in any subsequent training. For producing a better recognition result, that is a corrected automatic labeling, the embodiment in FIG. 23 obtains alternate label values for any training sample for which it is considered that the label might be incorrect.

Viewed superficially, the process of FIG. 23 may seem somewhat paradoxical. This seeming paradox results from the ability of an automatic recognition system to correct its own errors. If a system can correct its own errors why would it make the errors in the first place? Thus, the resolution of the paradox is the distinction between the original recognition, made with minimal delay, and the corrections that can be made by means of the delayed decision testing of block 2305. Therefore, it is useful to lists the steps of the process of FIG. 23 expanding out the steps in the delayed-decision testing of block 2305. FIG. 23 may also be described as comprising the following steps:

1) Obtain a set of data to be recognized. This data will be recognized and be automatically labeled so that it can be used as labeled training data. The purpose will not be training for the sake of training but rather delayed-decision training for the sake of obtaining feedback to correct the automatic labeling.
2) Automatically label the obtained data with multiple labels.
3) For each training sample, create an allele of linked models in which each model is created by training on the given training sample with a particular one of the multiple labels.
4) Obtain a set of practice data. In one embodiment the practice data may also be automatically labeled. In one embodiment, the practice data and its automatically generated labels are obtained from the on-going operational use of one or more recognition systems.
5) Test the comparative performance of the linked models on the practice data.
6) Correct the labels on the original set of data to be recognized whenever the best performing model on the practice data is associated with a label different from the chosen, top-scoring label in the original recognition.
7) Return the labels as corrected as the final results of a multi-stage recognition process.

As an illustrative example, consider a continuous speech recognition system. In recognition of continuous speech, many different word sequences must be hypothesized and evaluated. In one embodiment, the results of evaluating these word sequences are organized into a results lattice. For a typical position in the sentence, this results lattice contains results for more than one word that might be the word occurring at that point in the spoken sentence. In this example embodiment, alternative word labels may easily be obtained by associating each position in the spoken utterance with all the word labels that occur at the corresponding position in the result lattice.

As a second illustrative example, consider an image recognition task in which several different image analysis methods are available. Assume that a separate recognition system is built based on each of the image analysis methods. In this example embodiment, alternative labels may be obtained for each part of the image by listing all of the different labels that occur among the collection of recognition systems.

One description of an example embodiment of the improved recognition process is as a multi-stage process including the following steps:

1) Obtain recognition results of a first recognition system. For each sample of data, obtain a set of alternative labels. These labels may be all the best matching class labels from a single recognition system. They may be the total set of class label results from a plurality of recognition systems. These labels may be used for delayed-decision training of one or more recognition systems, possibly including the first recognition system.
2) Create a model for each alternative label for each training sample. Create a linked set of alternative models from the models created from each particular training sample.
3) Obtain a set of practice data. This practice data may be from a single recognition system or from a plurality of recognition systems that share the set of linked models.

This practice data may be fully or partially labeled manually or may be labeled fully automatically. In particular, this practice data may be recognition data obtained during the operational use of one or more recognition systems.

4) Measure comparative performance of the linked models from alternative labels for a particular training sample. One embodiment of this comparative performance testing is delayed-decision testing of a null hypothesis that all the alternative models have the same performance. In this embodiment, do not proceed to step 4 until the null hypothesis is rejected at a statistically significant level.

5) For each training sample set the label to agree with the best performing model. That is, correct the label if the model for one of the alternative labels performs better than the model for the original label.

6) Report the corrected labels as the final recognition results for the multi-stage recognition process.

Figure 24:
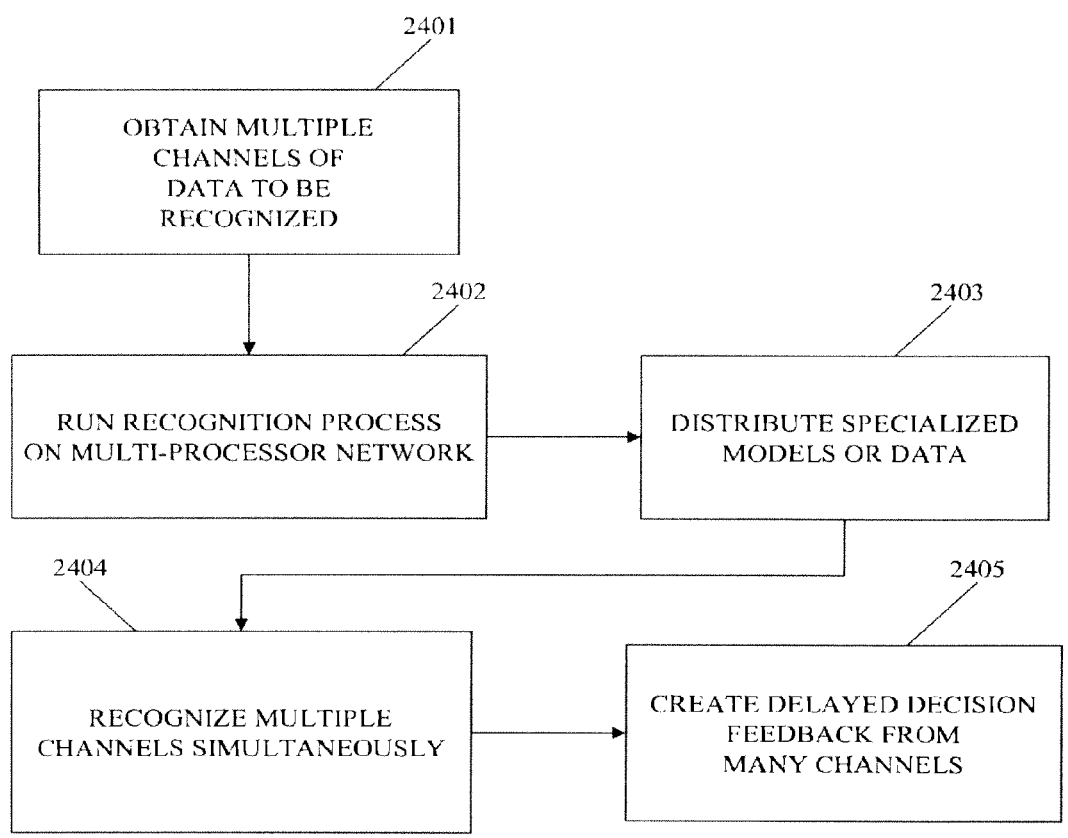
FIG. 24 is a flowchart of a process for sharing resources in the simultaneous recognition of many channels.

FIG. 24 is a flowchart of a process of sharing resources in the simultaneous recognition of many channels. In one embodiment, it provides a more cost-effective implementation of very large recognition systems, such as a system with multiple Socratic controllers each with many lower-level classifier modules. It also helps make the complex process of improved recognition by feedback from delayed-decision training as shown in FIG. 23 more practical.

Block 2401 obtains multiple channels of data to be recognized. In one embodiment there may be hundreds or thousands of channels of data to be recognized.

Block 2402 runs the recognition process on a multi-processor network. The processors only need to be loosely coupled, say through a peer-to-peer network such as the Internet. In one embodiment, the multiple processors will be running multiple recognition systems with knowledge sharing and joint training as illustrated in FIGS. 21 and 22.

Block 2403 distributes specialized models or data. In one embodiment of a Socratic controller a particular lower-level classifier modules may be active for only a small fraction of the data space. By distributing such specialized classifier modules to particular processors in the multi-processor network, the knowledge representation in a particular specialized classifier module does not need to be copied to every processor in the network. In one embodiment, the classifier modules and one or more decision trees are distributed among a peer-to-peer network of computers. A decision tree assigns particular computers in the network to do particular tasks.

One embodiment of such a decision tree works as follows: A task assignment is characterized by a 3-tuple, (DataSample, ModelID, ProcessorAndModuleID). The component DataSample in the 3-tuple is a sample of data to be recognized. The ModelID is an abstract identifier that indicates that a particular model or set of models is to be matched against the particular data sample. Initially, only the DataSample and possibly the ModelID values are filled in. In some cases, the ModelID is unspecified, which means that the set of models is determined by the classifier module that gets assigned to this particular task. The ProcessorAndModuleID get filled in when the decision tree analysis gets to a leaf node of the tree. In this one embodiment, each node in the decision tree applies a test either to the DataSample or to the ModelID. Based on the result of this test, processing continues to a particular node in the next lower level in the decision tree. The processing for this next node may be done on a different computer, as determined by information that is stored associated with the parent node. When the decision tree process gets to a leaf node, that is a node without any successor nodes, the assignment of the task to a particular processor is made according to information associated with the given leaf node. In one embodiment, this assignment information may include the assignment of the classification task to a particular module residing on an assigned computer. In one embodiment, there may be many identical copies of a given module, including copies of the associated models, so a processor may be assigned from a list of several processors. In this embodiment, the assignment is made in part to balance the procession load among the computers in the network.

Other embodiments may be used, depending on the application and properties of the computer network and the software. The core characteristic is that there are a large number of computers working cooperatively on the simultaneous recognition of many data streams. For delayed-decision training and delayed-decision testing, this characteristic means that the amount of automatically labeled practice data is proportional to the number of data streams. Therefore, the amount of elapsed time required to accumulate a statistically significant amount of evidence is reduced proportionately to the inverse of the number of data streams. As a consequence, the amount of time that it takes to accumulate evidence and feedback information to correct labels in a recognition is also reduced in proportion to the inverse of the number of data streams. For example, if there are one thousand active data streams, then the delay to get corrected labels is reduce by a factor of one thousand.

Block 2405 partitions the data according to the decision tree in one embodiment of the Socratic controller. This decision tree classifier may itself be distributed through the network so that not every processor needs to have a copy of the lower branches of the decision tree.

Block 2404 recognizes multiple channels simultaneously. Each stream of data is sent to one or more processor that contain specialized classifier modules as determined by the partition of the Socratic controller and the active set of lower-level classifier modules for each data item.

Block 2405 performs label correction using delayed decision training feedback as shown in FIG. 23. Because there are many channels being recognized, the time that is required to accumulate statistically significant rejection of the null hypothesis and the corresponding feedback is proportionately reduced.

In one embodiment, the process shown in FIG. 24 may be used to reduce the delays and expense of the multi-stage recognition process shown in FIG. 23. In this embodiment, for each stream of data, top choice and alternate labels are produced. For each automatically labeled training sample, an allele of linked model sets is created by block 2303 of FIG. 23. The performance testing of an allele of these linked models, however, is not limited to the particular recognition system that creates the allele. Each allele is transmitted to other recognition systems, each of which collects comparative performance information and transmits this information back to the originating recognition system, which accumulates this information to eventually reject the null hypothesis in favor of the model corresponding to one of the label choices for the particular training sample associated with a given allele.

As an illustrative example, consider a continuous speech recognition system that is provided to the public as a combined product and service. Assume that the product includes a recognition system that performs a first recognition relatively quickly with local resources, but that also provides communication to central resources for extra services and improved, off-line recognition. Assume that the extra services include delayed-decision training and sharing of knowledge among the systems of the users of the service.

One embodiment of the process for producing improved recognition results would include the following steps:

1) Obtain the data being recognized and the first recognition results from each of the systems using the service, including alternate labels from the results lattice of each local recognition system.
2) Use the results of the first recognition as automatic labels for delayed-decision training, creating a linked set of models from the alternative labels for each automatically labeled training sample.
3) Transmit each linked set of models to a (possible large) number of other user systems. Collect comparative performance data on each such system.
4) Transmit the comparative performance data to a site that has been designated to accumulate evidence to accept or reject a null hypothesis associated with the linked models created from the alternative labels for a particular training sample.
5) When the null hypothesis is rejected in favor of one of the alternative labels, change the label in the first recognition results to agree with the label of the best scoring alternative model.
6) In the system from which the original data to be recognized was obtained, accumulate the label changes and report the corrected labels as the final recognition results of the multi-stage, improved recognition process. In the illustrative embodiment, the label corrections may be accumulated for a larger block, such as a complete document.

Referring now to FIG. 25, a block diagram shows a computer network for implementing some aspects of some embodiments of the invention. Some embodiments of the invention involve a substantial plurality of modules or systems, especially FIG. 8 and FIGS. 20-24. In addition some embodiments of the invention involve a substantial plurality of Socratic agents operating semi-autonomously at the same time. One embodiment of these aspects of the invention is distributed computing on a computer network, as illustrated in FIG. 25.

In this embodiment, each processor 2501 has a substantial amount of local memory 2505. As described in reference to some of the other figures, there is typically a substantial amount of data that is stored locally that does not need to be shared throughout the network. Similarly because each Socratic agent has a specific, somewhat localized hypothesis testing or pattern classification problem much of the computation is also done locally. Thus the interconnection network 2510 does not need to have extremely high bandwidth compared to the combined bandwidth of the communication between the processors 2501 and their local memories 2503. Thus, in one embodiment the computer network may be a wide area or even global network, such as the Internet without the network being overloaded with communication demands even if the total number of processors is very large.

In the embodiment shown in FIG. 25, each processor has its own local data input. As an illustrative example, consider a pattern recognition system such as a handwriting recognition system, and optical character recognition system or a speech recognition system. For the illustrative example assume that software implementing an embodiment of the invention has been distributed to a large number of end users and that these end user systems are running on the processors 2501 shown in FIG. 25.

In the illustrative example, each end user is routinely using the embodiment of the invention in the course of their normal work. As the embodiment of the invention is used, it continually performs pattern recognition for the given task. Because Socratic agents, such as shown in FIGS. 3 and 4, may use practice data that is automatically labeled, each system in FIG. 25 may locally create and run Socratic agents. Each of these Socratic agents may modify an existing model or create a new model. These models will be communicable to other systems for which there are corresponding models or model sets in those other systems. Thus, the network of FIG. 25 may be the platform for one embodiment of the knowledge sharing illustrated in FIGS. 20-22.

FIG. 25 may also be used as the platform for one embodiment of the distributed computing of multiple recognition channels illustrated in FIG. 24, which is in turn an implementation of one embodiment of the multi-stage recognition process illustrated in FIG. 23.

Using Socratic agents and Socratic controllers, an invention has been described that can perform more robust training. In some embodiments, it is very tolerant of errors in the training set and errors in the practice set. In some embodiments, the invention is even capable of automatically correcting the labels in the training data. In some embodiments, the invention scales to very large systems and provides a means of managing joint training and cooperative recognition with many related classifier modules as lower-level classifiers under a Socratic controller. In other embodiments, the invention also allows many independent classifier modules and scales to large distributed systems.

Thus, in some embodiments, the invention enables the sharing of knowledge across classifier modules and systems. In some embodiments, it can optimize the diversity among the classifier modules and manage the evolution and continuous improvement of a population of recognition systems. Finally, in some embodiments, it can take the best available recognition system and improve its performance by automatic correction of the labels generated by that system.

Based on the core concept of Socratic agents and modeling knowledge about knowledge, some embodiments have aspects that embody one or more of the following novel concepts. A brief summary of some of these aspects is given in the following list of novel concepts and informal outline of some potential claimed embodiments.

List of Some of the Novel Concepts or Properties in the Invention:

1. Pattern recognition using Socratic agents
2. Pattern recognition with self-aware, environment-aware modules
3. Delayed-decision training; making decisions based on future observed performance
4. Socratic agents that acquire knowledge from future performance measurements (functionally equivalent to pre-cognition)
5. Tolerance of high error rate in evaluation data
6. Self-correction of errors in training data
7. Delayed decision for creation and deletion of modules or models
8. Basing the decision for the creation or deletion of a model or module on the contribution to improved performance relative to the resources required
9. Socratic controller of collection of cooperating modules
10. Acquisition of knowledge of reliability of component modules as a function of the data and of the results of the other component modules
11. Adjusting the combining weights for a multiple module classifier based as a function of the data and of the results of the modules
12. Selecting which component module to train based on measuring the degree of performance improvement from training the respective component modules 13. Delaying the decision of which component module to train
14. Swapping copies of modules in a distributed multiple system network
15. Locally making an estimate of a modules contribution to diversity of the total collection of modules on a network
16. Locally evaluating the incremental contribution of shared modules and reporting the evaluation to the originator of the module
17. Creation of modules by non-determinism at system design decisions
18. Joint knowledge acquisition by an arbitrarily large collection of loosely coupled cooperating systems
19. Semi-supervised training using labels generated by a higher stage module, correct by fiat.

Non-Legal Informal Outline of Some Potential Claimed Embodiments:
1. A pattern recognition method/system including
   a. At least one non-Socratic classifier module
   b. At least one Socratic agent
   c. in which Socratic agent acquires knowledge about the knowledge of non-Socratic KS
2. As in 1,
   a. in which Socratic agent does at least one of
      i. creates and tests null hypothesis about non-Socratic classifier module
      ii. performs delayed decision test of a decision
      iii. performs delayed decision training
      iv. formulates and trains pattern recognition modeling behavior of at least one classifier module
      v. feeds back information about correctness of labeled data item
      vi. selects active subset from a plurality of classifier modules
      vii. combines results from a plurality of classifier modules
      viii. manages joint training of a plurality of classifier modules
      ix. shares knowledge with at least one other Socratic agent Delayed Decisions:
3. As in 2
   a. in which Socratic agent does at least one of
      i. creation of an allele of linked model sets
      i. delayed decision training
      ii. delayed decision testing
      iii. feed back of knowledge
      iv. correction of labels
      v. structural learning
      iv. sharing of knowledge
4. As in 3, further comprising:
   a. creation of allele of linked model sets from a decision point in standard process
   b. delayed decision testing
5. As in 3, further comprising:
   a. Obtaining a training sample with associated label
   b. creation of paired-model allele from training or not training on given sample
   c. Delayed-decision training
6. As in 3, further comprising
   a. correction of labels Delayed-Decision Recognition
7. As in 6, further comprising:
   a. doing recognition to automatically label data
   b. delayed-decision training on labeled data
   a. Delay transmission of recognition results
   b. Using corrected labels as final recognition results
8. As in 2, further comprising:
   a. Multiple channels of recognition; data received real-time on multiple channels
   b. Specialized modules
   c. Distribution of data and tasks according to data space partition
   d. Composite distributed processing of each channel
   e. Feedback of performance results from multiple channels in delayed-decision evaluation
9. As in 8, further comprising:
   a. Doing recognition to automatically label data on multiple channels
   b. Delayed-decision training applied to models used in multiple recognition channels
   c. Feedback of label correction
   d. Use of corrected labels as revised recognition results for each channel Structural Learning:
10. As in 3, further comprising
    a. Socratic agent does delayed decision creation or deletion of models
11. As in 3, further comprising
    a. Socratic agent does delayed decision insertion or deletion of an element in a data structure
12. As in 11, in which
    a. data structure is a graphical structure with nodes and arcs, and
    b. at least one arc is inserted or deleted
13. As in 3
    a. In which Socratic agent uses one-shot learning to create at least one of a new model and a new element within a structure.

Socratic Controllers:
14. As in 2,
    a. in which at least one Socratic agent is a Socratic controller,
    b. further comprising a plurality of classifier modules associated with said Socratic controller
    c. in which said Socratic controller does at least one of
       i. selects active subset of associated plurality of classifier modules from data received other than output results from said plurality of associated classifier modules
       ii. selects active subset of associated plurality of classifier modules based in part on output results from said plurality of associated classifier modules
       iii. combines results from said plurality of associated classifier modules into composite result
15. As in 14
    a. In which Socratic controller partitions the data space
16. As in 15, further comprising:
    a. Plurality of associated classifier modules
    b. Socratic controller models the performance of associated classifier modules in part based on the region of data space
17. As in 2, further comprising:
    b. Plurality of associated lower-level classifier modules
    c. Subset of associated classifier modules are trained on a given training sample
    d. Delayed-decision selection of subset to be trained based on measurements of performance of training each candidate lower-level classifier module
18. As is 2, further comprising
    b. Plurality of associated classifier modules
    c. Socratic controller combines the results of the associated classifier modules in a composite result d. Combining rule depends on parameters estimated by the Socratic controller
e. Estimates of combining parameters depend at least in part on data values 19. As in 18, in which
   a. Estimates of combining parameters depends at least in part on output results of associated classifier modules Sharing Knowledge 20. As in 2, further comprising
   a. Measuring conditional correlations of errors
21. As in 20, further comprising
   a. Creating independent modules based on measured independence of errors
22. As in 2, further comprising
   a. Shares communicable knowledge items among modules
   b. Delayed-decision testing of performance of models in new module
   c. Feed back of performance measurements
23. As in 2, further comprising
   a. Multiple systems
   b. Share modules
   c. Delayed decision testing of diversity (incremental performance in context)
24. As in 2, further comprising
   a. Multiple systems
   b. Sharing modules
   c. Continued independent training
   d. Different data for different systems
   e. Comparison of performance (on shared data)**
   f. Management of evolution of population of system designs Other Claims:
1) Automatic labeling of practice data
2) Using a first classifier to automatically label training and practice data for a second, simplified classifier
3) Evolution of a population of recognition systems
4) Using a decision tree for the higher-level pattern classifier in a Socratic controller
5) Choosing different objectives for different nodes in a decision tree It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A pattern recognition method, comprising:
creating, using a first one or more computers, a communication linkage among a plurality of pattern recognition modules;
selecting, using the first one or more of the computers, as one or more source pattern recognition modules one or more of the pattern recognition modules;
obtaining or having obtained, using the first one or more computers, in said one or more source pattern recognition modules one or more pieces of communicable knowledge data;
selecting or having selected or receiving a selection, using the first one or more computers, of one or more of the pattern recognition modules as one or more recipient pattern recognition modules to receive said one or more pieces of communicable knowledge data;
sending or having sent, using the first one or more computers and the communication linkage, said one or more pieces of communicable knowledge data from said one or more source pattern recognition modules to said one or more recipient pattern recognition modules;
obtaining or having obtained or receiving or having received, using the first one or more computers, performance measurements comparing for each of one or more of the recipient pattern recognition modules respectively, its performance with the addition of the one or more pieces of communicable knowledge data with its performance without the one or more pieces of communicable knowledge data; and
communicating or having communicated, using the first one or more computers and the communication linkage said performance measurements from said one or more recipient pattern recognition modules back to said one or more source pattern recognition modules.

2. The pattern recognition method as defined in claim 1, wherein said one or more pattern recognition modules are distributed across a plurality of computers that may or may not include one or more of the computers in the first one or more computers, and
wherein said communication linkage comprises electronic communications using one or more electronic communications networks.

3. The pattern recognition method as defined in claim 1, wherein the plurality of pattern recognition modules are implemented on a single computer and said communication linkage is implemented using software implemented on that single computer.

4. The pattern recognition method as in claim 3, wherein the first one or more computers consists of the single computer.

5. The pattern recognition method as defined in claim 1, wherein said one or more pieces of communicable knowledge data comprises at least one selected from the group of the following forms of knowledge representation:
an additional pattern model to be added to a set comprising a plurality of pattern models;
an addition or deletion to a pattern structure, where the pattern structure before the addition or deletion is present in both at least one of the source pattern recognition modules and at least one of the recipient pattern recognition modules;
a change of one or more labels in a set of labeled data;

a module comprising one or more pieces of represented knowledge originating in at least one of said one or more source recognition modules and associated software allowing said one of more pieces of represented knowledge to be utilized in at least one of said one or more recipient pattern recognition modules; and a decision choice at a system decision point where the decision point is present in both at least one source pattern recognition module and at least one recipient pattern recognition module.

6. The pattern recognition method as defined in claim 1, wherein said one or more pieces of communicable knowledge data comprises an additional pattern model to be added to a set comprising a plurality of pattern models.

7. The pattern recognition method as defined in claim 1, wherein said one or more pieces of communicable knowledge data comprises a change in one or more labels in a set of labeled data.

8. The pattern recognition method as defined in claim 1, further comprising:

choosing a specific criterion, for said selecting or having selected or receiving a selection of one or more recipient pattern recognition modules step, based at least in part on whether a particular recipient pattern recognition module is capable of being a recipient of the one or more pieces of communicable knowledge data from the one or more source pattern recognition modules, wherein said selecting or having selected or receiving a selection of the one or more recipient pattern recognition modules step comprises selecting or having selected or receiving a selection of a small subset of the recipient pattern recognition modules from a larger plurality of the pattern recognition modules.

9. The pattern recognition method as defined in claim 1, further comprising:

creating or having created at least one additional pattern recognition module by creating or having created a plurality of variants of at least one of the source pattern recognition modules; and adding or having added this at least one additional pattern recognition module to the plurality of the pattern recognition modules.

10. The pattern recognition method as defined in claim 9, further comprising:

obtaining a plurality of streams of data using the first one or more computers;

creating, or having created using the first one or more computers, said plurality of variants at least in part by training at least one variant on a first stream of data from the plurality of streams of data and training or having trained at least one other variant on a second stream of data from the plurality of streams of data that differs from the first stream of data.

11. The pattern recognition method as defined in claim 1, further comprising:

increasing or having increased the use in one or more of the source pattern recognition modules of the communicable knowledge data for which performance measurements in one or more of the recipient pattern recognition modules indicates improved performance from use of said communicable knowledge data compared to performance without said communicable knowledge data.

12. The pattern recognition method as defined in claim 1, further comprising:

decreasing or having decreased the use in one or more of the source pattern recognition modules of the communicable knowledge data for which performance measurements in one or more of the recipient pattern recognition modules indicates degraded performance from using said communicable knowledge data compared to performance without said communicable knowledge data.

13. The pattern recognition method as defined in claim 1, further comprising:

selecting, using the first one or more computers, one or more of the pieces of the communicable knowledge data for which performance measurements one or more of the recipient pattern recognition modules indicates improved performance using said selected communicable knowledge data compared to performance without said selected communicable knowledge data;

selecting or having selected or receiving a selection, using the first one or more computers, of one or more additional recipient pattern recognition modules, to receive said selected one or more pieces of communicable knowledge data for which the performance measurement on the recipient pattern recognition modules previously selected indicates improved performance using said selected communicable knowledge data compared to performance without said selected communicable knowledge data; and sending or having sent, using the first one or more computers and the communication linkage, said selected one or more pieces of communicable knowledge data from said one or more source pattern recognition modules to said one or more recipient pattern recognition modules including the one or more additional recipient pattern recognition modules.

14. A pattern recognition system, comprising:

a first one or more computers configured to perform the following steps:

creating, using the first one or more computers, a communication linkage among a plurality of pattern recognition modules;

selecting or having selected or receiving a selection, using the first one or more of the computers, one or more of the pattern recognition modules as one or more source pattern recognition modules;

obtaining or having obtained, using the first one or more computers, in said one or more source pattern recognition modules one or more pieces of communicable knowledge data;

selecting, using the first one or more computers, as one or more recipient pattern recognition modules one or more of the pattern recognition modules to receive said one or more pieces of communicable knowledge data;

sending or having sent, using the first one or more computers and the communication linkage, said one or more pieces of communicable knowledge data from said one or more source pattern recognition modules to said one or more recipient pattern recognition modules;

obtaining or having obtained or receiving or having received, using the first one or more computers, performance measurements comparing for each of one or more of the recipient pattern recognition modules respectively, its performance with the addition of the one or more pieces of communicable knowledge data with its performance without the one or more pieces of communicable knowledge data; and communicating or having communicated, using the first one or more computers and the communication linkage to said performance measurements from said one or more recipient pattern recognition modules back to said one or more source pattern recognition modules.

15. The pattern recognition system as defined in claim 14, wherein said one or more pattern recognition modules are distributed across a plurality of computers that may or may not include one or more of the computers in the first one or more computers, and
wherein said communication linkage comprises electronic communications using one or more electronic communications networks.

16. The pattern recognition system as defined in claim 14, wherein the plurality of pattern recognition modules are implemented on a single computer and said communication linkage is implemented using software implemented on that single computer.

17. The pattern recognition system as in claim 16, wherein the first one or more computers consists of the single computer.

18. The pattern recognition system as defined in claim 14, wherein said one or more pieces of communicable knowledge data comprises at least one selected from the group of the following forms of knowledge representation:
an additional pattern model to be added to a set comprising a plurality of pattern models;
an addition or deletion to a pattern structure, where the pattern structure before the addition or deletion is present in both at least one of the source pattern recognition modules and at least one of the recipient pattern recognition modules;
a change of one or more labels in a set of labeled data;
a module comprising one or more pieces of represented knowledge originating in at least one of said one or more source recognition modules and associated software allowing said one of more pieces of represented knowledge to be utilized in at least one of said one or more recipient pattern recognition modules; and
a decision choice at a system decision point where the decision point is present in both at least one source pattern recognition module and at least one recipient pattern recognition module.

19. The pattern recognition system as defined in claim 14, wherein said one or more pieces of communicable knowledge data comprises an additional pattern model to be added to a set comprising a plurality of pattern models.

20. The pattern recognition system as defined in claim 14, wherein said one or more pieces of communicable knowledge data comprises a change in one or more labels in a set of labeled data.

21. The pattern recognition system as defined in claim 14, wherein the first one or more computers are further configured to perform the step:
choosing a specific criterion, for said selecting or having selected or receiving a selection of one or more recipient pattern recognition modules operation, based at least in part on whether a particular recipient pattern recognition module is capable of being a recipient of the one or more pieces of communicable knowledge data from the one or more source pattern recognition modules,
wherein said selecting or having selected or receiving a selection of the one or more recipient pattern recognition modules operation comprises selecting or having selected or receiving a selection of a small subset of the recipient pattern recognition modules from a larger plurality of the pattern recognition modules.

22. The pattern recognition system as defined in claim 14, wherein the first one or more computers are further configured to perform the steps:
creating or having created at least one additional pattern recognition module by creating or having created a plurality of variants of at least one of the source pattern recognition modules; and
adding or having added this at least one additional pattern recognition module to the plurality of the pattern recognition modules.

23. The pattern recognition system as defined in claim 22, wherein the first one or more computers are further configured to perform the steps:
obtaining a plurality of streams of data using the first one or more computers;
creating, or having created using the first one or more computers, said plurality of variants at least in part by training at least one variant on a first stream of data from the plurality of streams of data and
training or having trained at least one other variant on a second stream of data from the plurality of streams of data that differs from the first stream of data.

24. The pattern recognition system as defined in claim 14, wherein the first one or more computers are further configured to perform the step:
increasing or having increased the use in one or more of the source pattern recognition modules of the communicable knowledge data for which performance measurements in one or more of the recipient pattern recognition modules indicates improved performance from use of said communicable knowledge data compared to performance without said communicable knowledge data.

25. The pattern recognition system as defined in claim 14, wherein the first one or more computers are further configured to perform the step:
decreasing or having decreased the use in one or more of the source pattern recognition modules of the communicable knowledge data for which performance measurements in one or more of the recipient pattern recognition modules indicates degraded performance from using said communicable knowledge data compared to performance without said communicable knowledge data.

26. The pattern recognition system as defined in claim 14, wherein the first one or more computers are further configured to perform the steps:
selecting, using the first one or more computers, one or more of the pieces of the communicable knowledge data for which performance measurements one or more of the recipient pattern recognition modules indicates improved performance using said selected communicable knowledge data compared to performance without said selected communicable knowledge data;
selecting or having selected or receiving a selection, using the first one or more computers, of one or more additional recipient pattern recognition modules, to receive said selected one or more pieces of communicable knowledge data for which the performance measurement on the recipient pattern recognition modules previously selected indicates improved performance using said selected communicable knowledge data compared to performance without said selected communicable knowledge data; and
sending or having sent, using the first one or more computers and the communication linkage, said selected one or more pieces of communicable knowledge data from said one or more source pattern recognition modules to said one or more recipient pattern recognition modules including the one or more additional recipient pattern recognition modules.

* * * * *